US008590527B2

(12) United States Patent
Luconi et al.

(10) Patent No.: US 8,590,527 B2
(45) Date of Patent: Nov. 26, 2013

(54) SOLAR COLLECTOR SYSTEM FOR SOLAR THERMAL APPLICATIONS

(76) Inventors: Gregg Luconi, Monrovia, CA (US); Chris Gregory, La Crescenta, CA (US); Brian Coleman, Pasadena, CA (US); Alan Greaney, Buena Park, CA (US); Jason Blair, Pasadena, CA (US); Peter Raymond Zarzaca, Pacoima, CA (US)

(*) Notice: Subject to any disclaimer, the term of this patent is extended or adjusted under 35 U.S.C. 154(b) by 1429 days.

(21) Appl. No.: 12/136,001

(22) Filed: Jun. 9, 2008

(65) Prior Publication Data
US 2009/0007901 A1    Jan. 8, 2009

Related U.S. Application Data

(60) Provisional application No. 60/933,816, filed on Jun. 8, 2007, provisional application No. 61/069,806, filed on Mar. 18, 2008.

(51) Int. Cl.
F24J 2/36 (2006.01)
(52) U.S. Cl.
USPC ......... 126/596; 126/906; 248/166; 248/346.3
(58) Field of Classification Search
USPC .......... 126/627, 569, 906; 52/641; 248/346.3, 248/166
See application file for complete search history.

(56) References Cited

U.S. PATENT DOCUMENTS

| 2,471,954 | A |   | 5/1949 | Harvey |         |
|-----------|---|---|--------|--------|---------|
| 4,110,010 | A | * | 8/1978 | Hilton | 136/246 |
| 4,365,617 | A | * | 12/1982| Bugash et al. | 126/578 |
| 4,995,377 | A |   | 2/1991 | Eiden  |         |
| 5,114,101 | A |   | 5/1992 | Stern et al. | |
| 5,542,409 | A |   | 8/1996 | Sampayo | |
| 5,826,832 | A |   | 10/1998| Stich et al. | |
| 6,465,724 | B1| * | 10/2002| Garvison et al. | 126/621 |
| 7,252,083 | B2| * | 8/2007 | Hayden | 126/600 |
| 7,658,071 | B1| * | 2/2010 | McDermott | 126/627 |
| 2004/0238025 | A1 | | 12/2004 | Shingleton | |
| 2005/0229924 | A1 | | 10/2005 | Luconi et al. | |

FOREIGN PATENT DOCUMENTS

DE    10 2004 036 094 A1    2/2006
WO    WO 2007/011442 A1    1/2007

OTHER PUBLICATIONS

International Search Report for International Application No. PCT/US2008/066371, International Search Report dated Sep. 5, 2008 and mailed Sep. 11, 2008 (2 pgs.).

(Continued)

*Primary Examiner* — Eric Keasel
(74) *Attorney, Agent, or Firm* — Christie, Parker & Hale, LLP

(57) ABSTRACT

A solar collector system includes a plurality of frames. Each frame includes at least a pair of spaced apart side members, a plurality of cross members connected to the side members, the cross members pivotally moveable from a shipping configuration to a deployed configuration wherein in the deployed configuration, each cross member is positioned relative to an adjacent cross member with a predetermined angle, and a plurality of stantions extending from the frames. The solar collector system further includes a plurality of heliostats, each heliostat mounted to one of the stantions, and a plurality of ballasts coupled to the frames, each ballast having a lower surface contacting the ground without substantially penetrating the ground to maintain a position of the frames on the ground.

24 Claims, 48 Drawing Sheets

(56) References Cited

OTHER PUBLICATIONS

Written Opinion of the International Searching Authority for International Application No. PCT/US2008/066371, Written Opinion of the International Searching Authority dated Sep. 5, 2008 and mailed Sep. 11, 2008 (6 pgs.).

Chinese Office Action dated Feb. 16, 2011 for corresponding Application No. 200880101766.1, with English translation (16 sheets).

* cited by examiner

SOLAR COLLECTOR SYSTEM FOR SOLAR THERMAL APPLICATIONS

CROSS-REFERENCE TO RELATED APPLICATIONS

The present application claims the benefit of U.S. Provisional Patent Application Ser. No. 60/933,816, filed Jun. 8, 2007, the entire disclosure of which is incorporated herein by reference, and further claims the benefit of U.S. Provisional Patent Application Ser. No. 61/069,806, filed Mar. 18, 2008, the entire disclosure of which is incorporated herein by reference.

BACKGROUND

Power tower solar collector systems typically employ a large number of heliostat-supported mirrors that reflect sunlight to a tower, by which electricity is directly or indirectly generated. Said heliostats are usually arranged on the ground along concentric arcs at different positions around the tower. To avoid blocking from arc to arc, the distance between these is an increasing function of radius. To track the position of the sun throughout the day, each heliostat moves to a configuration which reflects the sun toward the tower. Each heliostat is anchored to the ground by being attached to a structure that penetrates the ground. The anchoring maintains a desired orientation of the mirror during windy conditions.

In current systems, each heliostat is individually anchored to the ground by a penetrating structure. With ground penetrating anchors, installation of each ground penetrating structure supporting a heliostat is time and labor consuming, and can be rather costly. Furthermore, due to the large ground area typically used for installing a solar collector system, ground penetrating anchors scar the ground and may negatively affect plant and wildlife population at or surrounding the installation area.

Because of the arc-shaped and variable distance arrangement of heliostats, installation requires a laborious process of surveying the terrain for precise heliostat locations. Additionally, in current systems, each heliostat is independently supported by a mounting post. Accordingly, the structural strength for supporting the heliostat must be provided by the mounting post. The large reflective surfaces (which may be in excess of 100 m$^2$) that are typically mounted on heliostats produce large torques on the mounting post as a result of wind loads. Such torques are typically proportional to the square of the radius of the reflective surface. To reduce the noted torque, a large number of independently supported smaller mirrors having small inter-mirror densities would be required to achieve the mirror density of a larger reflective surface without mechanical interference between heliostats and without producing undesirable optical qualities (e.g. shading and low blocking). However, such a large density arrangement of independently supported heliostats having smaller reflective surfaces can be costly and laborious to install and maintain.

Based on the foregoing, there is a need for a solar collector system that solves the problems associated with current solar collector systems discussed above.

SUMMARY

In accordance with aspects of the disclosure, a solar collector system includes a frame comprising at least a pair of side members and a plurality of cross members connected to the pair of side members, a plurality of heliostats mounted to the frame, a plurality of ballasts coupled to the frame and configured to maintain a position of the frame on the ground.

In accordance aspects of the disclosure, a solar collector system includes a plurality of frames, wherein each frame includes at least a pair of spaced apart side members, a plurality of cross members connected to the side members, the cross members pivotally moveable from a shipping configuration to a deployed configuration wherein in the deployed configuration, each cross member is positioned relative to an adjacent cross member with a predetermined angle, and a plurality of stantions extending from the frames. The solar collector system further includes a plurality of heliostats, each heliostat mounted to one of the stantions, and a plurality of ballasts coupled to the frames, each ballast having a lower surface contacting the ground without substantially penetrating the ground to maintain a position of the frames on the ground.

In accordance with aspects of the disclosure, a method of installing a solar collector system includes deploying cross members of a frame from a shipping configuration to a deployed configuration, connecting side members of the frame and the cross members together, coupling the frame to a plurality of ballasts to maintain a position of the frame on the ground, and mounting a plurality of heliostats to the frame.

DETAILED DESCRIPTION

Referring to FIGS. 1-3 and 5-41 various components of a solar collector systems according to various embodiments of the disclosure are shown. The solar collector system includes one or more frames for installation on the ground and a plurality of heliostats supported on each frame. A heliostat herein refers to a device having an optical component which is configured to track the position of the sun. Accordingly, a heliostat can include one or more mirrors, solar cells, lenses or other optical components. In the following embodiments, the heliostat is described as having a mirror which tracks the position of the sun with actuators. Each mirror is moveable in two dimensions relative to an associated frame in order to track the sun over the course of the day and redirect the incident light to one more receivers (not shown). A receiver may include a tower configured with a boiler having one or more input apertures, a molten salt reservoir, or photovoltaic cells, for example, for converting the received light directly or indirectly into electricity. The frames are deployable on site either manually or with a deployment device, which is described in detail below. Additionally, the solar collector system includes a cleaning machine which cooperates with each frame to clean the mirrors.

Each frame defines a self-ballasted heliostat (SBH) system. As described in the following, the frame includes a plurality of interconnected members forming a structure for supporting a plurality of heliostats, where the configuration of the frame enables the heliostats to be supported by the frame with little or no penetration of the ground support, without anchors and/or weights.

Figure 4:
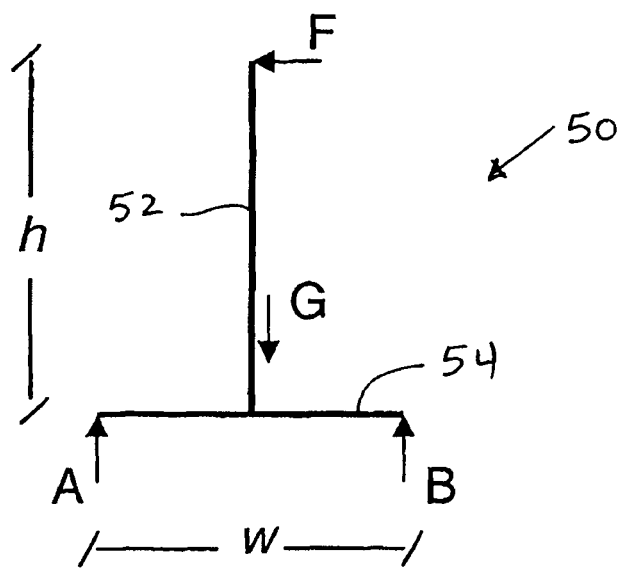
FIG. 4 is a schematic diagram of a structure for supporting a heliostat.

Referring to FIG. 4, a structure 50 having a mast or stantion 50 is schematically shown supported on the ground with a base 54. A heliostat (not shown) can be mounted on the stantion 52. The stantion is shown to have a height h and the base 54 is shown to have a width w. A combined weight of the structure 50, which includes the stantion 52, base member 54 and the heliostat is represented by G. A force F is shown on the stantion 52, which represents a wind force on a mirror surface of the heliostat. In order to prevent tipping over of the heliostat, the combined weight G must be greater than twice the product of the wind force F and a ratio of height over width (h/w). In FIG. 4, A and B represent reaction forces. With a wind force of 100 lb, a heliostat weight of 100 lb and a height to width ratio of about 2-4, the additional weight required to prevent tipping over of the structure 50 is about 300-700 lb. Accordingly, the structure 50 must include a ballast of about 300-700 pounds in order to prevent tipping over thereof.

Figure 5:
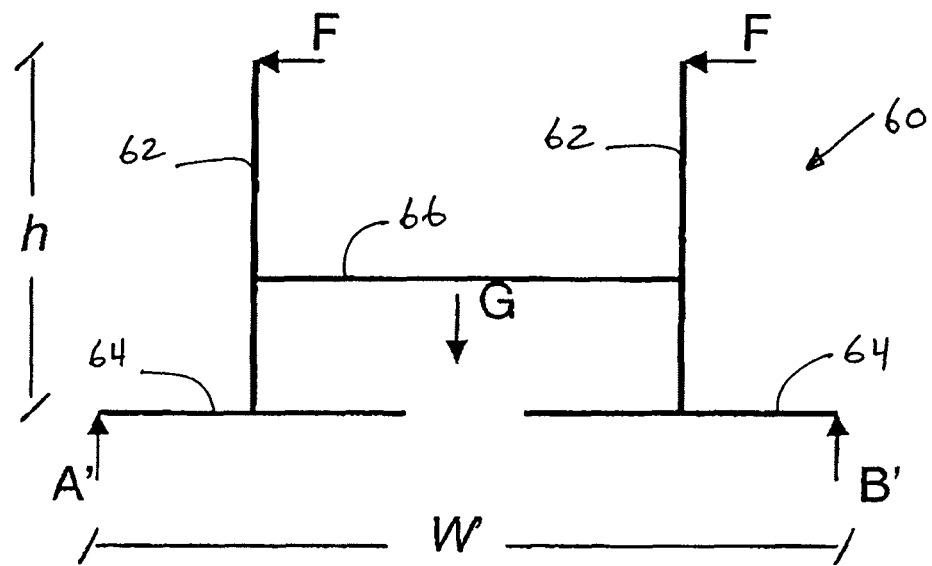
FIG. 5 is a schematic diagram of a Self-Ballasted Heliostat system according to the present disclosure.
Figure 6:
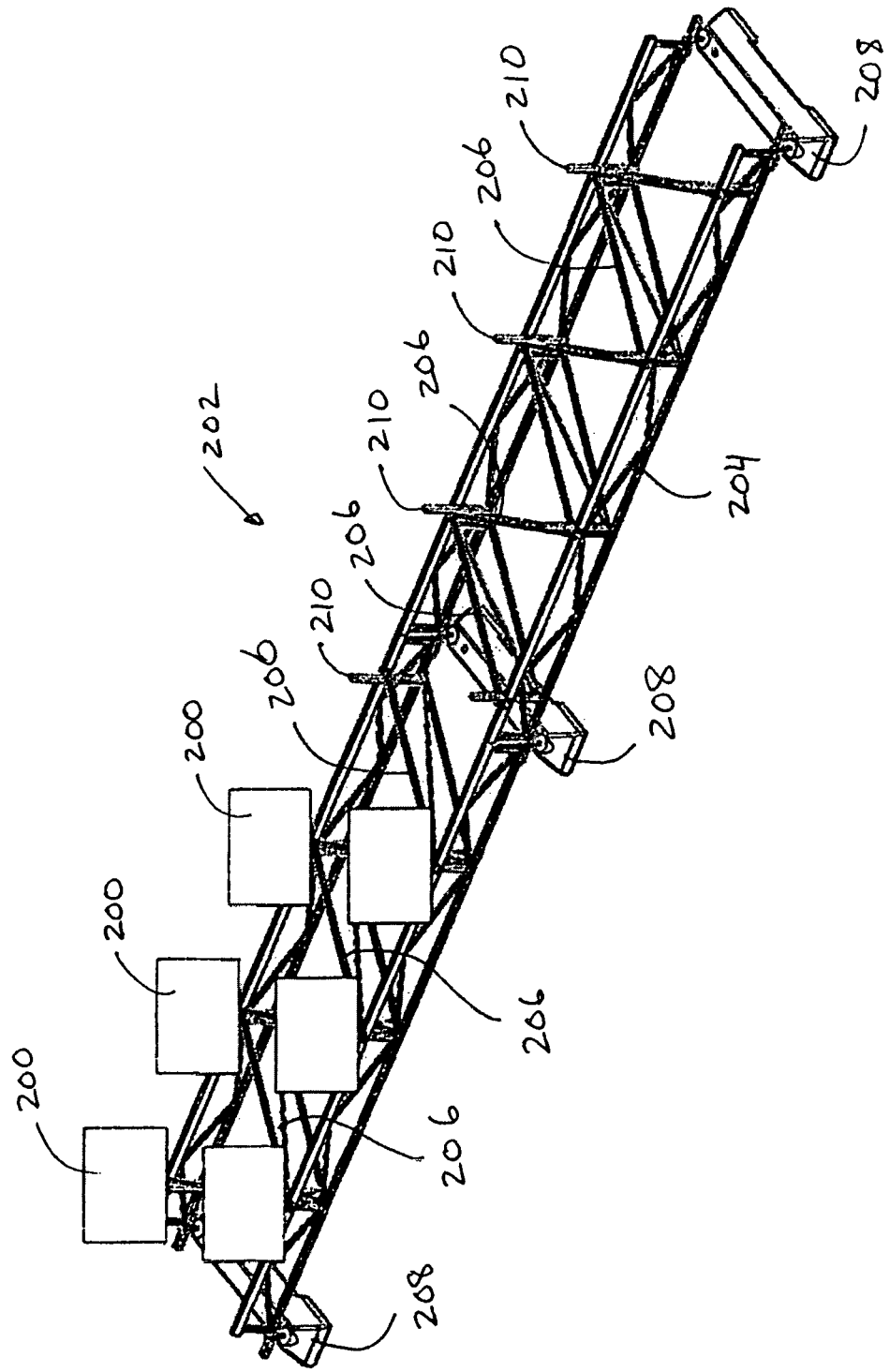
FIG. 6 is a perspective view of another embodiment of a Self-Ballasted Heliostat system for a solar collector system according to the present disclosure.

Referring to FIG. 5, a frame structure 60 according to the disclosure is schematically shown. The frame 60 includes two stantions 62, where each stantion 62 is supported by a base 64. A cross member 66 connects the stantions 62. Each stantion 62 is configured to support a heliostat assembly with actuated mirror (not shown). The frame 60 has a height h and a total width W', which includes the width of each base 64 and the distance between each base 64. A combined weight of the structure is represented by G, which includes the weight of the frame 60 and the heliostat assemblies. A wind force F is shown on a mirror surface (not shown) of each heliostat. In order to prevent tipping over of the frame 60, the combined weight G must be greater than four times the product of the wind force F and a ratio of height over width (h/W'). In FIG. 5, A' and B' represent reaction forces. With a wind force of 100 lb, a heliostat weight of 100 lb and a height to width ratio of about 0.5 or greater, no additional weight is required to prevent tipping over of the frame 60. Accordingly, the frame 60 of FIG. 5 is self-ballasting to provide an SBH system as discussed in detail herein.

The frame 60 distributes the total weight G to provide a self-ballasting and stable platform for supporting the heliostats. Furthermore, as described in detail below, the frame 60 can include additional interconnected members including additional stantions 62, bases 64, cross members 66 and side members (projecting out of the page in FIG. 5), by which the total weight requirement for a self-ballasting system can be reduced. However, to provide additional support for the frame in the event that higher wind loads are exerted on the frame, and/or to provide additional safety and stability, the frame 60 can include a plurality of ballasts to increase the total weight G. As discussed in detail below with various embodiments of the disclosure, the ballast can be a concrete object or any type of weighted structure formed from any material that can provide additional weight for the frame. In order to provide pointing accuracy for the mirrors, the location of the frame where each heliostat is mounted should be as rigid as possible. To provide such rigidity, each heliostat should have the shortest load path to a location where the frame is supported on the ground or to a ballast if ballasts are used to ground the frame. Therefore, if a heliostat is mounted on a stantion, the stantion should be as close as possible on the frame to a ballast or mounted directly on the ballast.

Frames and their respective mirrors may be located generally to the North and South sides of the associated receiver tower (not shown) to which the sunlight is redirected (in some embodiments, the frames and mirror boarder the corresponding receiver to the North, South, East, West, or combination thereof). A plurality of SBH systems can be arranged in an array on the ground. The SBH systems may be connected to form large SBH structures. As described in detail below, the mirrors of each SBH system are arranged in a staggered manner so as to reduce energy loss due to shading by another mirror.

In general, the size, weight and aspect ratio of the mirrors can be used to determine the height of the frame, spacing between the structural elements of the frame, and the stagger angle between the mirrors in order to minimize losses due to blocking and shading, resist movement due to wind and provide an increase in efficiency to a substantially optimum level. For example, the horizontal width and length of the frame can be large compared to the height of the mirrors, thus providing each frame and mirror system a low aspect ratio (i.e., low height-to-width ratio). The aspect ratio (height to center of mirror divided by width of frame across its narrowest dimensions, e.g., rail-to-rail) is generally between 0.5 and 0.82, although the even larger aspect ratios may be used depending on the wind loading and weight distribution. The mirrors can be approximately one square meter, with a mirror height of approximately five to six feet. The mirrors can be spaced apart laterally by a gap 4 to 5 feet wide (although this depends on the mirror size). The position of the mirrors close to the ground takes advantage of the reduced wind velocity in proximity to the ground, which is sometimes referred to as the boundary layer effect. In addition, the dense packing of mirrors in the horizontal plane helps to attenuate the wind from row to row, thereby reducing wind loading on the mirrors' actuators as well as the structural requirements on the frame. The weight of the SBH system in combination with the low aspect ratio is sufficient to resist the force of wind, thereby preventing lateral movement and tipping over, and maintaining stability even in the presence of high winds. The stagger arrangement of the mirrors is configured so as to align the mirrors in groups at angles of between 40-80 degrees depending several factors including size and aspect ratio of the mirrors. In the disclosed embodiments, the mirrors are shown to have a stagger angle of approximately 60 degrees, which provides an angle of about 30 degrees with respect the line of latitude, line of longitude, or combination thereof (See FIG. 3). This stagger configuration of mirrors of about 60 degrees minimizes energy losses due to shading, which occurs when one mirror blocks incident sunlight from hitting another mirror, and blocking, which occurs when one mirror blocks reflected sunlight from another mirror from reaching the receiver. However, an optimum stagger angle may vary depending on sizes and shapes of the mirrors and the distance between adjacent mirrors.

Therefore, the disclosed SBH system as described below by the following exemplary embodiments includes a plurality of low aspect-ratio frames that are installed above ground and depend primarily on the weight of the frame and mirrors to maintain the SBH system in place on the ground without the need for any part of the SBH system to penetrate the ground. Accordingly, the SBH system can be supported with the weight of the frame and mirrors. However, as discussed below, each frame may be coupled to ballasts to provide additional stability and safety.

Figure 1:
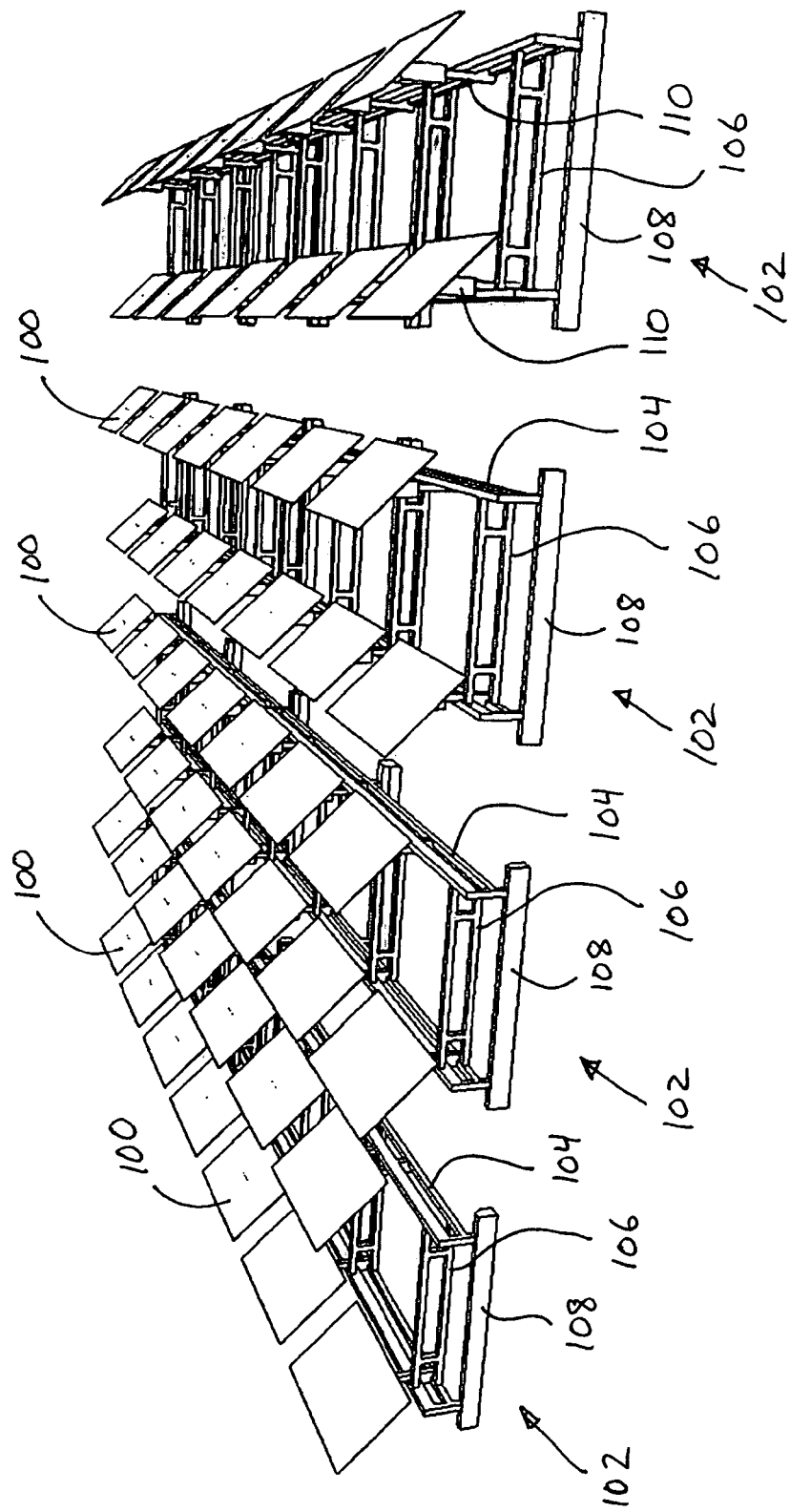
FIG. 1 is a side perspective view of one embodiment of a Self-Ballasted Heliostat system for a solar collector system according to the present disclosure.
Figure 2:
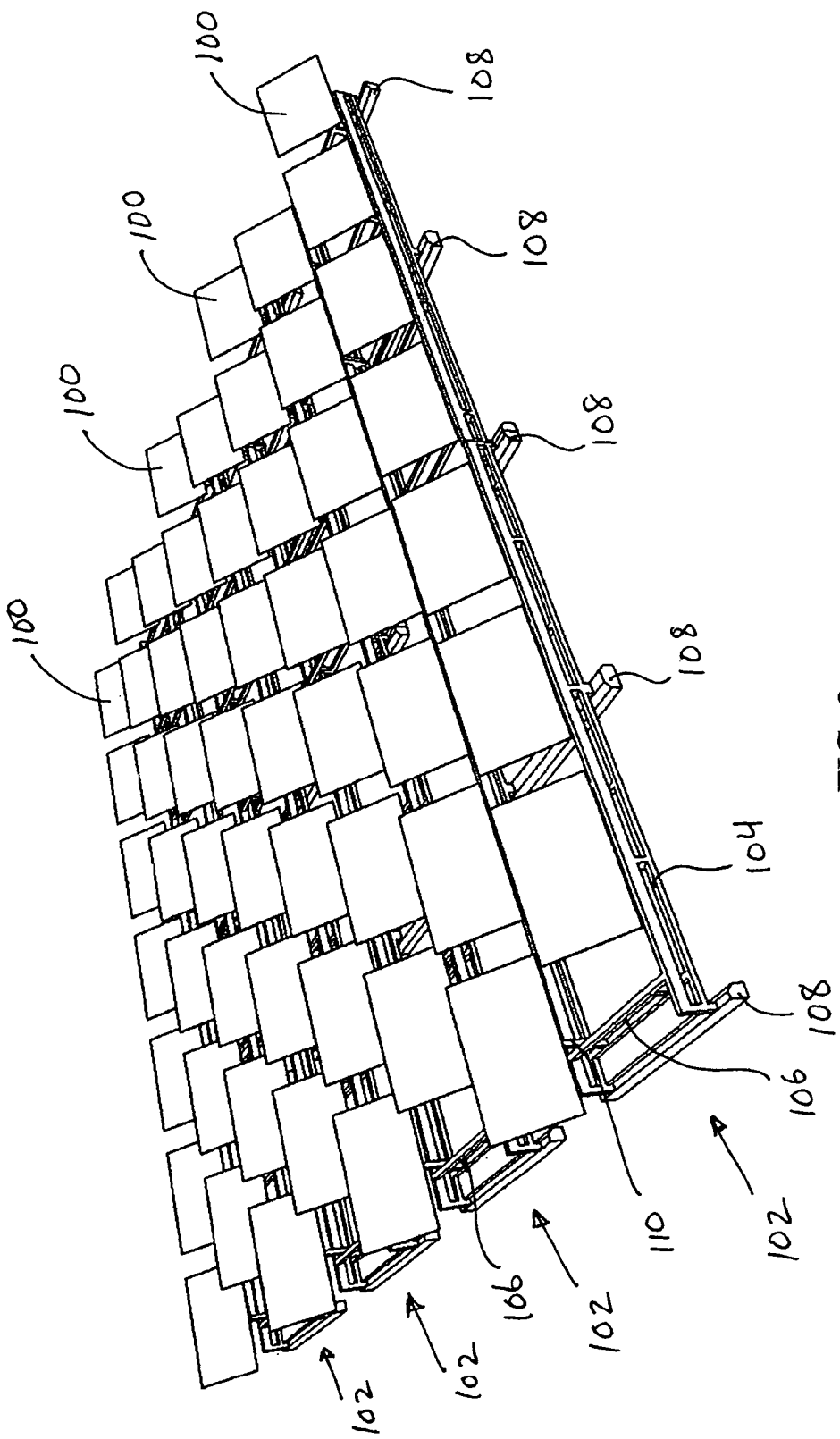
FIG. 2 is a corner perspective view of the Self-Ballasted Heliostat system of FIG. 1.
Figure 3:
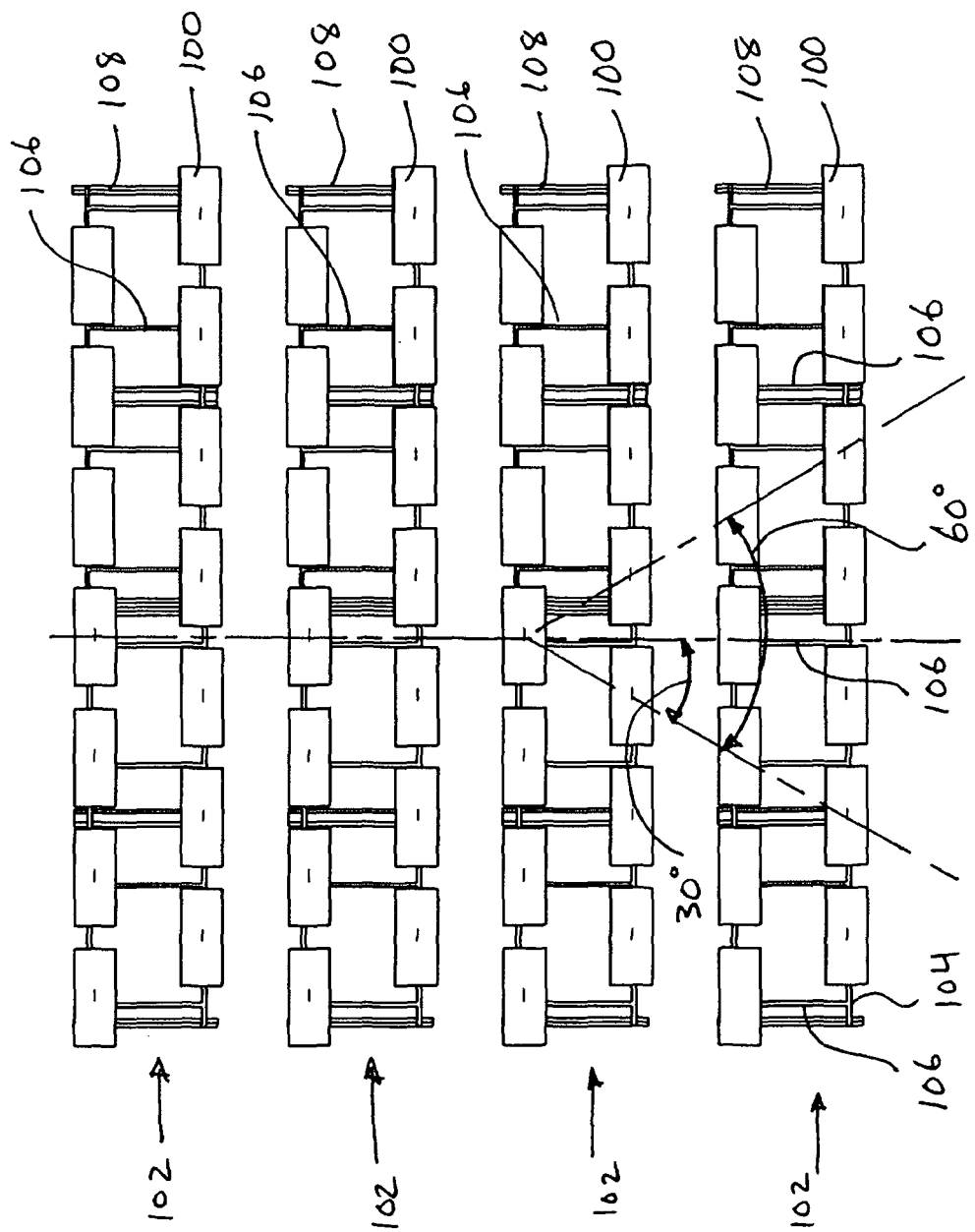
FIG. 3 is a top view of the Self-Ballasted Heliostat system of FIG. 1.

Referring to FIGS. 1-3, a solar collector system having a plurality of SBH systems according to the first embodiment is shown. Each SBH system includes a plurality of mirrors 100 moveably mounted on a frame 102. Each frame 102 includes a plurality of side members 104 and a plurality of cross members 106 extending between and connecting the side members 104. In this embodiment, the cross members 106 are generally perpendicular to the side members 104. The cross members 106 provide structural support to the side members 104 and maintain the side members 104 in a fixed position relative to each other. Each SBH system is supported on the ground by one or more ballasts 108, which can be a heavy object so as to maintain the SBH system in a fixed position on the ground with little or no ground penetration. The ballasts 108 can be constructed from any material such as concrete and can have any shape. For example, as shown in FIGS. 1-3, the ballasts 108 can be similar in shape to concrete car stops used in parking facilities. The concrete car stops are heavy enough to secure the SBH system to the ground while providing a surface area large enough to distribute the weight of the SBH system without subsidence. Each mirror 100 can be mounted to any part of the frame 102. The frame 102 includes a plurality of stantions 110 vertically extending from the frame 102. Each mirror 100 is mounted to a corresponding stantion 110 with one or more actuators (not shown in FIGS. 1-3) in order to provide movement of the mirror 100 in at least two dimensions relative to the stantion 110.

Each of the frames 102 is characterized by a longitudinal axis parallel to the length of the side members 104. The frames 102 can be arranged parallel to one another in a rectilinear manner, thereby forming alleyways between adjacent frames. The alleyways provide access to personnel and equipment during installation, servicing, maintenance, and mirror cleaning. Frames 102 and their respective mirrors 100 may be located generally to the North and South sides of the associated receiver tower (not shown) to which the sunlight is redirected (in some embodiments, the frames and mirror boarder the corresponding receiver to the North, South, East, West, or combination thereof). As shown in the plan view in FIG. 3, frames are preferably arranged in groups whose longitudinal axis runs laterally from East to West, while the mirrors are configured to align in groups at approximately 30 degrees with respect the line of latitude, line of longitude, or combination thereof. The mirrors of one group are offset or staggered with respect to the mirrors of an adjacent group, thereby forming sets of mirrors arranged to form a repeating pattern of isosceles triangles. As discussed above, this configuration of mirrors at 30 degrees with respect the line of latitude, line of longitude, or combination thereof, minimizes energy losses due to shading, which occurs when one mirror blocks incident sunlight from hitting another mirror, and blocking, which occurs when one mirror blocks reflected sunlight from another mirror from reaching the receiver.

The side members 104 and the cross members 106 can be assembled prior to shipping to form the frame 102. The frames 102 can be mounted on the ballasts 108 at the installation site. The mirrors 100 can be mounted on the stantions 110. Alternatively, the side members 104 and the cross members 106 can be assembled into the frames 102 at the installation site.

Referring to FIGS. 6-18, an SBH system and various components thereof according to a second embodiment of the disclosure are shown. The SBH system includes a plurality of mirrors 200 moveably mounted on a frame 202. Each frame 202 includes a plurality of side members 204 and a plurality of cross members 206 extending between and connecting the side members 204 to provide rigidity to the frame 202. In this embodiment, the cross members 206 are pivotally connected together in an "accordion style" that allows collapsing of the cross members 206 to a shipping configuration and deployment thereof onsite for assembly. Each SBH system is supported on the ground by one or more ballasts 208. Each ballast 208 can be a heavy object so as to maintain the SBH system in a fixed position on the ground with little or no ground penetration. The ballasts 208 are shown to be similar in shape to concrete car stops. The ballasts 208 secure the SBH system on the ground while providing a surface area large enough to distribute the weight of the SBH system without subsidence. Each mirror 200 can be mounted on any part of the frame 202. In the disclosed embodiment, each mirror 200 is mounted to a corresponding frame 202 with a stantion 210 vertically extending from the frame 202. Each mirror 200 is part of a heliostat having actuators by which the mirror 200 can be moved in at least two dimensions relative to the stantion 210.

Figure 8:
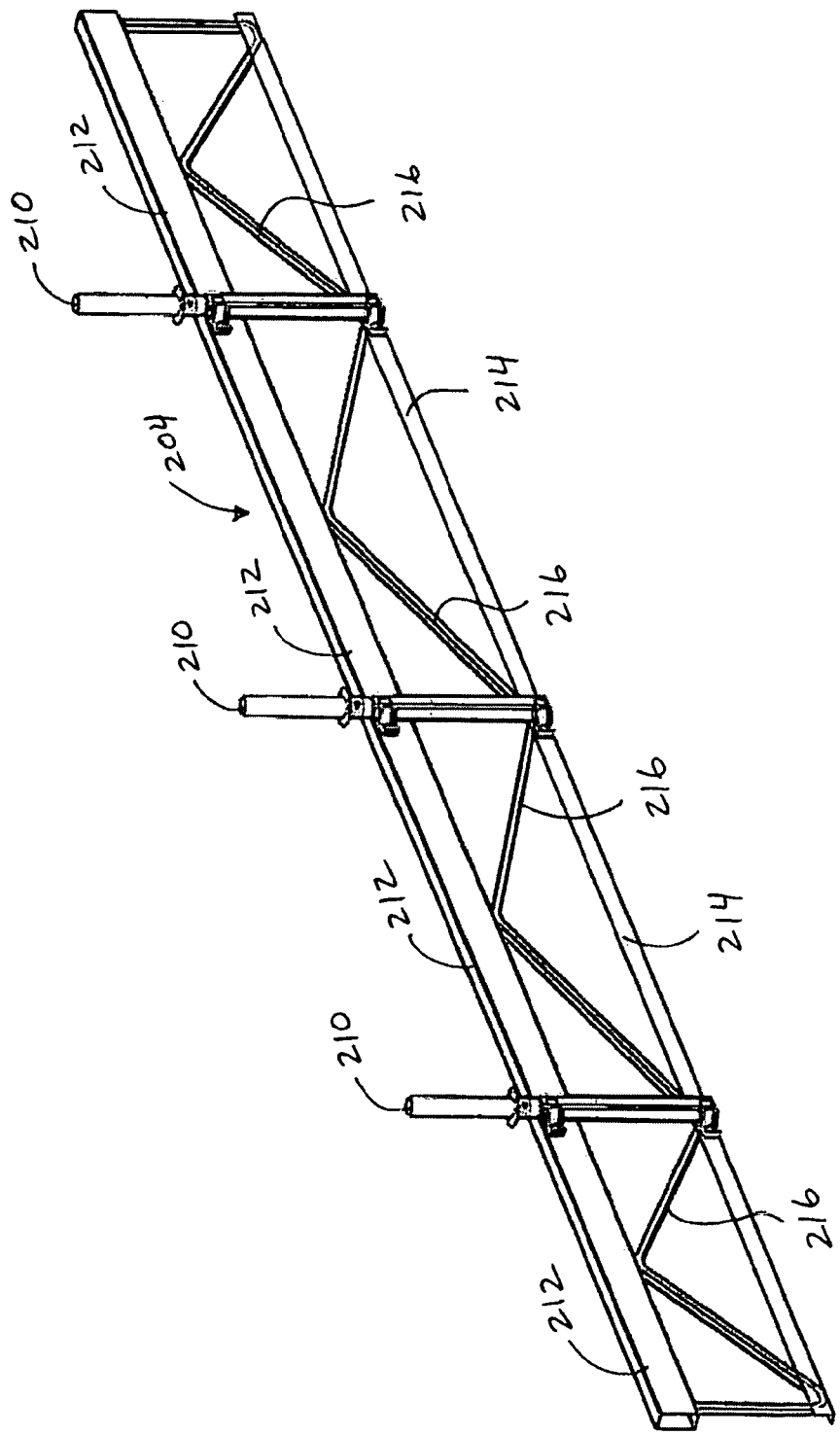
FIG. 8 is a perspective view of one embodiment of a side member of the Self-Ballasted Heliostat system of FIG. 6.

FIG. 8 illustrates a close-up view of one of the side members 204. Each side member 204 includes an upper rail 212, a lower rail 214 and one or more cross rails 216 for connecting the upper rail 212 to the lower rail 214. The connection of the upper rail 212, the lower rail 214 and the cross rails 216 forms a truss structure for rigidity and load distribution. Any one of the upper rails 212, the lower rails 214 and the cross rails 216 can be hollow to accommodate electrical components. In the disclosed example, the upper rail 212 is constructed as a hollow tube for passing electrical control and/or power cables. The stantions 210 can be affixed to the upper rail 212 and/or the lower rail 214. In the disclosed embodiment, the stantions 210 extend beyond the width of the side members 204 and are attached to both the upper rail 212 and the lower rail 214 when manufactured so as to vertically extend upward for mounting and supporting the mirrors 200.

Figure 7:
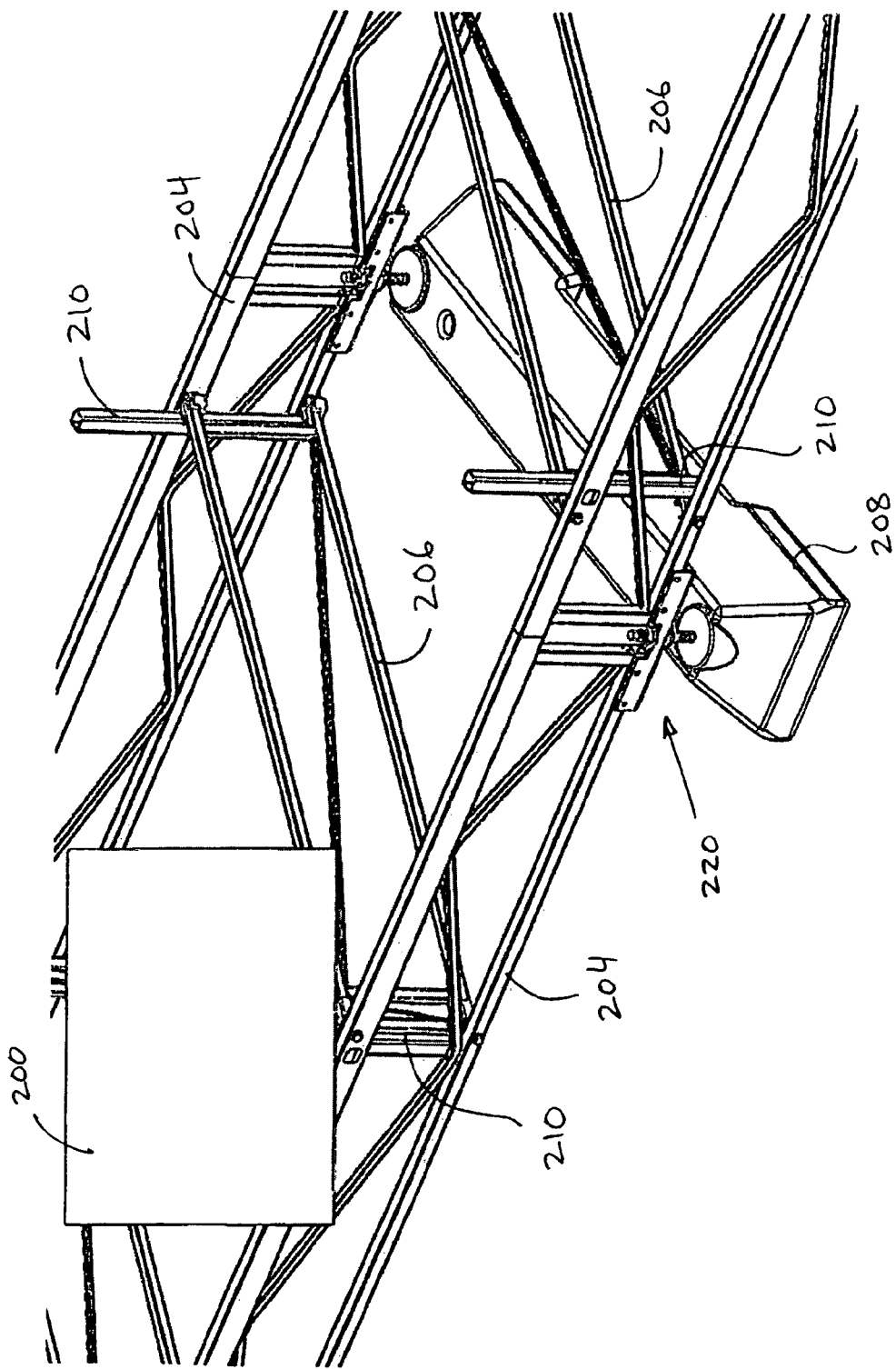
FIG. 7 is a perspective view of a portion the Self-Ballasted Heliostat system of FIG. 6.
Figure 9:
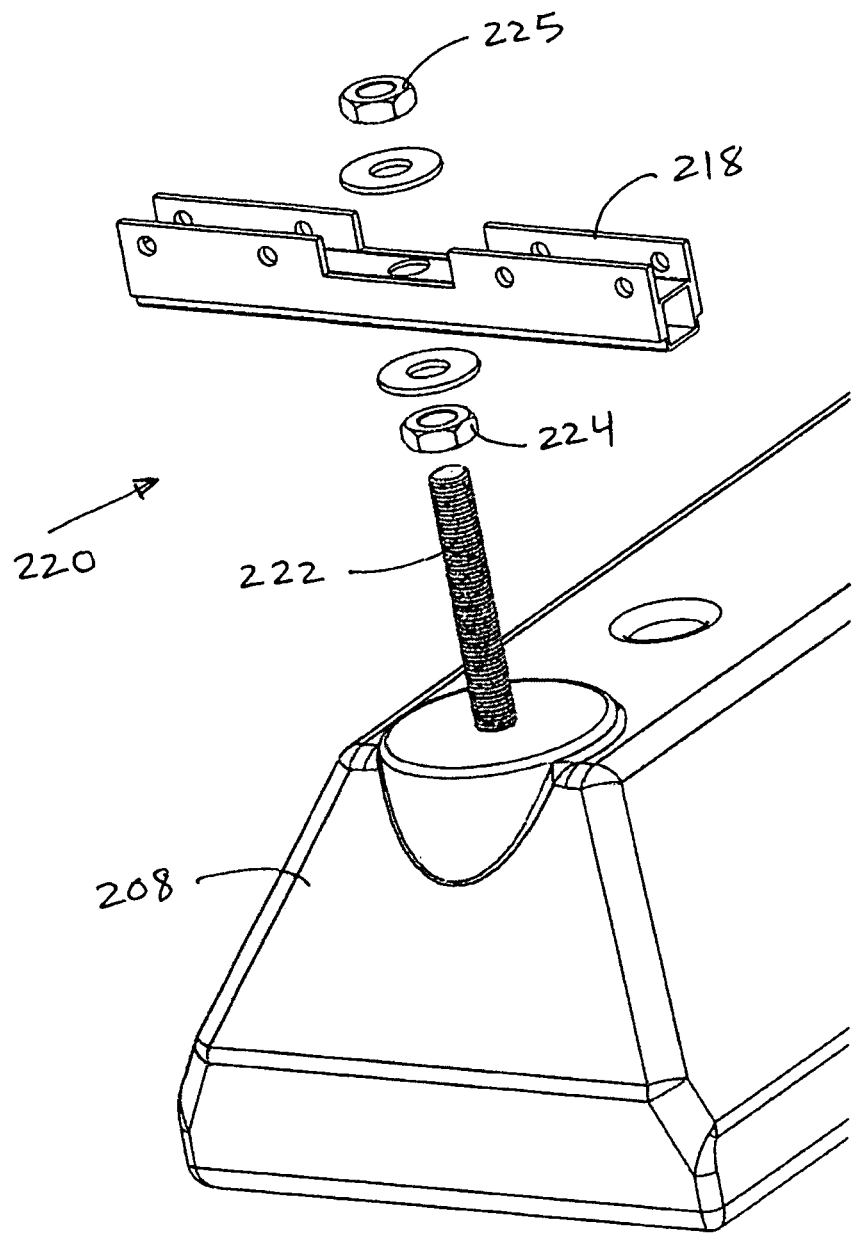
FIG. 9 is an exploded view of one embodiment of a ballast and height adjustment and mounting mechanism for mounting a frame of a solar collector system according to the present disclosure.

Illustrated in FIGS. 7 and 9, a first embodiment of the mechanism 220 for connecting each side member 204 to a ballast 208 is shown. Each side member 204 can be connected to a ballast 208 with saddles 218, which may be shaped to receive the lower rail 214 of each side member 204. For example, the saddles 218 of the disclosed embodiment are shown to be channel brackets that are sized to receive a lower part of the lower rails 214. Each saddle 218 can be a part of a height adjustment and mounting mechanism 220, by which the height of a side member 204 can be adjusted. Each height adjustment and mounting mechanism 220 includes a threaded rod 222 which engages the saddle 218. The threaded rod 222 accommodates a nut 224 which can be turned to vertically move the saddle 218 in order to vertically move the corresponding side member 204. Thus, by adjusting the height of the frame 202 at each ballast 208, multiple frames 202 in lineal rows can be adjusted for a desired height during installation to compensate for unevenness of the ground surface. In FIG. 7, adjacent side members 204 are shown to be mounted on a saddle 218 so as share a single ballast 208. However, depending on the length of each side member 204, one or more ballasts 208 can be provided between the ends of the side members 204 and coupled to the side members 204 with a corresponding height adjustment and mounting mechanism 220. The saddle 218 can be secured with another nut 225.

Figure 10:
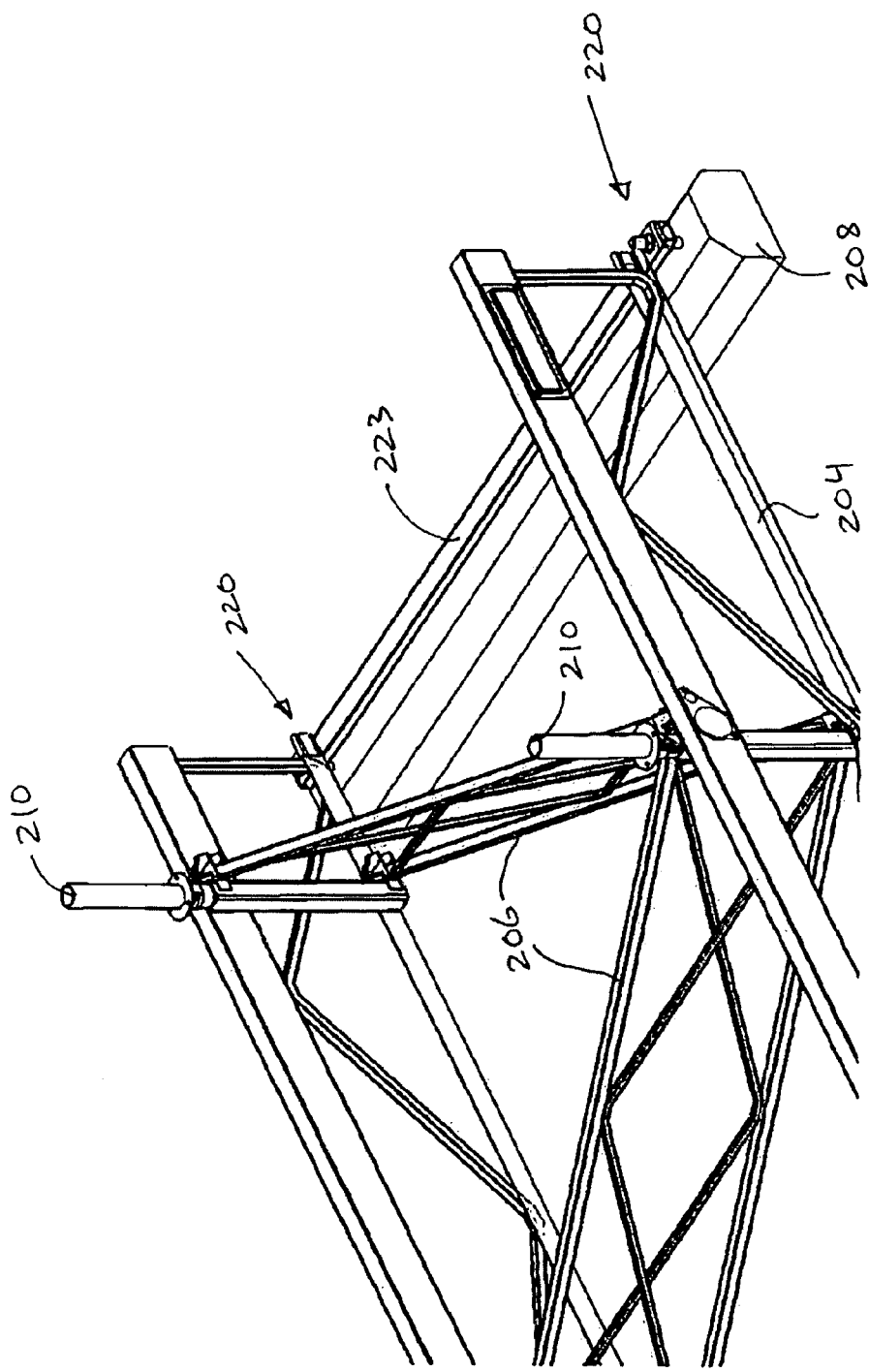
FIGS. 10 and 11 are perspective views of another embodiment of a ballast and height adjustment and mounting mechanism for mounting a frame of a solar collector system according to the present disclosure.
Figure 11:
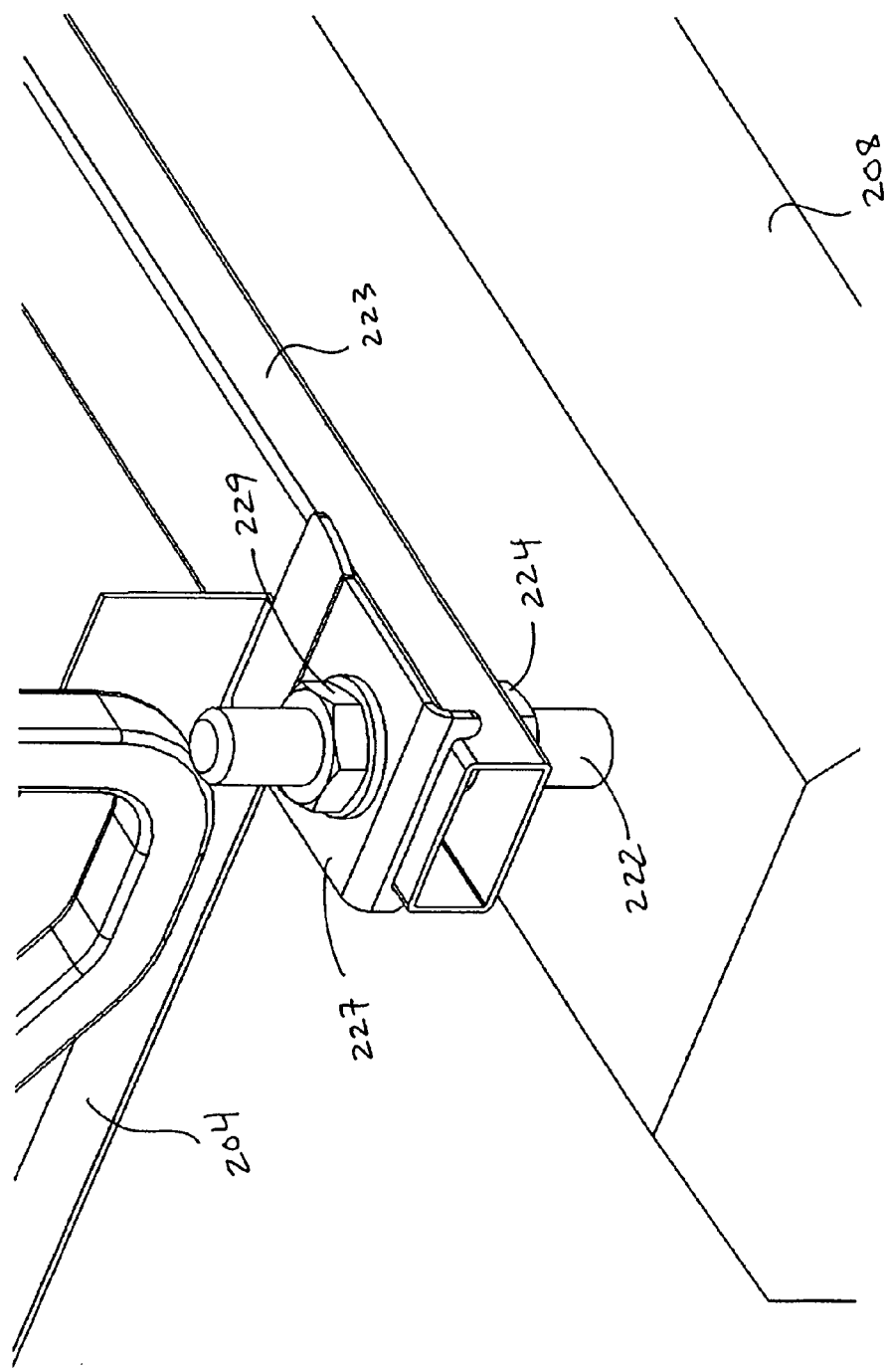

Referring to FIGS. 10 and 11 close up views of another embodiment of the mechanism 220 for connecting each side member 204 to a ballast 208 is shown. The mechanism includes the threaded rod 222 vertically extending from the ballast 208. Mounted on the threaded rod 222 is a horizontal alignment bar 223, the height of which is adjustable by the nut 224. The horizontal alignment bar 223 extends laterally along the ballast 208 so as to support opposing side members 204. A clasp 227 mounted on the alignment bar 223 engages the lower rail 214 of the side member 204. A nut 229 can press down on the clasp 227 when tightened to secure the lower rail 214 to the alignment bar 223.

Figure 12:
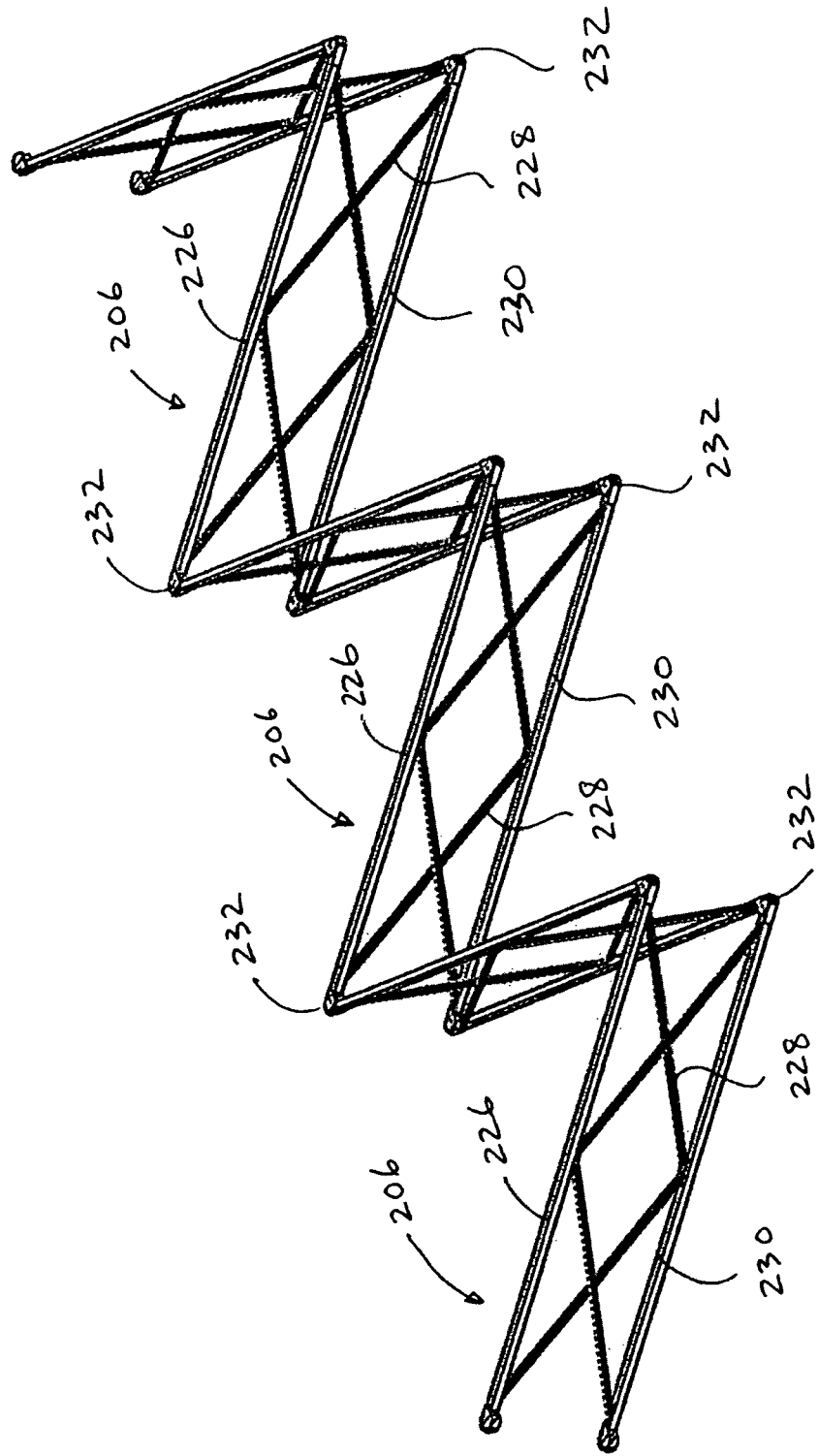
FIG. 12 illustrates is a perspective view of cross members of the Self-Ballasted Heliostat system of FIG. 6.
Figure 13:
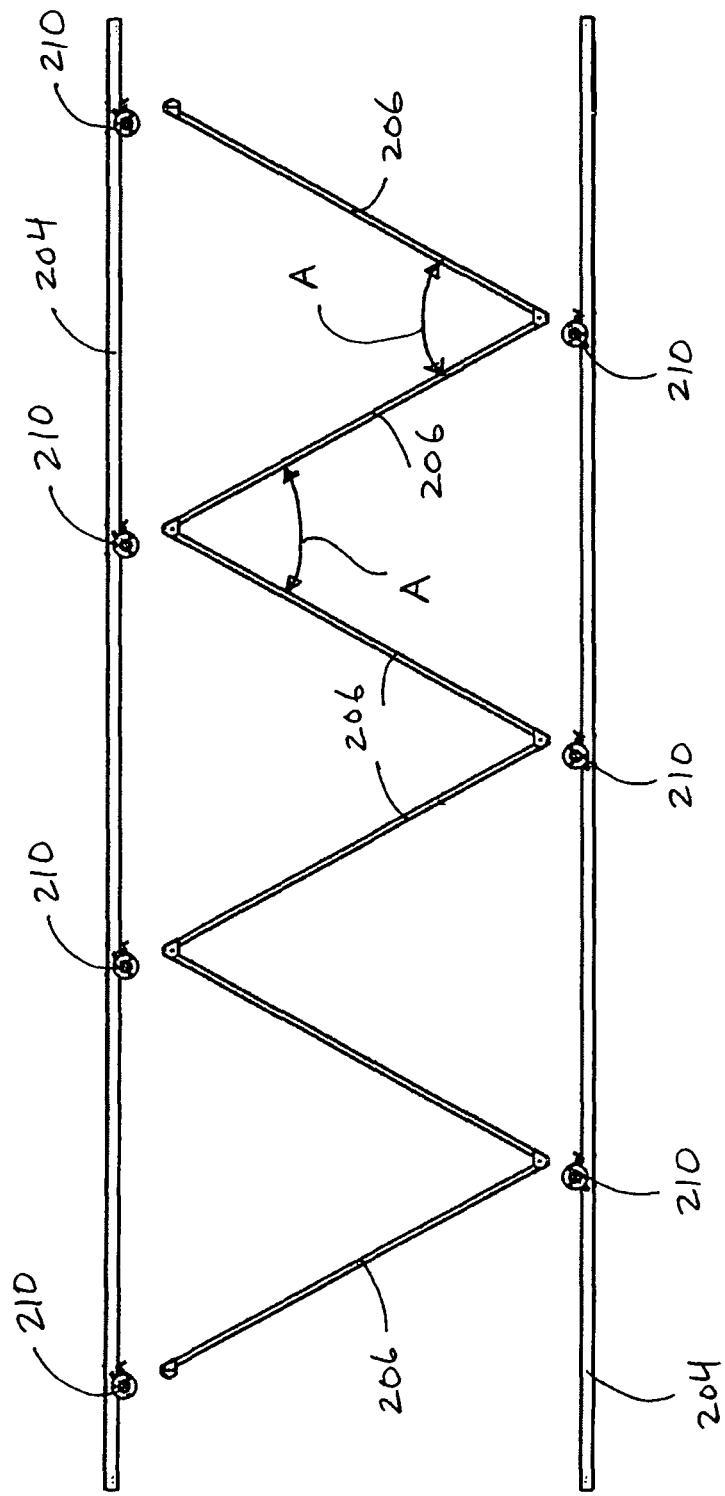
FIG. 13 is a top partially exploded view of cross members and side members of the Self-Ballasted Heliostat system of FIG. 6.
Figure 14:
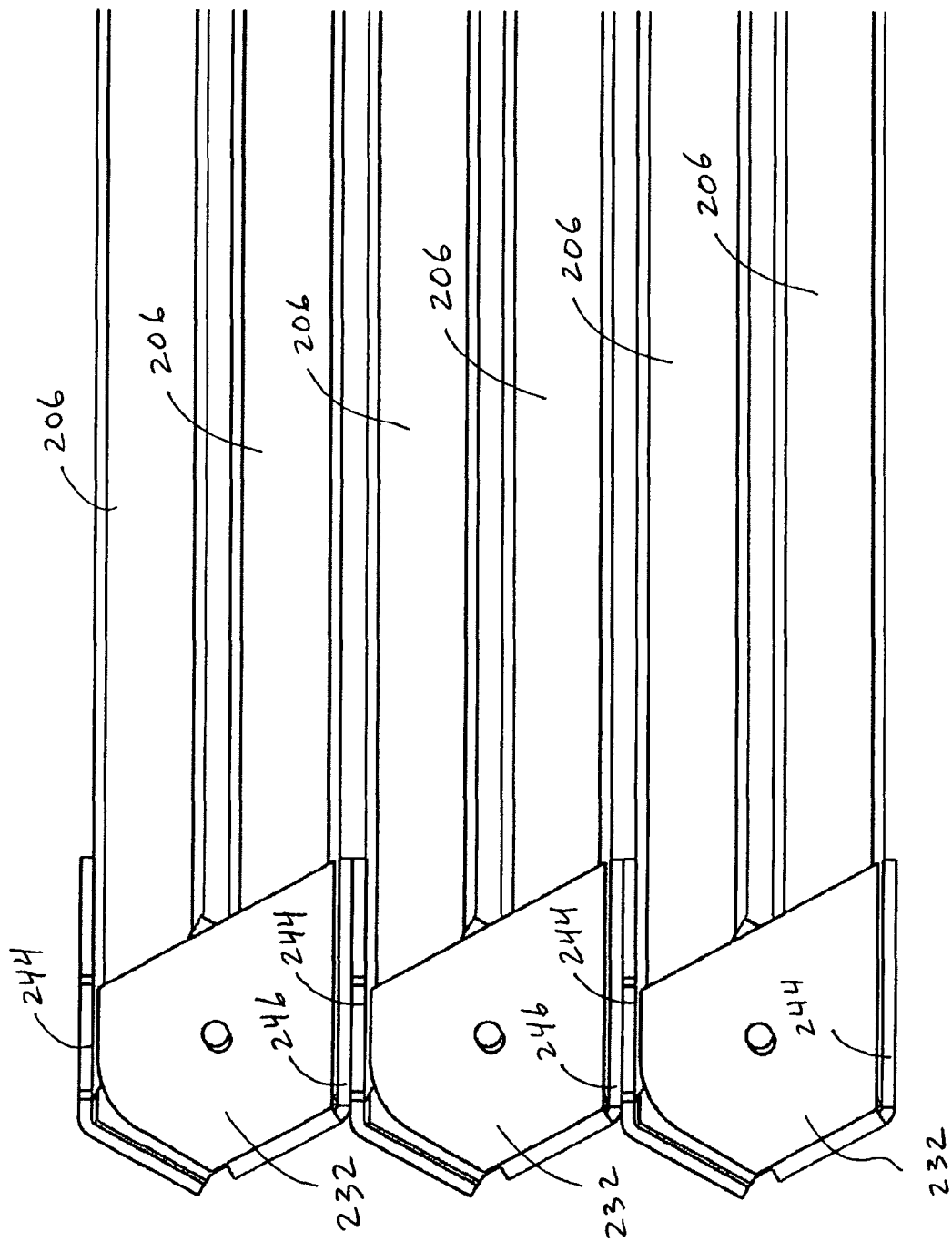
FIG. 14 is a top view of a portion of cross members of the Self-Ballasted Heliostat system of FIG. 6 shown in a shipping configuration.

Referring to FIG. 12-14, cross members 206 are shown. Each cross member 206 may include only a single rail. In the disclosed embodiment, each cross member 206 includes an upper rail 226, a lower rail 228 and cross rails 230 connecting the upper rail 226 to the lower rail 228 to form a truss structure for rigidity and load distribution. Each cross member 206 can be pivotally connected to an adjacent cross member 206 with a hinge 232, which is described in detail below. The connection of adjacent cross members 206 with the hinge 232 forms a structure that can be collapsed into a shipping configuration and expanded in an accordion style for installation. In the shipping configuration as shown in FIG. 14, the cross members 206 can be parallel or close to parallel to one another with the ends thereof pivotally connected with hinges 232.

Figure 15:
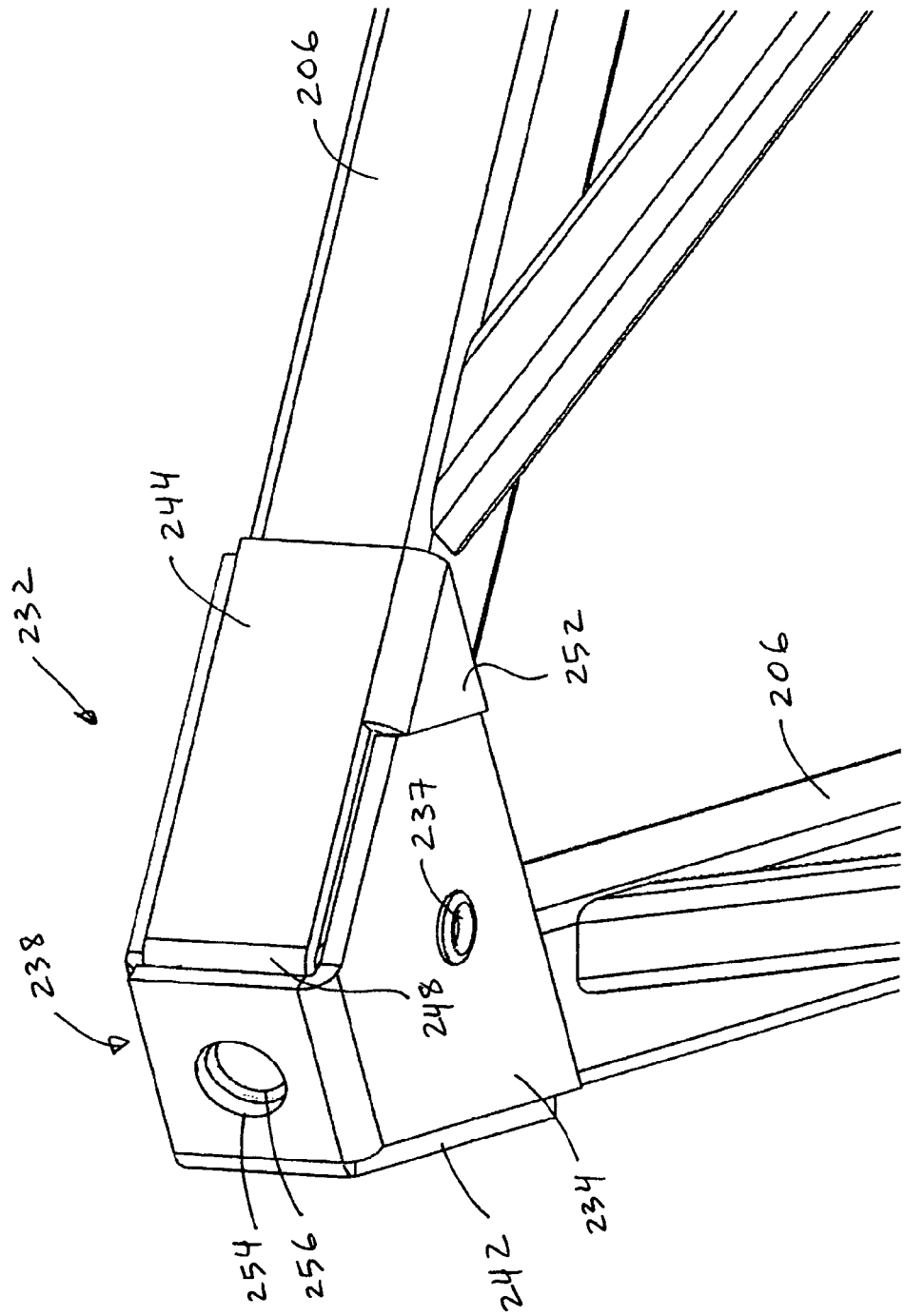
FIG. 15 is a perspective view of a hinge for coupling the cross members of the Self-Ballasted Heliostat system of FIG. 6.
Figure 16:
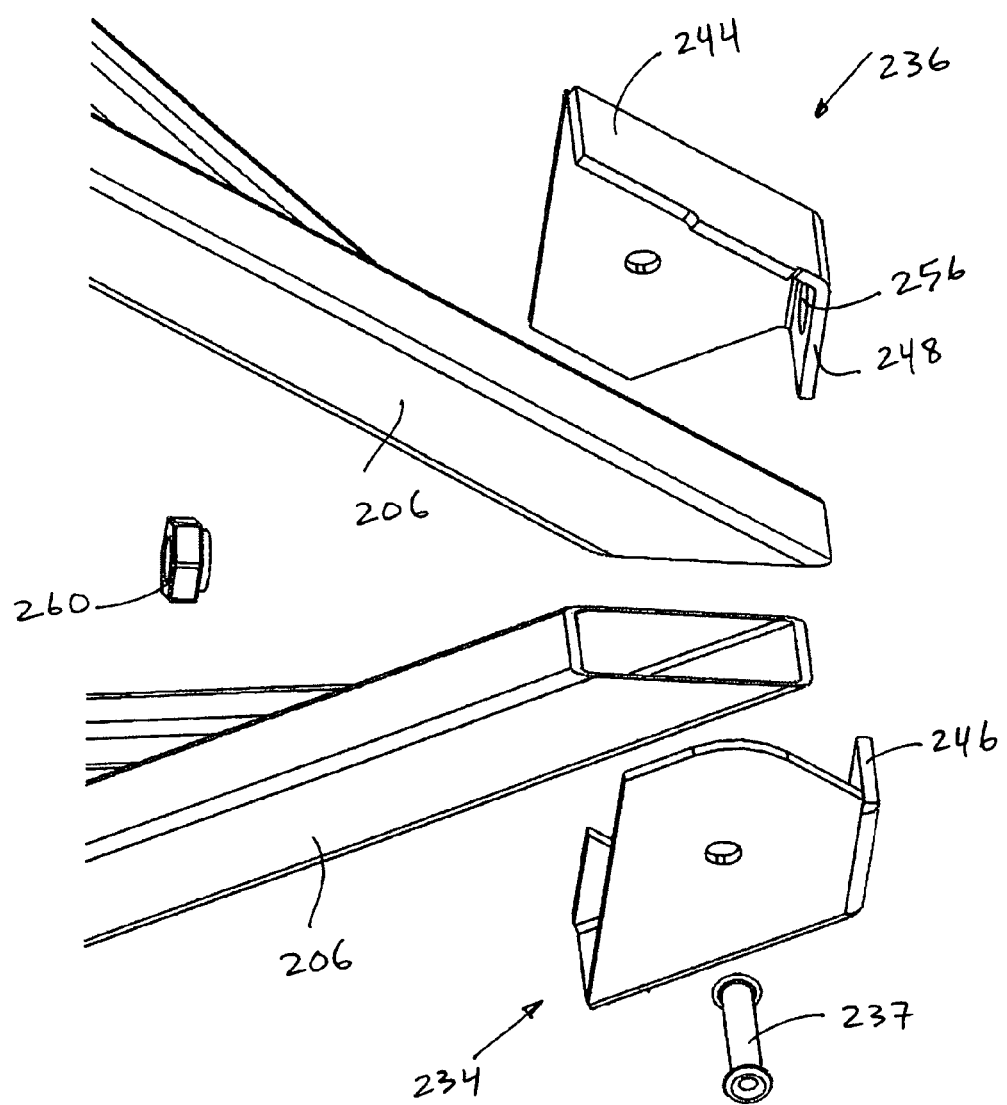
FIG. 16 is an exploded view of the hinge of FIG. 15.
Figure 17:
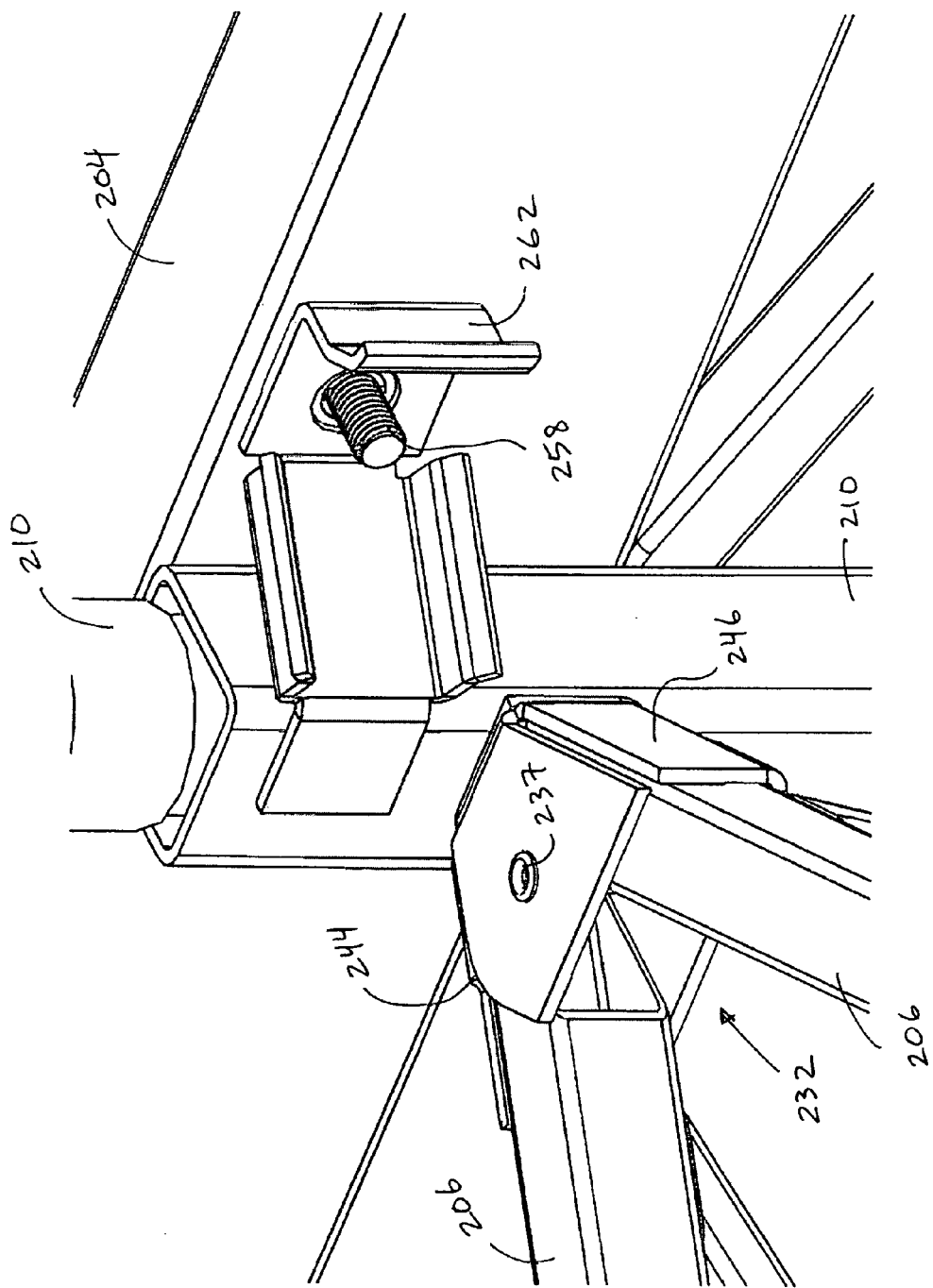
FIG. 17 is a perspective view of cross members, hinge and side members of the Self-Ballasted Heliostat system of FIG. 6, shown in a configuration prior to assembly.
Figure 18:
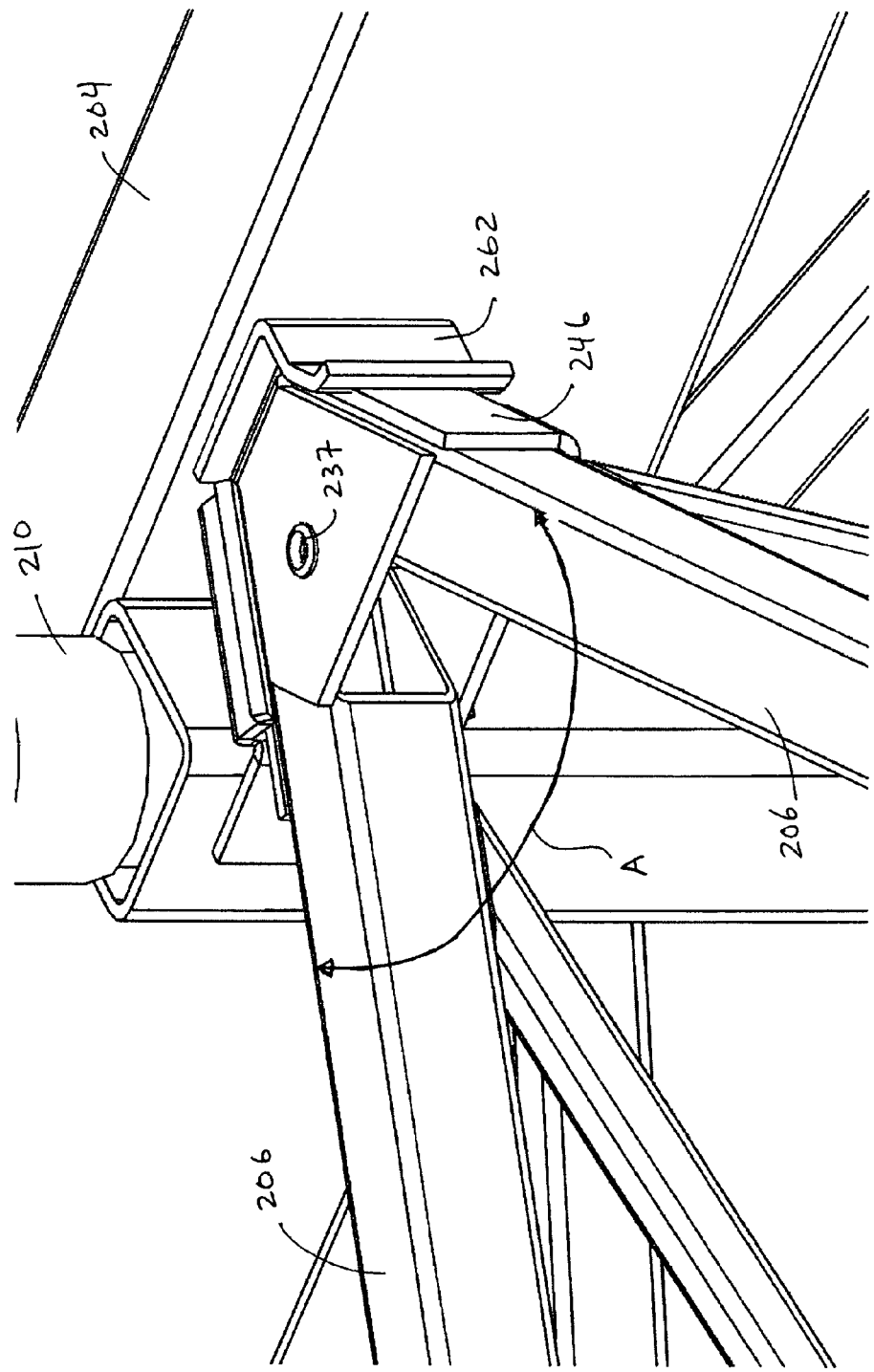
FIG. 18 is a perspective view of cross members, hinge and side members of the Self-Ballasted Heliostat system of FIG. 6, shown in an assembled configuration.

Illustrated in FIGS. 15 and 16 are a close up and exploded view, respectively, of one embodiment of the hinge 232 that pivotally couples two cross members 206 together. The hinge 232 has a first portion 234 and a second portion 236 that rotate about a common bolt 237 or rod. Each portion includes a receiver size and shaped so that a cross member 206 is inserted and fixedly attached by any known methods such as welding or with fastener. The outer two sides 242 and 244 of the hinge 232 are oriented relative to each other at an angle A (shown in FIGS. 13 and 18) when the hinge is in the open position. In the exemplary embodiments discussed herein, the angle A can be 60 degrees so that the cross members and the side members form isosceles triangles, with the stantions 210 forming the vertices of the triangles. The side 242 is formed by the first portion 234 and the side 244 is formed by the second portion 236. Also, in the open position, a top 238 is formed by overlapping sections 246 and 248 of the first portion 234 and the second portion 236, respectively. A cross member 206 is fixedly attached to the side 242 and an adjacent cross member 206 is attached to the side 244.

Referring to FIG. 14, in the closed position of the hinge 232, the side 244 is oriented relative to the side 242 such that the cross members 206 run substantially parallel to one another and may be in contact with each other. The closed position of the hinges 232 represents the shipping configuration of the cross members 206. Referring to FIG. 15, when the hinge 232 is opened, the cross members 206 pivot relative to each other about the bolt 237 until the sections 246 and 248 of the hinge 232 overlap on top 238 of the hinge 232. The overlapping of the sections 246 and 248 engage to prevent the cross members 206 from being opened up any further beyond the angle A of the hinge 232. Accordingly, the angle A represents a predetermined angle for the cross members 206 in the deployed position. The hinge 232 may include one or more hard stops 252 (shown in FIG. 15), which can be formed from abutting surfaces that enable the hinge 232 to be opened to the precise predetermined angle A.

Referring to FIGS. 15-18, each of the sections 246 and 248 includes an aperture 254 and 256, respectively, which align in the open position of the hinge 232. The hinge 232 can be connected to a side member 204 near a station 210 by a bolt 258 (shown in FIG. 17) of the side member 204 being received in the apertures 254 and 256 and fastened to the side member 206 with a nut 260 (shown in FIG. 16) engaging the bolt 258. A compression coupling 262 attached to the side member 204 (shown in FIGS. 17 and 18) can be positioned between the side member 204 and can provide a compression force that wedges the hinge 232 tightly against the side member 204, thereby inhibiting movement of the cross member 206 after installation.

The cross members 206 can be pivotably linked to one another prior to shipment to the installation site. The cross members 206 can be affixed to the side members 204 by anchoring the hinges 232 to the side members 204 at or near the stations 210, thereby providing lateral rigidity to inhibit unintended movement of the mirrors 200. The hinges 232 are attached to the side members 204 close to the stations 210 because the portions of the side members 204 where the stations 210 are attached are more rigid as compared to portions that are farther from the stations 210.

The side members 204, the cross members 206, and the ballasts 208 can be delivered to a site for installation. The side members 204 are mounted on the ballasts 208 with the height adjustment and mounting mechanism 220 as described above. The cross members 206 are in the shipping configuration when delivered. The cross members 206 can be placed in between the side members 204 and pulled apart from the shipping configuration by one or more workers to the deployed configuration. The hinges 232 are then affixed to the side members 204 as described above. Alternatively, pairs of cross members 206 can be pulled apart to the deployed configuration and the corresponding hinges 232 thereof affixed to the side members 204 in sequence rather than pulling all of the cross members 206 apart and then affixing the hinges 232 thereof to the side members 204. The mirrors 200 (i.e. the heliostats) can then be mounted on the stations 210.

Referring to FIGS. 19-27 a third embodiment of the SBH system is shown. Like the above-described embodiments, the third embodiment includes a plurality of low aspect-ratio frames that are installed above ground and depend primarily on the weight of the frame and mirrors to maintain the SBH system in place on the ground without the need for any part of the SBH system to penetrate the ground.

Figure 19:
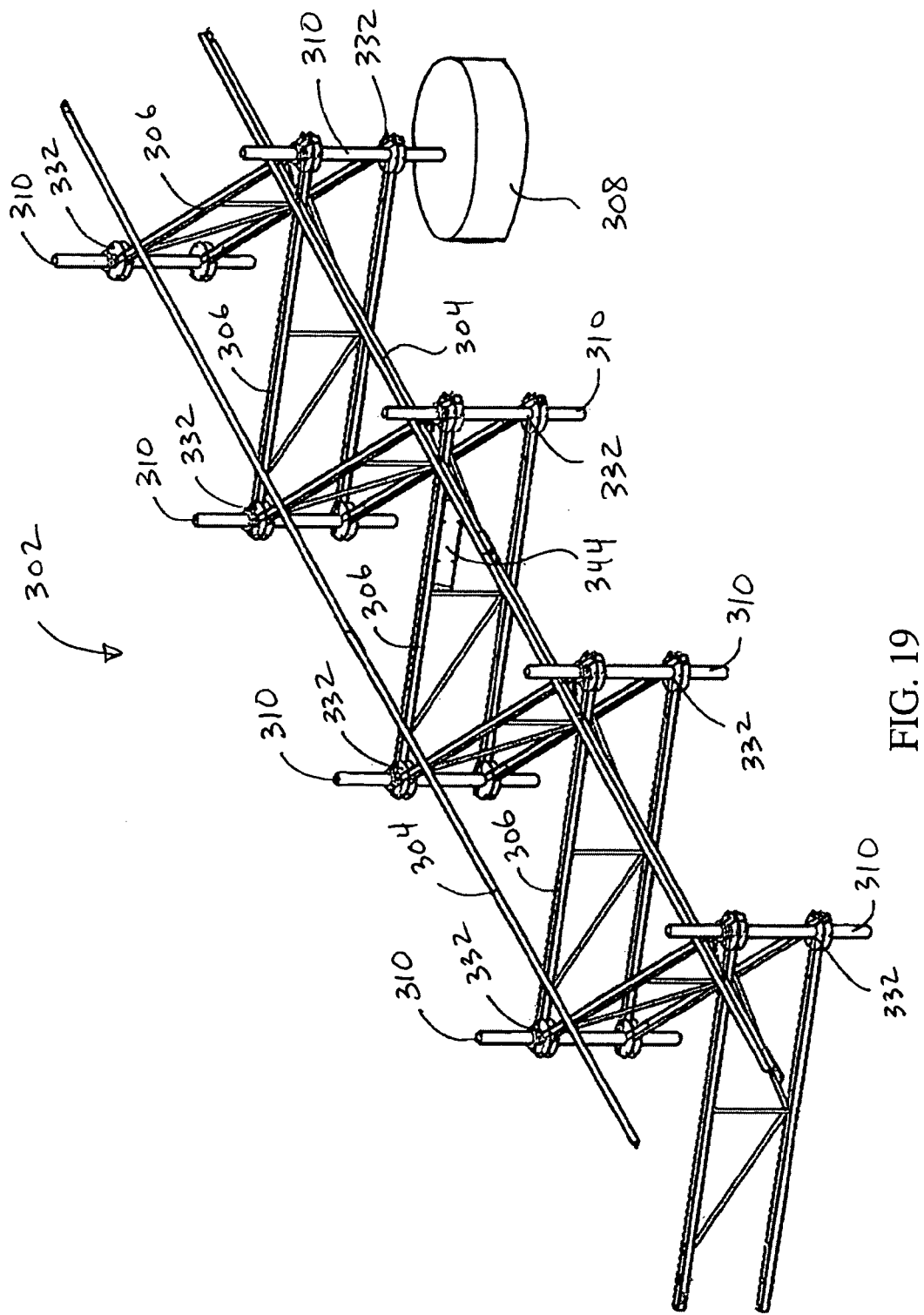
FIG. 19 is a perspective view of another embodiment of a Self-Ballasted Heliostat system for a solar collector system according to the present disclosure.
Figure 20:
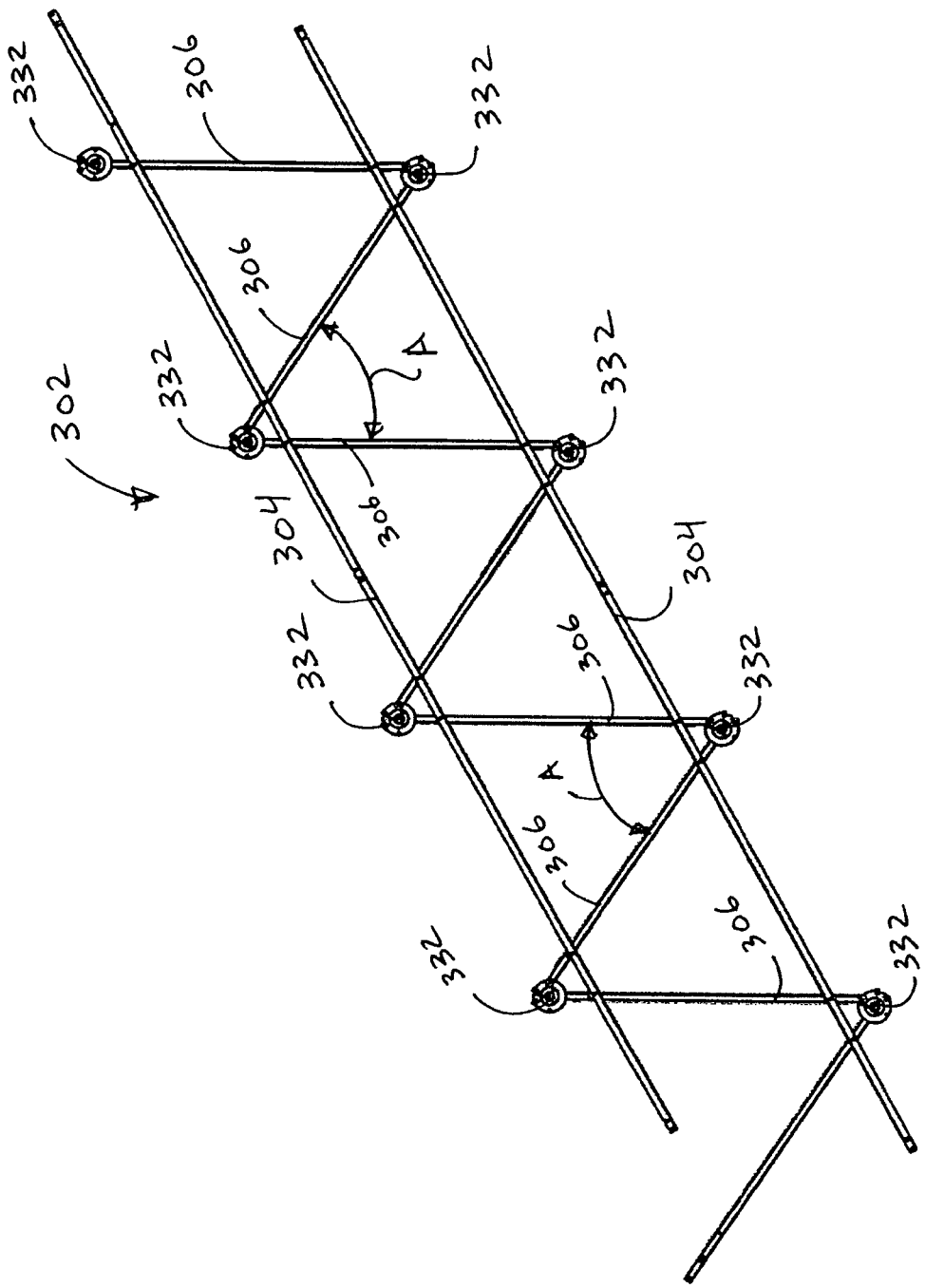
FIG. 20 is a top view of the Self-Ballasted Heliostat system of FIG. 19.

The SBH system of the third embodiment includes a plurality of mirrors (not shown) moveably mounted on a frame 302. Each frame 302 includes a plurality of side members 304 and a plurality of cross members 306 connecting the side members 304. The cross members 306 are pivotally connected together in an "accordion style." Additionally, the pivotal accordion arrangement of the cross members 306 allows collapsing of the cross members 306 to a shipping configuration and deployment thereof onsite for assembly. Each SBH system is supported on the ground by one or more ballasts 308 (a single ballast 308 is shown in FIG. 19), which are configured to maintain the SBH system in a fixed position on the ground with little or no ground penetration. As described below, the ballasts 308 can be formed on site by pouring concrete in ballast bags 350 coupled to the frame 302. Each mirror is mounted to a corresponding frame 302 with a station 310 vertically extending from the frame 302. The stations 310 are mounted on the ballasts 308.

Figure 21:
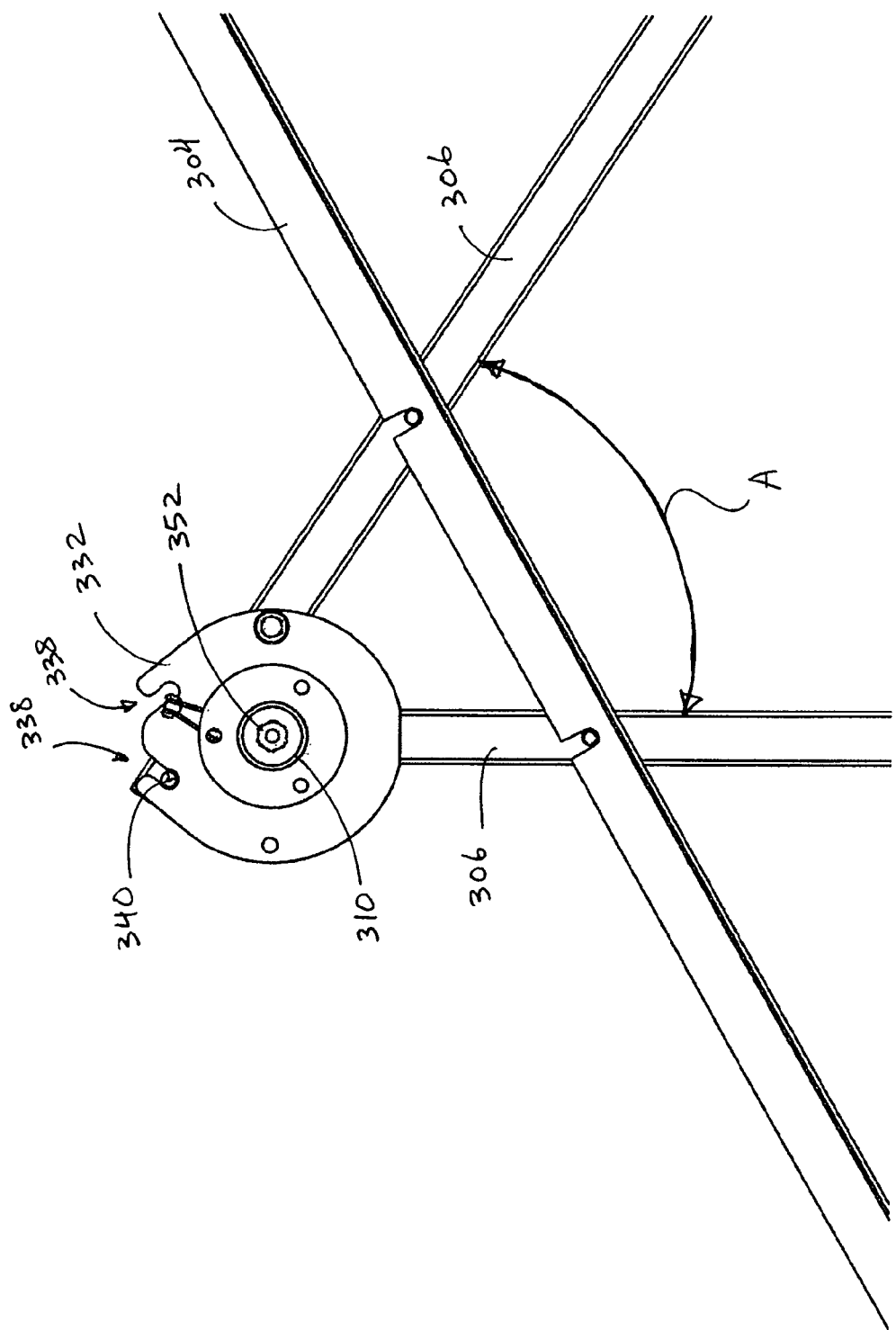
FIG. 21 is a top view of a hinge of the Self-Ballasted Heliostat system of FIG. 19.
Figure 22:
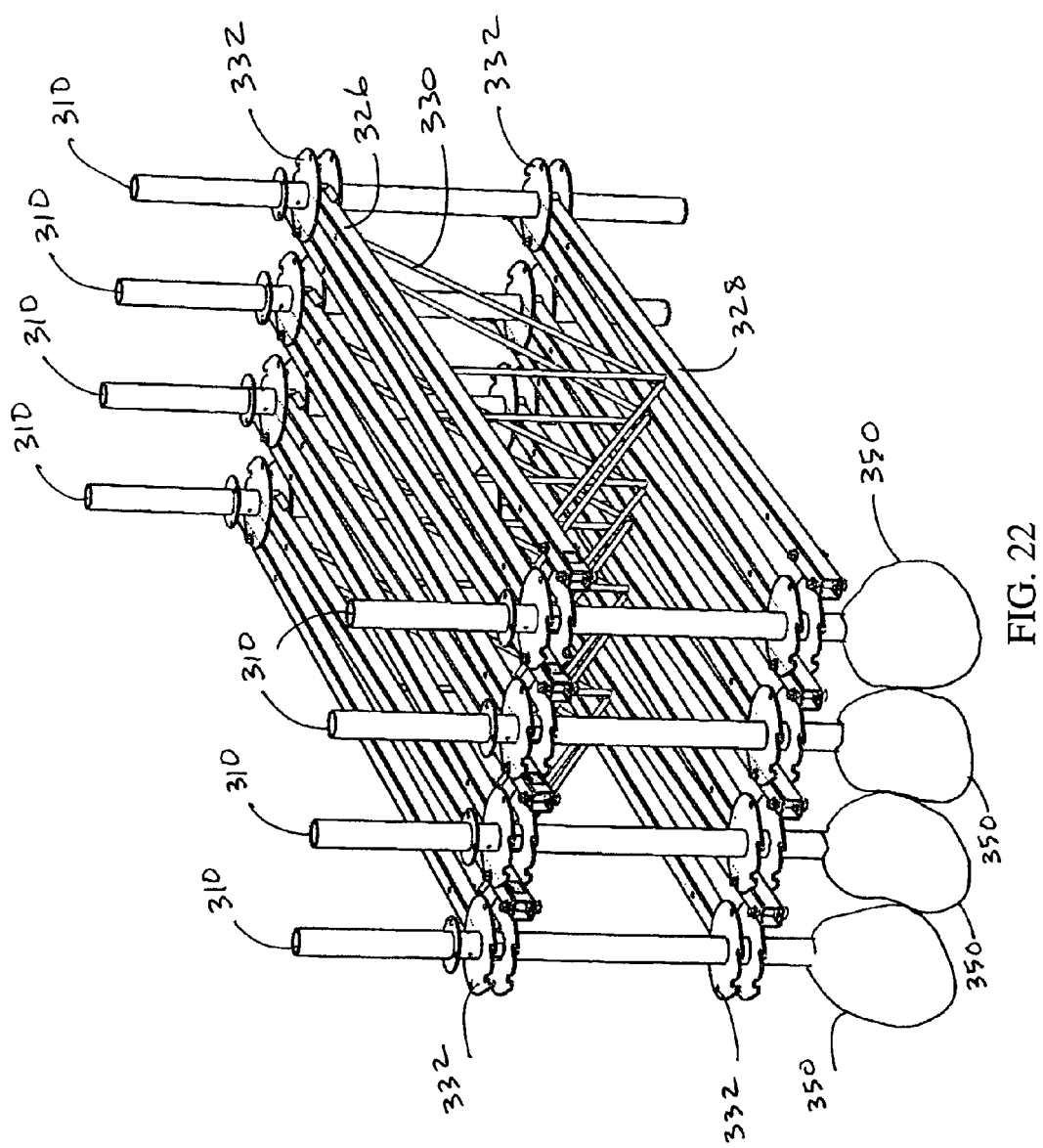
FIG. 22 is a perspective view of cross members of the Self-Ballasted Heliostat system of FIG. 19 shown in a shipping configuration.

The side members 304 include one or more top rails 304 that are affixed to the cross members 306 as described below. Referring to FIG. 22, each cross member 306 includes an upper rail 326, a lower rail 328 and a plurality of cross rails 330 connecting the upper rail 326 to the lower rail 328 in order to form a truss structure for rigidity and load distribution. The cross members 306 are pivotally connected to the stations 310 with hinges 332, which are described in detail below. Accordingly, the cross members 306 and the stations 310 form an accordion style structure which can be deployed from a compact shipping configuration shown in FIG. 20 to an expanded deployed configuration shown in FIG. 19. After the cross members 306 are deployed, the stations 310 are mounted on the ballasts 308. As shown in FIG. 21, the cross members 306 are then further secured with the top rails 304 that lie on top of and bolt to the upper portion of each cross member 306.

Each station 310 includes a pair of hinges 332 fixedly attached thereto and vertically spaced apart on the station 310 to receive the upper rail 326 and the lower rail 328 of a pair of adjacent cross members 306. Each hinge 332 is formed by a pair of spaced apart plates 336 for receiving an end of the upper rail 326 or a lower rail 328 of a cross member 306 in between the two plates 336.

Figure 23:
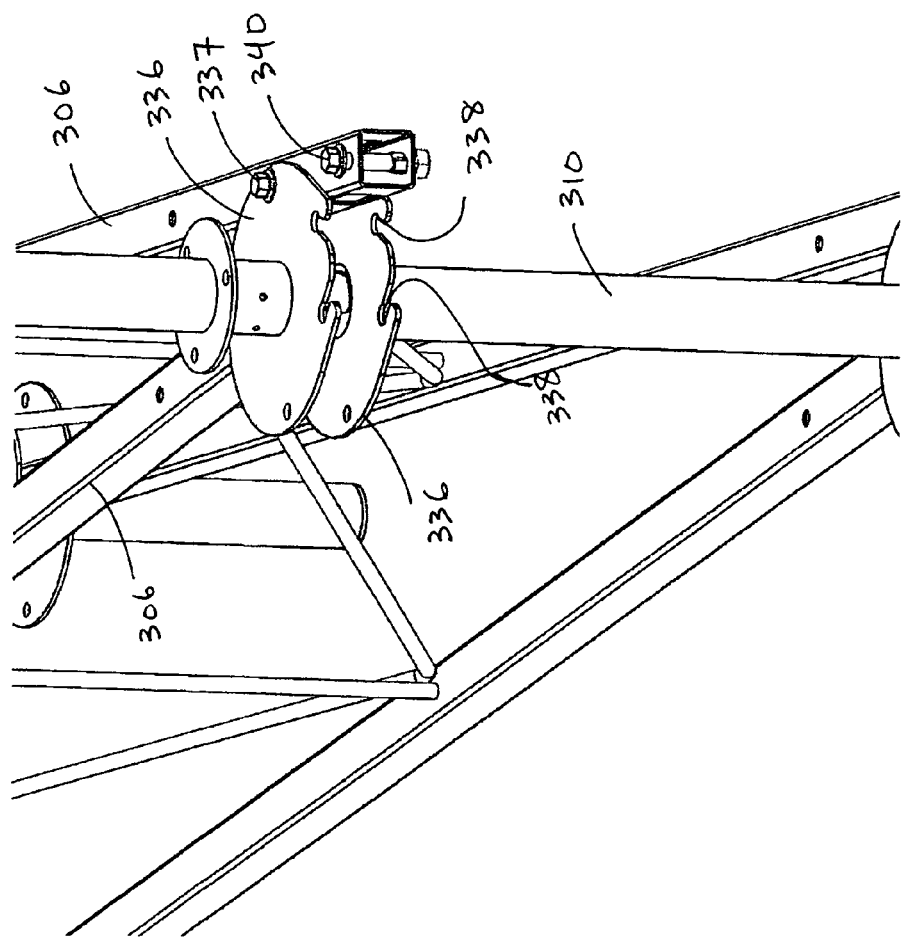
FIG. 23 is a side perspective view of the hinge of FIG. 21.
Figure 24:
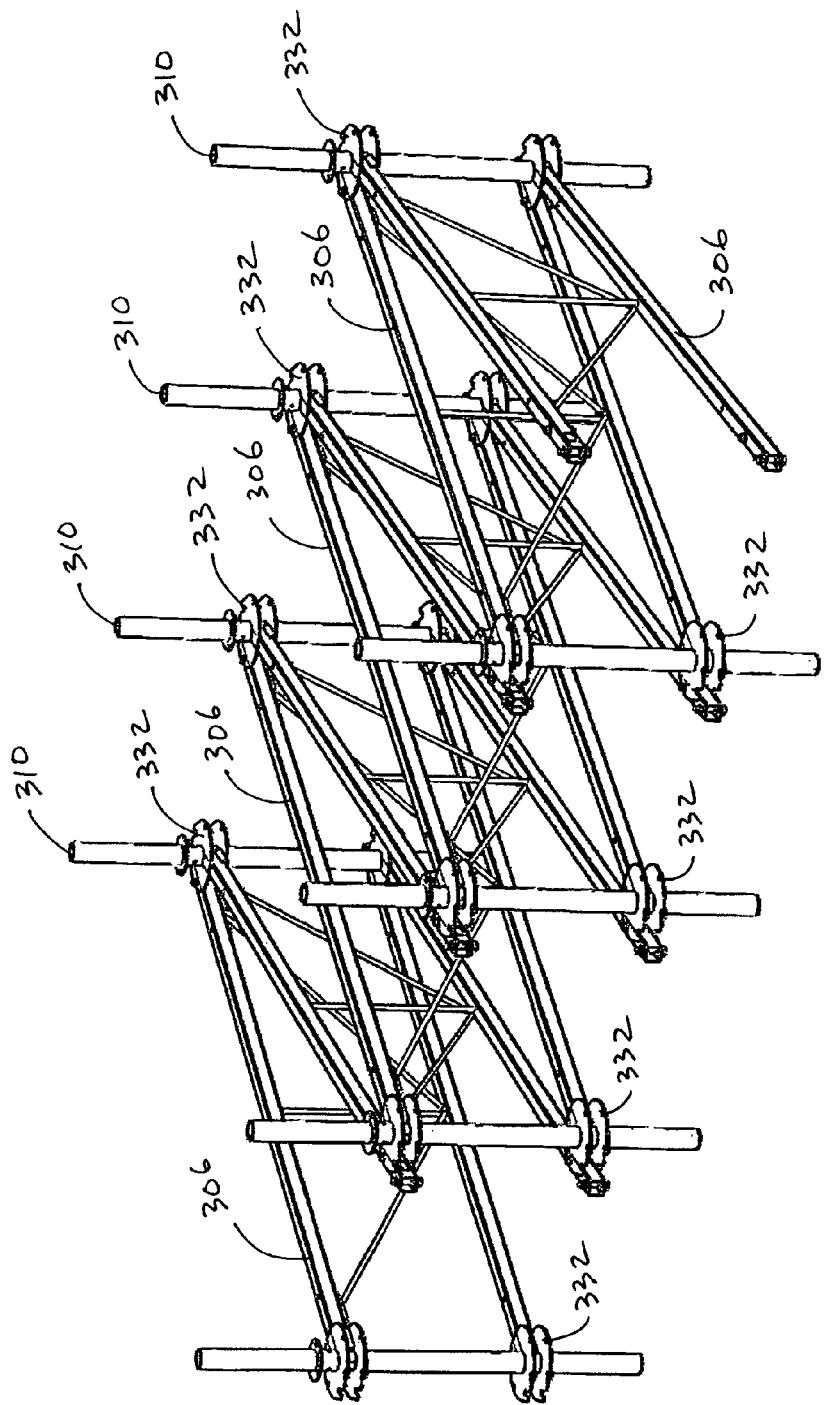
FIG. 24 is a perspective view of the cross members of FIG. 22 shown in a partially deployed position.
Figure 25:
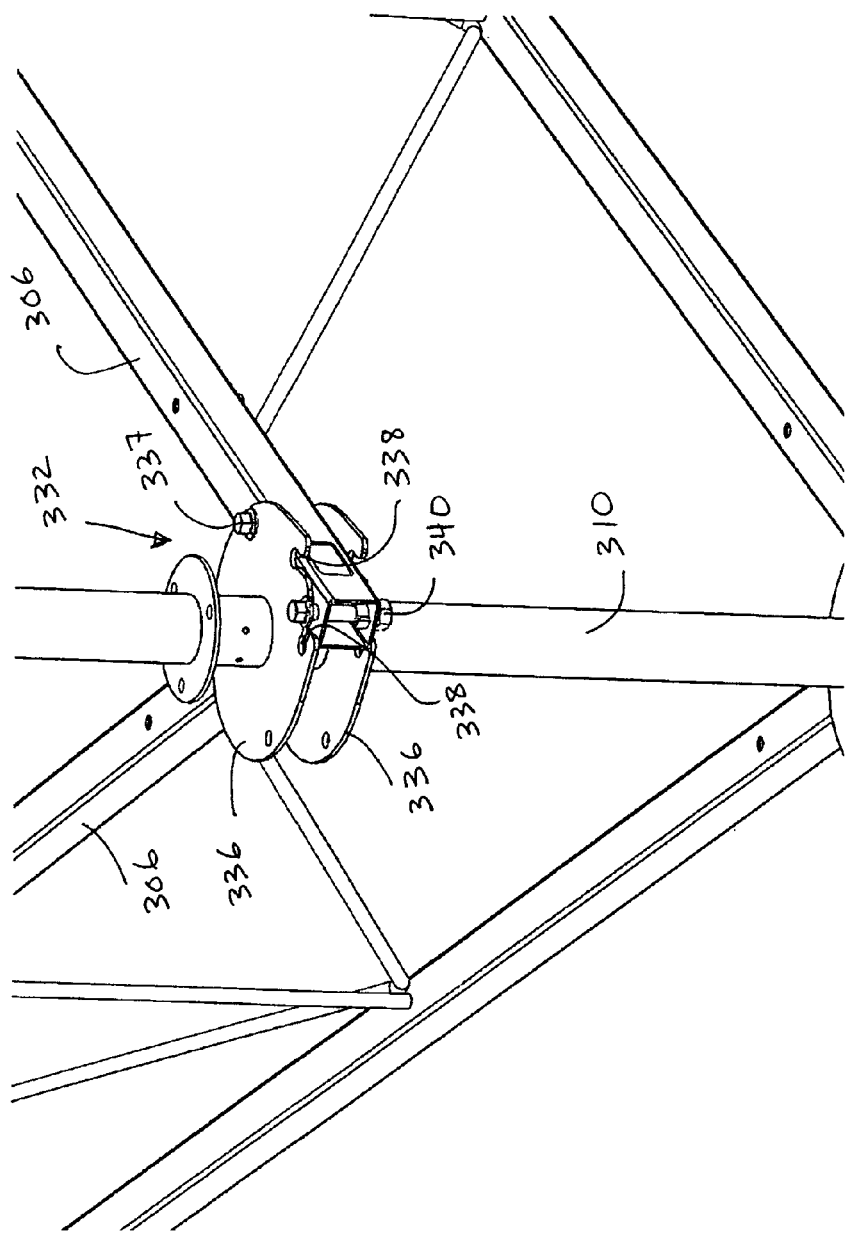
FIG. 25 is a side perspective view of the hinge of FIG. 19, shown in a partially deployed position.
Figure 26:
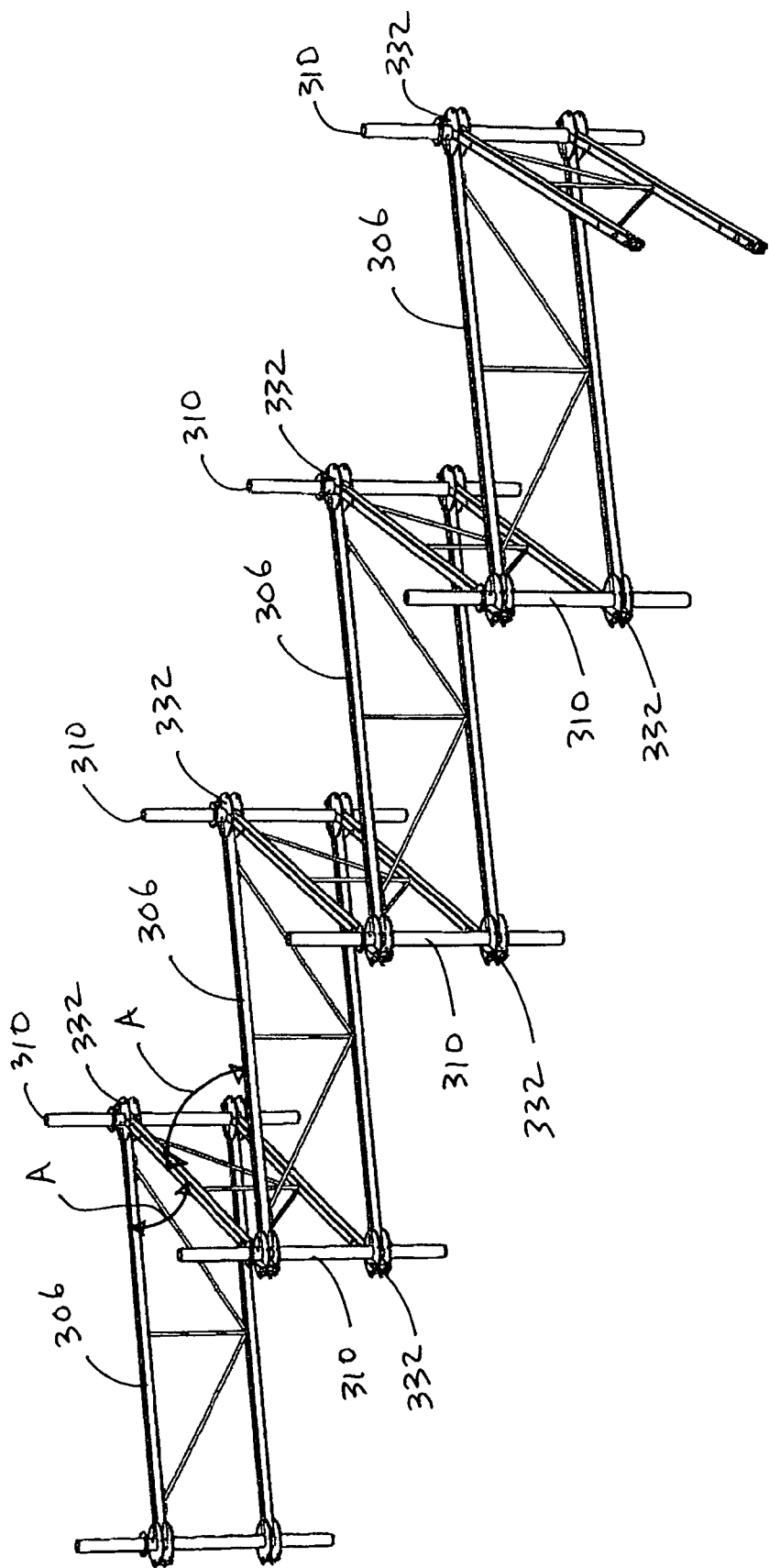
FIG. 26 is a perspective view of the cross members of FIG. 22 shown in a fully deployed position.
Figure 27:
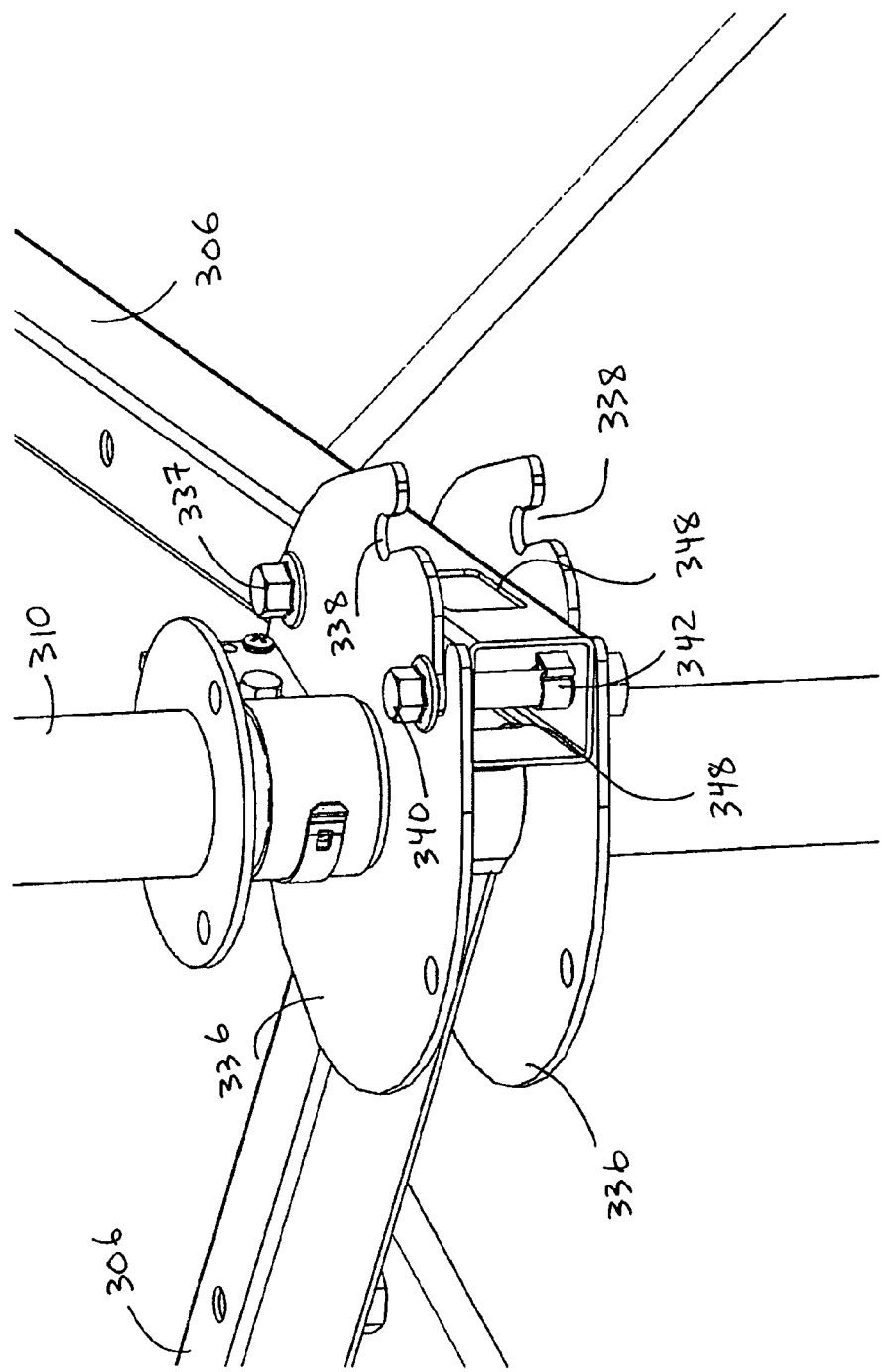
FIG. 27 is a side perspective view of the hinge of FIG. 21, shown in the fully deployed position of the cross members of FIG. 22.

As shown in FIGS. 23, 25 and 27, each hinge 332 provides pivoting of a pair of adjacent cross members 306 relative to each other. In the disclosed embodiment, an end of one cross member 306 is affixed in between the plates 336, while an end of the adjacent cross member 306 is pivotable in between the plates 336 about a first bolt 337 attached to the plates 336. Each plate includes a slot 338 for receiving a second bolt 340 positioned at the end of the pivotable cross member 306. As shown in FIGS. 22 and 23, in the shipping configuration of the cross members 306, the second bolt 340 is outside the slot 338. In order to expand a cross member 306 in an accordion style relative to an adjacent cross member 306, the second bolt 340 is placed in the slot 338 by pivoting the pivotable cross member 306 away from the fixed cross member 306 as shown in FIGS. 24 and 25. Further pivoting of the pivotable cross member 306 causes the second bolt 340 to enter and move within the slots 338 of the plates 336 until reaching the end of the slots 338 as shown in FIGS. 26 and 27. The length of the slots 338 can be determined so that when the second bolt 340 reaches the end of the slot 338, the adjacent cross members 306 are at the predetermined angle A. In the exemplary embodiments discussed herein, the angle A can be 60 degrees so that the cross members and the side members form isosceles triangles, with the stations 210 forming the vertices of the triangles. The pivotable cross member 306 can then be locked in position by securing the second bolt 340 in the slot 338. In some embodiments, the bolt 340 contains a larger diameter tapered portion (not shown) below the bolt head to inhibit the second bolt 340 from sliding within the slot 338 after it is tightened down. A spring clip 342 may be used to elevate the head and the tapered portion of the second bolt 340 to clear the narrow section of the slot 338 until the cross members 306 are moved into their final positions and the second bolts 340 are tightened down. Each of the plates 336 of the hinge 332 may include a second slot 338 symmetrically located around the center line of the plates 336. The pair of slots 338 on the hinge 332 allow a single hinge part to be used throughout the SBH system.

Referring to FIGS. 22-27, various views of a station 310 with the hinges 332 that couple the distal ends of the cross members 336 are shown. One or more of the upper rails 326, the lower rails 328 and the cross rails 330 of the cross members 306 can be tubular for supporting electrical components therein. The electrical components may be, for example, housing control and/or power cables running between stations 310. For example, as shown in FIG. 19, an electrical box 344 may be incorporated into one or more of the cross members 306, thereby providing access to mirror control systems that are ganged together. As shown in FIG. 27, at the point where the cross members 306 meet a station, cables (not shown) running through the cross members 306 can be passed through a hole 348 in the distal end of the cross member 306 and passed into a cavity in a station 310 and through the adjacent cross member 306. Thus, each mirror of the frame 302 can be wired together using the frame 302 itself as the electrical conduit. An electrician can later wire a mirror to the electrical system by accessing the wiring behind an injection molded cover plate integrated into the station 310. In another embodiment, the top rail 304 can be a hollow tube through which wires/cables (not shown) extend from one mirror to another.

The SBH system can be deployed and installed by initially deploying the cross members 306. The cross members 306 can be expanded from the shipping configuration and locked at the predetermined angle A at the deployed configuration with the hinges 332 as described above. The cross members 306 are then secured at the predetermined angle by securing the second bolts 340 in the slots 338. After the cross members 306 are secured, the top rails 304 are connected to the cross members 306 and bolted thereto. To ground the frame 302, concrete can be poured in ballast bags 350 (schematically shown in FIG. 22) attached to the bottom of each station 310. Thus, the concrete cures at the base of each station 310 to secure the frame 302 and the mirrors to the ground. In some embodiments, the stations are placed in biodegradable bags into which the concrete is poured. The footprint of bag and the height of the concrete then determines the amount of ballast applied.

To adjust the height of each station 310 after installation, in one embodiment, the station 310 and the mounting plates 336 include a threaded bolt (not shown) and a corresponding nut 352 (shown in FIG. 21), by which the height of the cross member 306 relative to the station 310 can be adjusted. The nut 352 is attached to the bottom of the station 310 and the threaded bolt can be adjusted up or down to act as a foot in contact with the ground in order to level the frame 302. However, any of height adjustment and mounting mechanism described herein in relation to various embodiments of the SBH system can be used to adjust the height of the frames 302 at each station 310.

Referring to FIGS. 28-33, a fourth embodiment of the SBH system is shown. Similar to the embodiments described above, the SBH system includes a plurality of mirrors arranged in a horizontal array along a frame that maintains a low profile and low aspect ratio. Multiple frames are then installed above ground in parallel arrangement.

Figure 28:
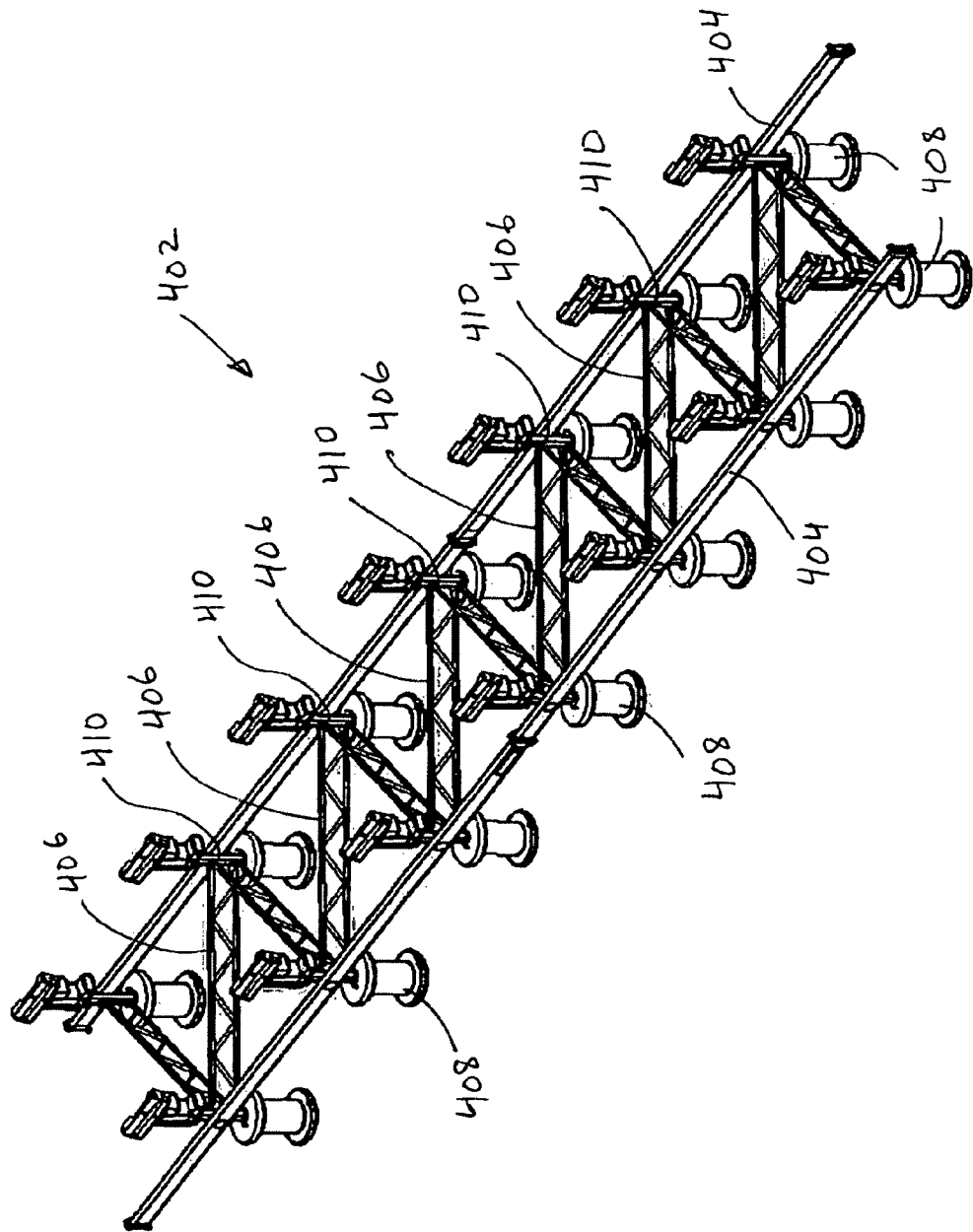
FIG. 28 is a perspective view of another embodiment of a Self-Ballasted Heliostat system for a solar collector system according to the present disclosure.

The SBH system includes a plurality of mirrors 400 (shown in FIG. 30) moveably mounted on a frame 402. Each frame 402 includes a plurality of side members 404 and a plurality of cross members 406 extending between and connecting the side members 404. As described in detail below, each cross member 406 is connected in a shipping configuration to a corresponding side member 404, where each cross member 406 is then pivoted outward from its corresponding side member 404 and connected to the opposing side member 404 during installation. Each SBH system is supported on the ground by one or more ballasts 408, which can maintain the SBH system in a fixed position on the ground with little or no ground penetration. In FIGS. 28, 31 and 53, the ballasts 408 are shown to be cylindrical in shape. However, any shape for the ballast 408 including various embodiments disclosed herein can be used. The ballasts 408 can secure the SBH system to the ground while providing a surface area large enough to distribute the weight of the SBH system without subsidence. Each mirror 400 and its corresponding actuators are mounted to a corresponding station 410, which is mounted on a corresponding ballast 408.

Figure 30:
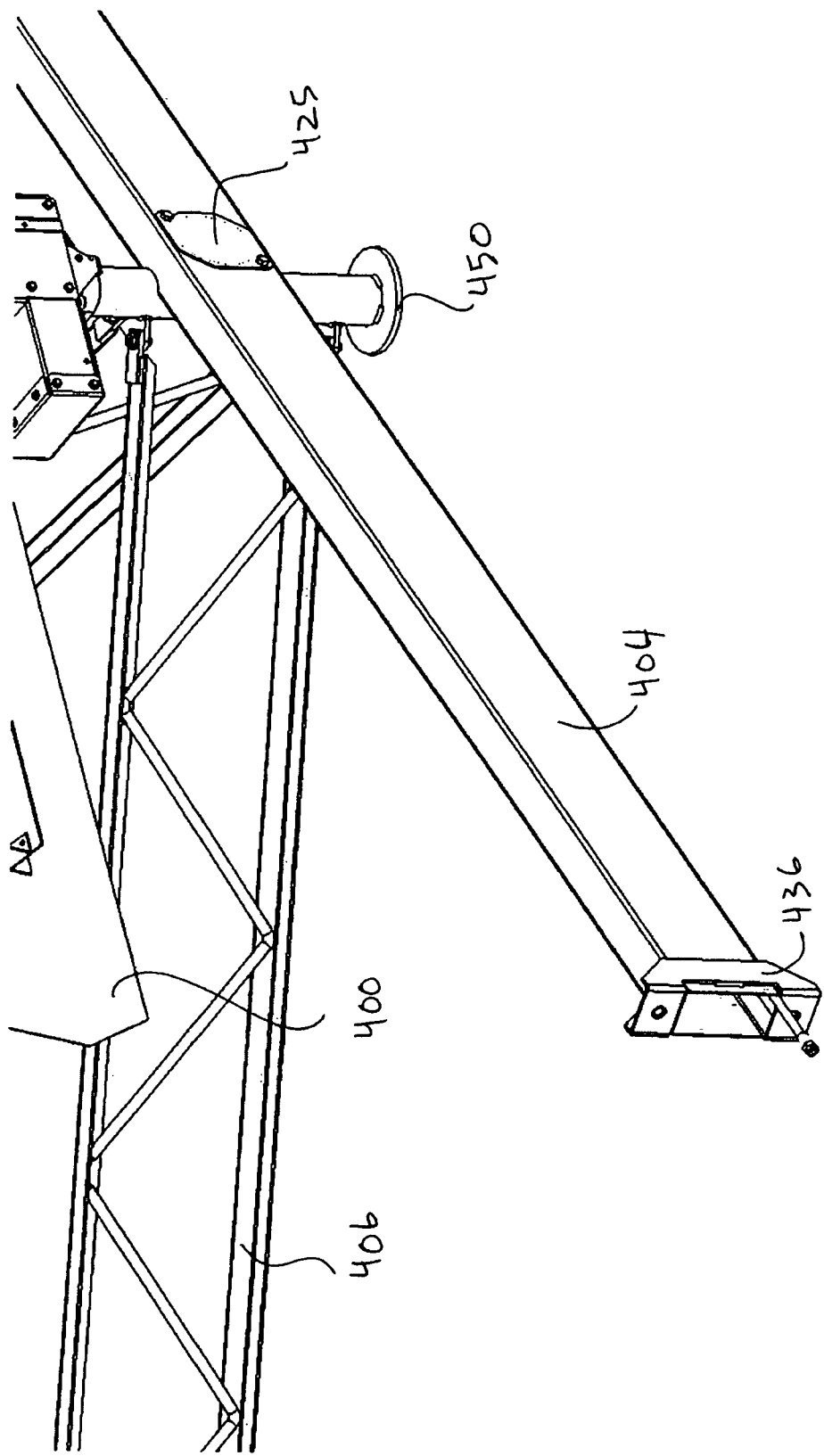
FIG. 30 is a perspective view of a side member of the Self-Ballasted Heliostat system of FIG. 28.
Figure 31:
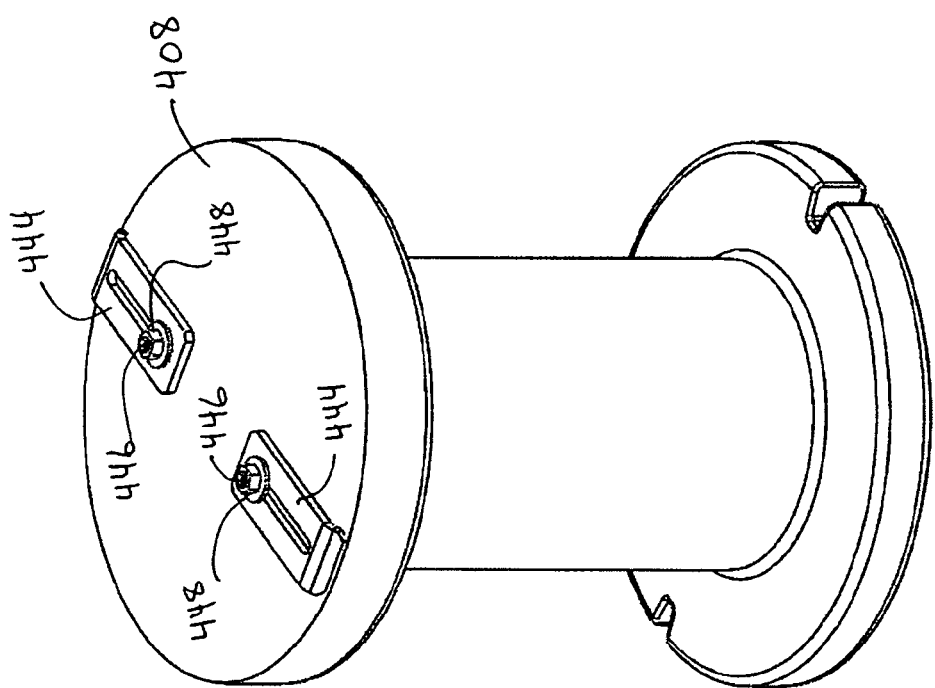
FIG. 31 is a perspective view of a ballast according to the present disclosure.

Referring to FIG. 30, the side members 404 can provide structural support for the mirrors 400 while also serving as a conduit for electrical cables. Although an individual side member generally would not exceed 40 feet in length, multiple side members 404 may be connected together using the rail couplers 436. Cover panels 425 may also be incorporated into the side members 404 to access electrical wiring therein, preferably near the stations 410.

Figure 29:
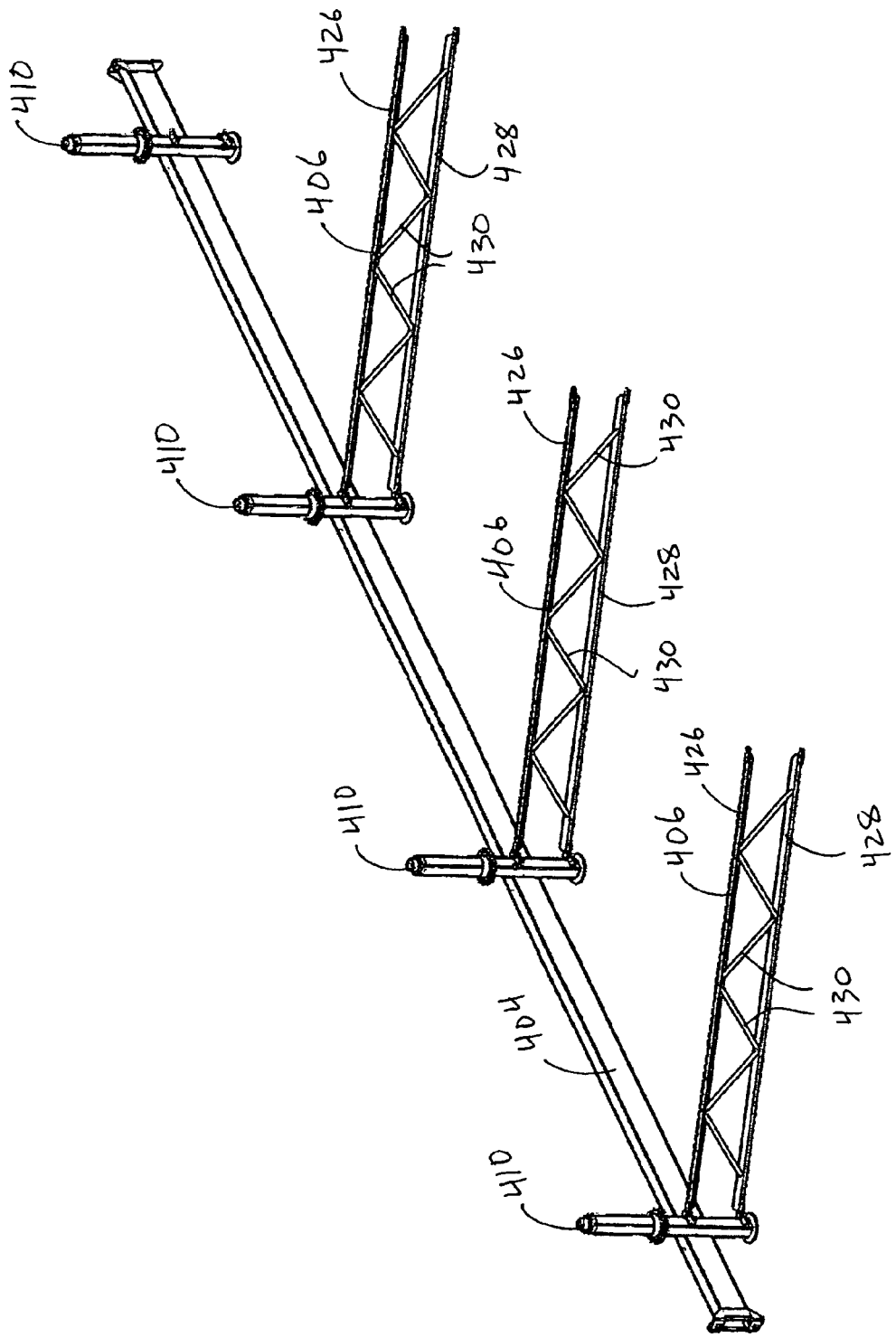
FIG. 29 is a perspective view of a side member and cross members of the Self-Ballasted Heliostat system of FIG. 28.
Figure 32:
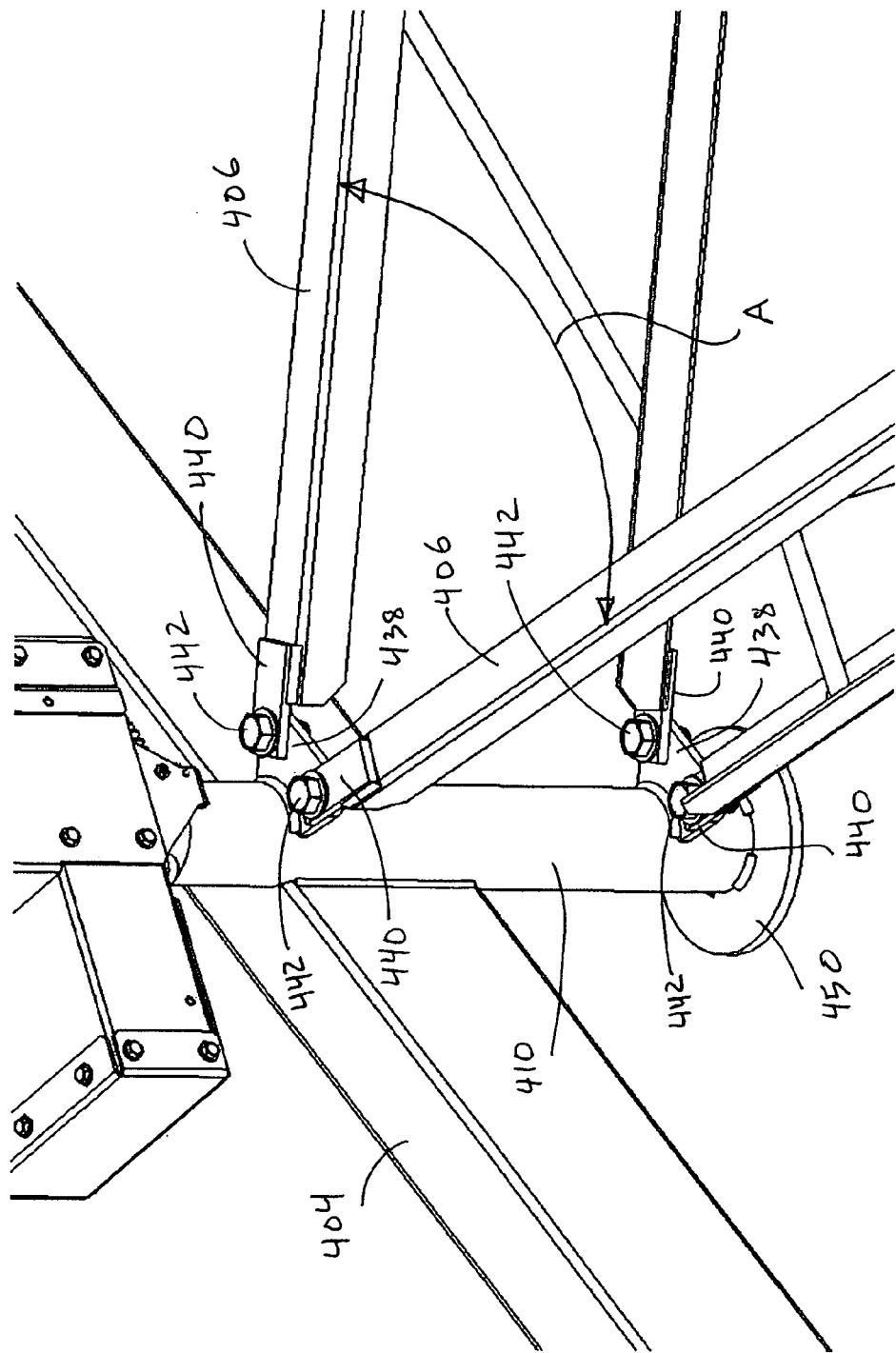
FIG. 32 is a perspective view of a stantion, side member and cross members of the Self-Ballasted Heliostat system of FIG. 28.
Figure 33:
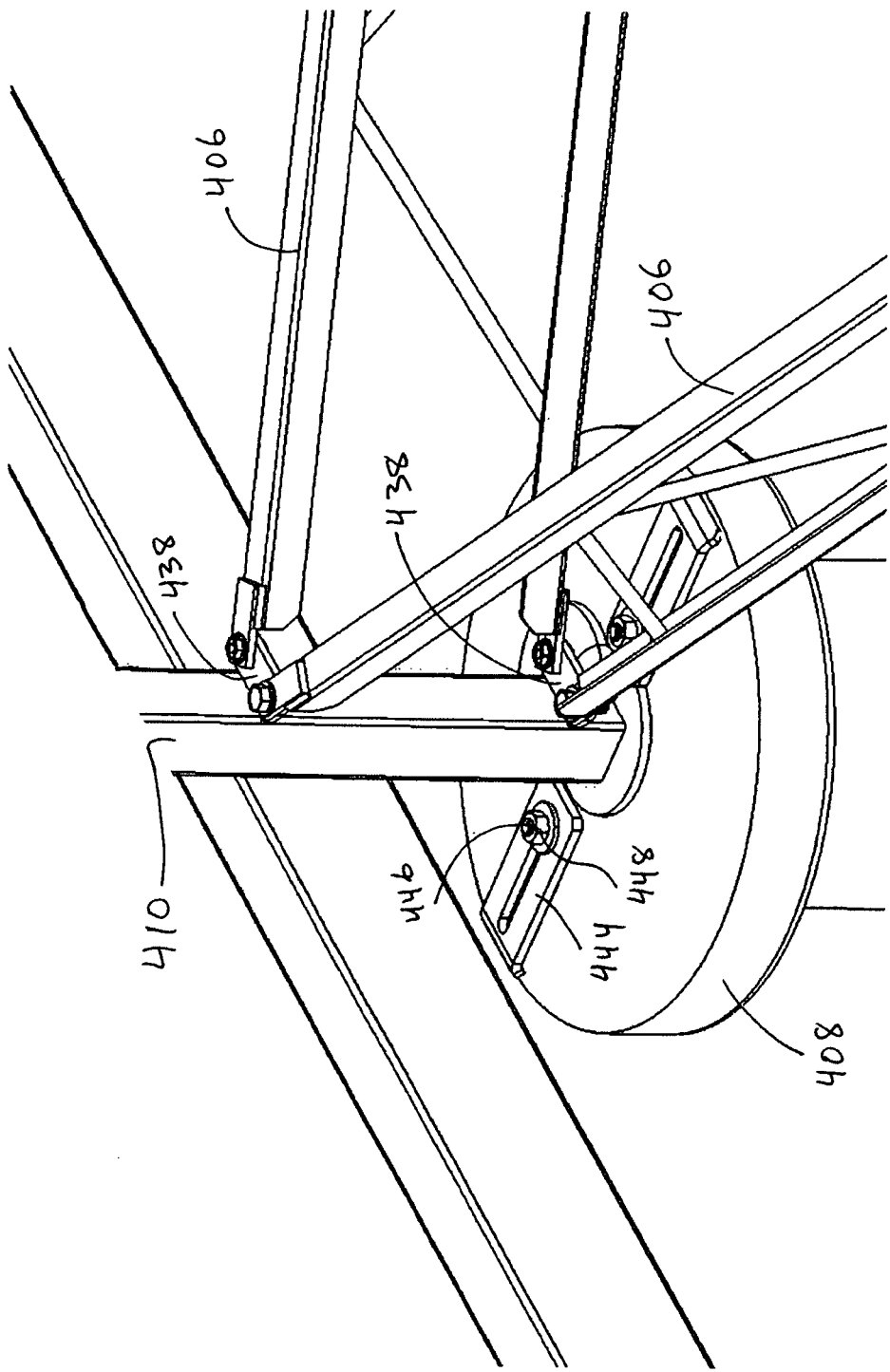
FIG. 33 is a perspective view of a stantion, side member, cross members and a ballast of the Self-Ballasted Heliostat system of FIG. 28.

As shown in FIG. 29, each cross member 406 includes an upper rail 426, a lower rail 428 and cross rails 430 for connecting the upper rail 426 to the lower rail 428 so as to form a truss structure for rigidity and load distribution. Each side member 404 includes a hollow beam that can be attached to one or more stations 410 prior to shipment to an installation site. Referring to FIGS. 32 and 33, each station 410 includes a flange 438 attached thereto by welding, fasteners, or like devices and methods. The flange 438 includes two bores for receiving end brackets 440 of two cross members 406. One cross member 406 is assembled to each flange 438 with a bolt 442 prior to shipment to an installation site. The cross member 406 is pivotable relative to the flange 438 so that it can be pivoted into a position substantially parallel with the side member 404 in a shipping configuration. When received at the installation site, the cross member 406 attached to each flange 438 can be pivoted about the bolt 442 until the brackets 440 at the other end of the cross member 406 are aligned with the flange 438 of an opposing station 410. The bracket 440 can then be fastened to the opposing flange 438 with a bolt 442. Accordingly, the cross members 406 may serve as a swing arm to hold the frame upright when extended (analogous to a "kick-stand" on a bicycle) to facilitate assembly of the SBH system.

Illustrated in FIGS. 31 and 33, the ballasts 408 can be constructed from concrete and installed above ground before installation of the stantions 410. Each ballast 408 may include clips 444 that are mounted on the ballast 408 with a bolt 446 and can be secured with a nut 448. The clips 444 are moveable relative to the bolt 446 when the nut 448 is not sufficiently tightened. The base of each stantion 410 may include a plate 450, upon which the clips 444 can be placed and tightened down with the nut 448. The SBH system of the fourth embodiment can use any of the height adjustment and mounting mechanism described herein to adjust the height of the stantions 410 relative to the ballasts 408.

During installation, the ballasts 408 are positioned on the ground in a staggered configuration and the stantions 410 with the side members 404, which are already attached, are mounted and secured to the ballasts 408. If necessary, adjacent side members 404 are connected with the rail couplers 436. Each cross member 406 is then swung outward and aligned with the flange 438 of the opposing side member 404. The cross members 406 are then secured to the flanges 438. This process is repeated for all of the cross members 406 until the frame 402 is assembled.

Referring to FIGS. 34-41, an SBH system according to fifth embodiment of the disclosure is shown. The SBH system includes a plurality of mirrors (not shown) moveably mounted on a frame 502. Each frame 502 includes a plurality of side members 504 and a plurality of cross members 506 extending between and connecting the side members 504. In this embodiment, the cross members 506 are pivotally connected to the side members 504. Additionally, one or more of the cross members 506 can be constructed from two beams 507 that are pivotable about a joint 509. The frame 502 is supported on the ground by one or more ballasts (not shown), which can maintain the SBH system in a fixed position on the ground with little or no ground penetration. The ballasts of this embodiment can be similar to the various ballast embodiments described herein. The frame 502 includes a plurality of stantions 510 vertically extending from the side members 504 for receiving a mirror.

Figure 34:
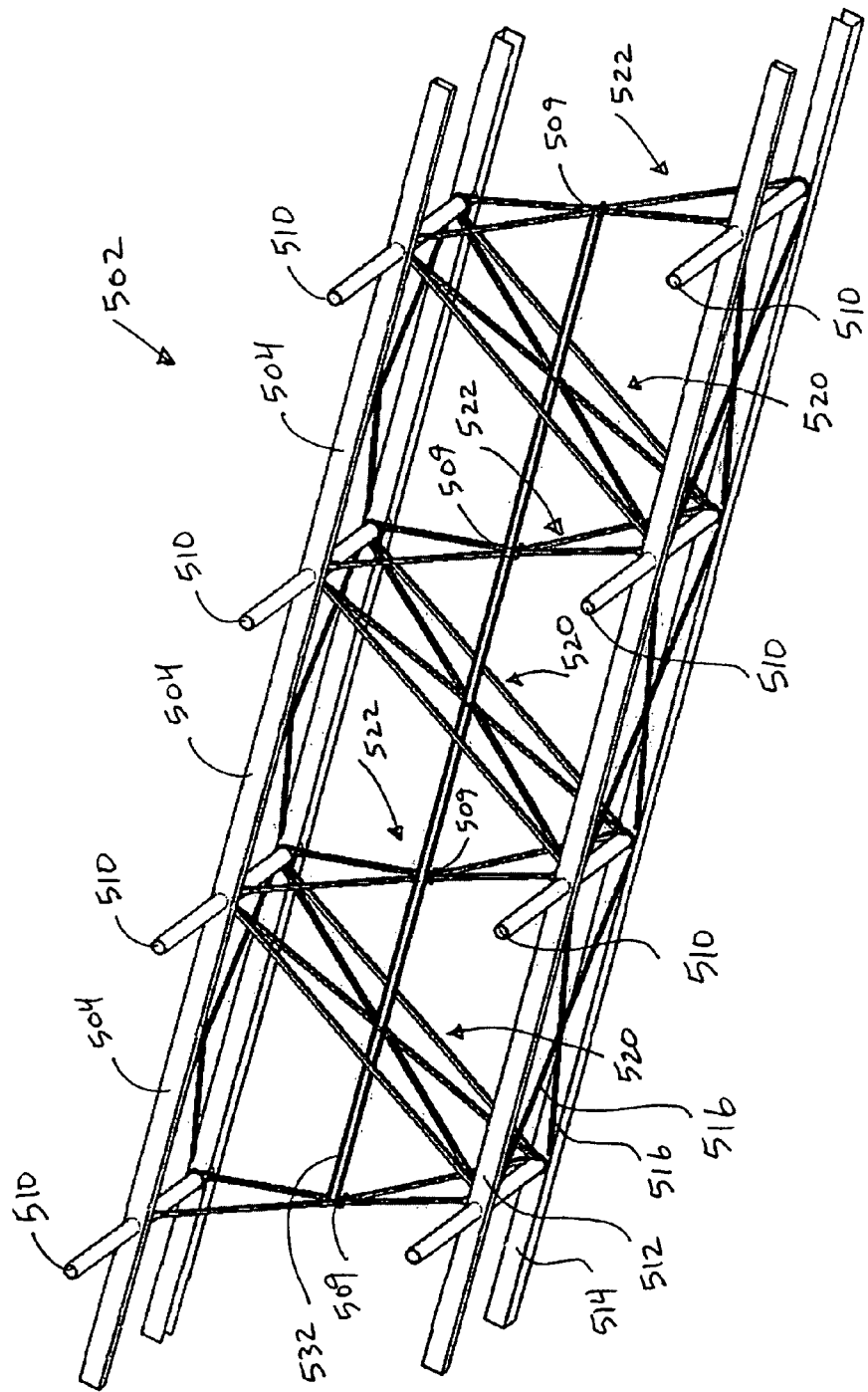
FIG. 34 is a perspective view of a frame of another embodiment of a Self-Ballasted Heliostat system for a solar collector system according to the present disclosure.
Figure 39:
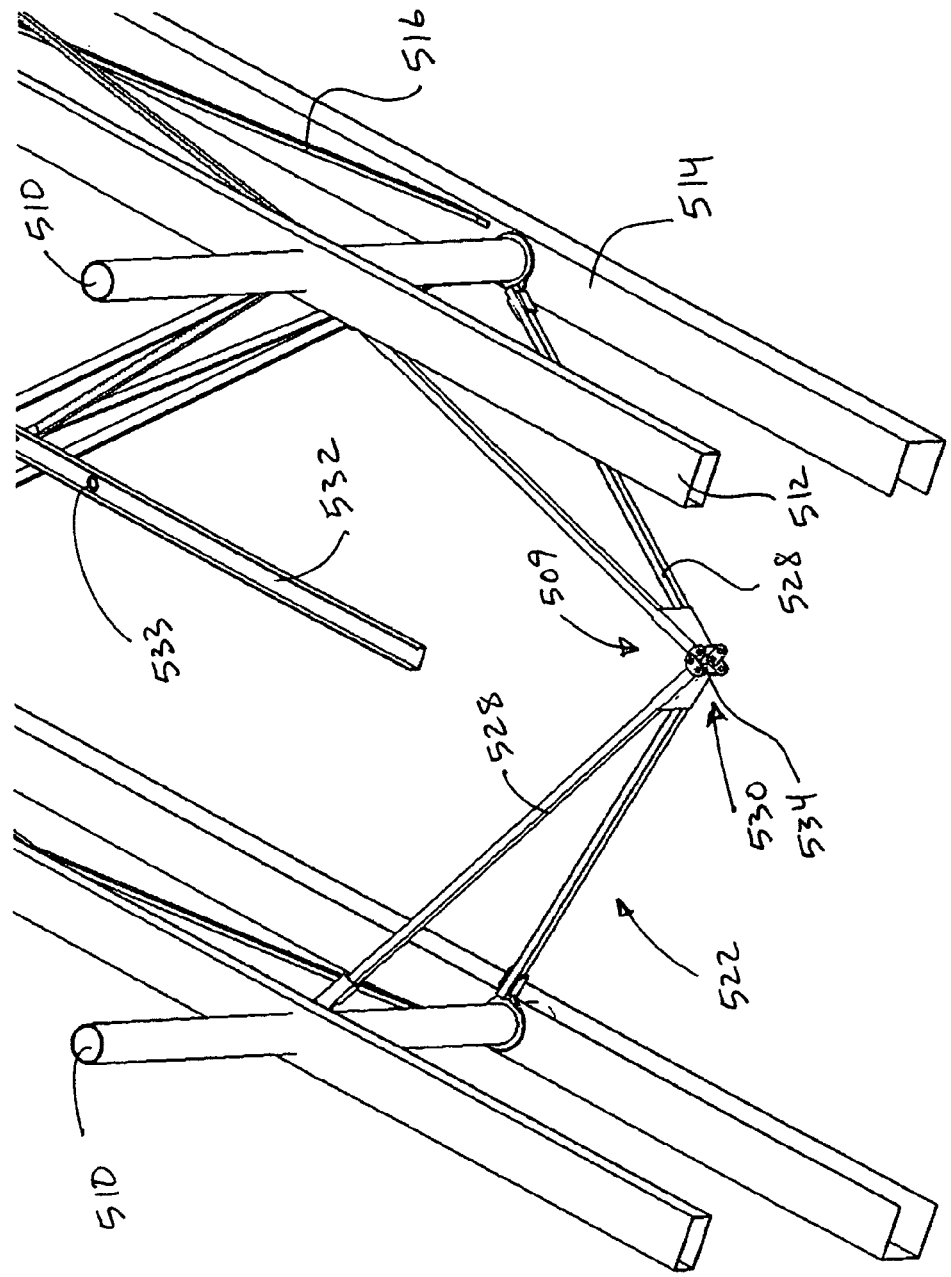
FIGS. 39 and 40 are perspective views of a hinge of the Self-Ballasted Heliostat system of FIG. 34.

Referring to FIG. 34, as with the various embodiments disclosed herein, each side member 504 includes an upper rail 512, a lower rail 514 and cross rails 516 for connecting the upper rail 512 to the lower rail 514 to provide a truss structure for rigidity and load distribution. In one embodiment, the cross members 506 include first cross members 520 and second cross members 522 alternately arranged between the side members 504. The first cross members 520 include a rigid frame 524 having fixed cross braces 526 (shown in FIG. 41). The first cross members 520 are pivotally connected to opposing stantions 510. The second cross members 522 include pivotable cross braces 528 that pivot about a the joint 509 at the center portion 530 of the cross member 520. The frame 502 also includes a locking beam 532 which is pivotally connected to the center portions of the first cross members 520 and the second cross members 522. As shown in FIG. 39, the locking beam 532 can lock the frame 502 in the open position by an aperture 533 on the locking beam 532 receiving a bolt or pin (not shown) that engages an aperture of the joint 509.

Figure 37:
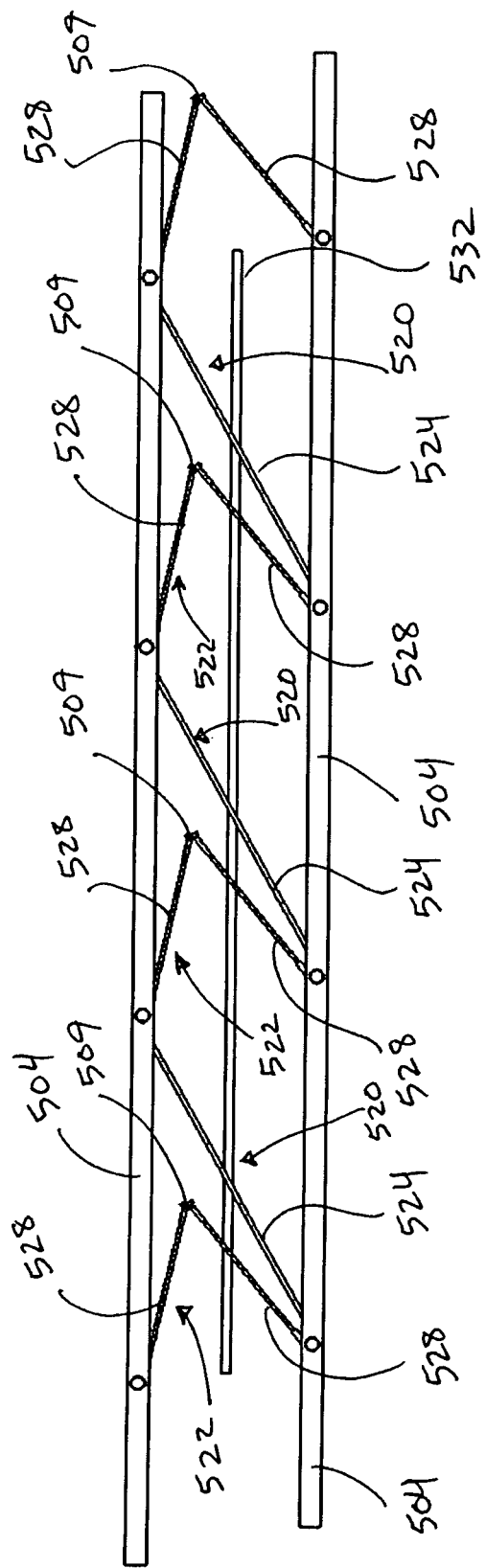
FIG. 37 is a top view of a frame of the Self-Ballasted Heliostat system of FIG. 34 shown in the partially deployed configuration.
Figure 38:
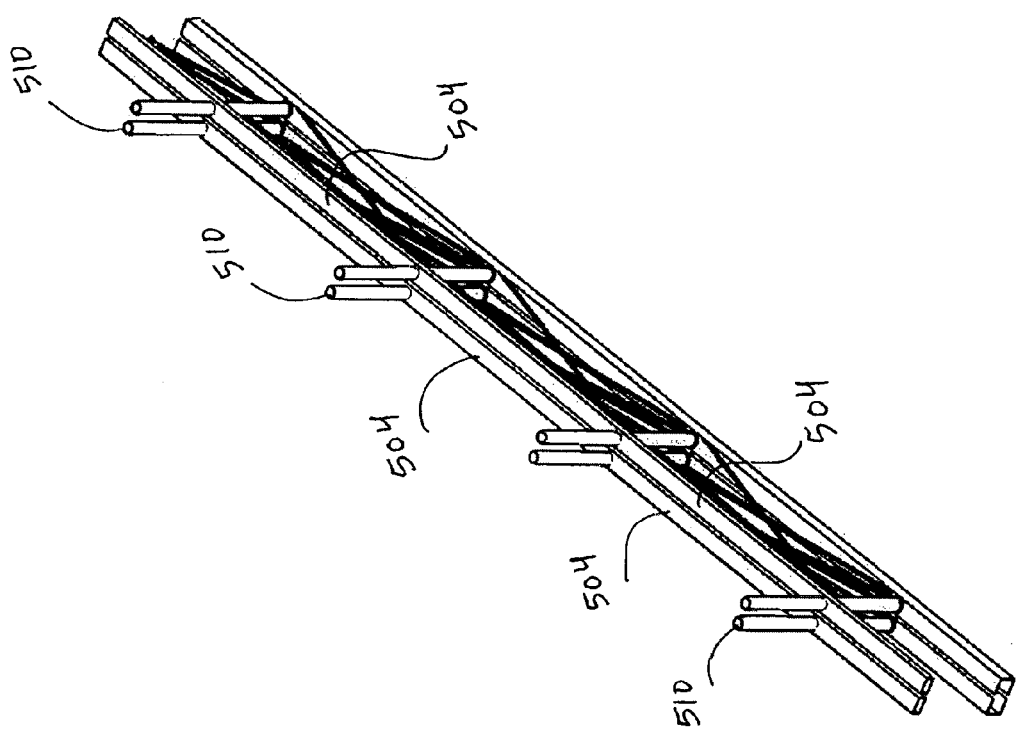
FIG. 38 is a perspective view of a frame of the Self-Ballasted Heliostat system of FIG. 34 shown in a shipping configuration.

As shown in FIGS. 37 and 38, moving the side members 504 parallel to each other causes the first cross members 520 to pivot relative to the side members 504, while the second cross members 522 collapse at the joints 509. The support beam 532 also moves parallel to the side members 504. Accordingly, the side members 503 can swing together for being configured to a compact shipping form as shown in FIG. 38, and deployed to a expanded configuration as shown in FIG. 34.

Figure 35:
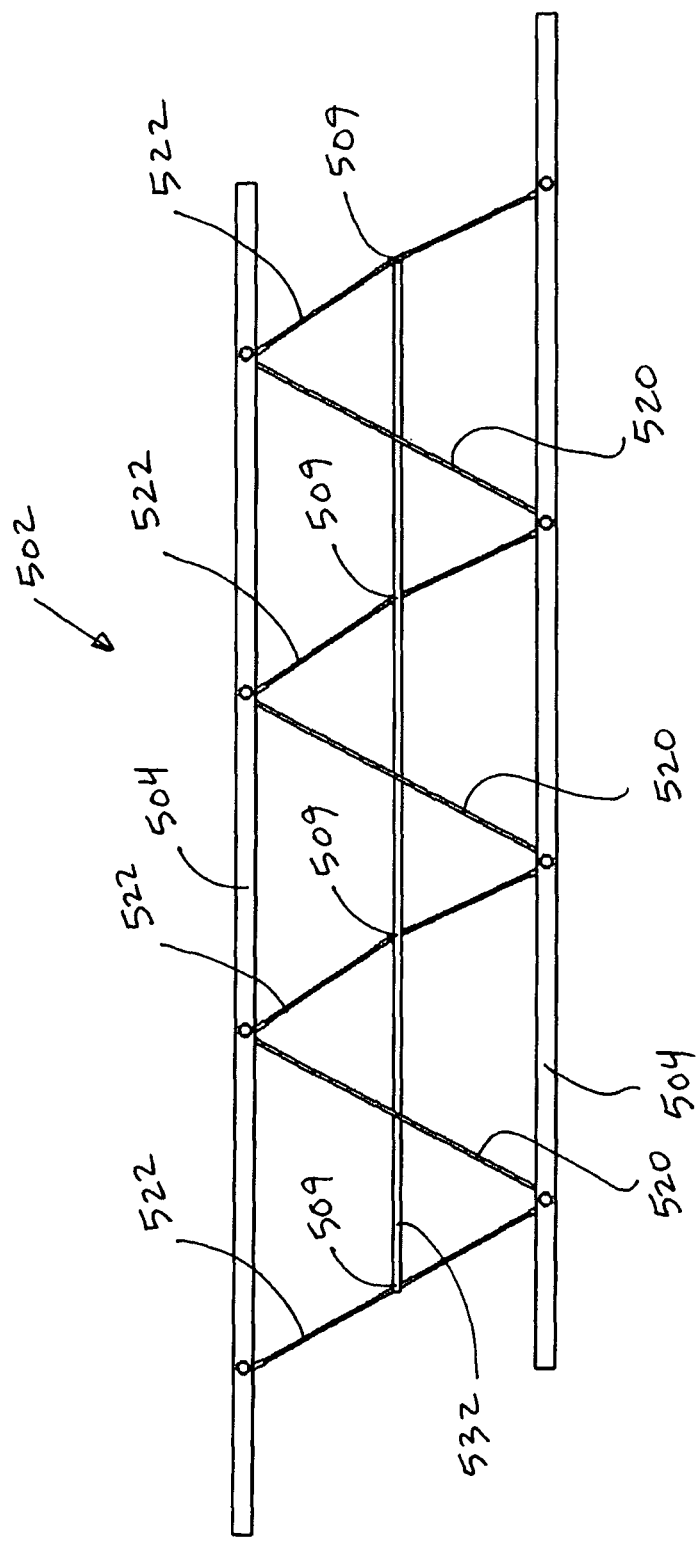
FIG. 35 is a top view of a frame of the Self-Ballasted Heliostat system of FIG. 34, shown in the fully deployed position.
Figure 36:
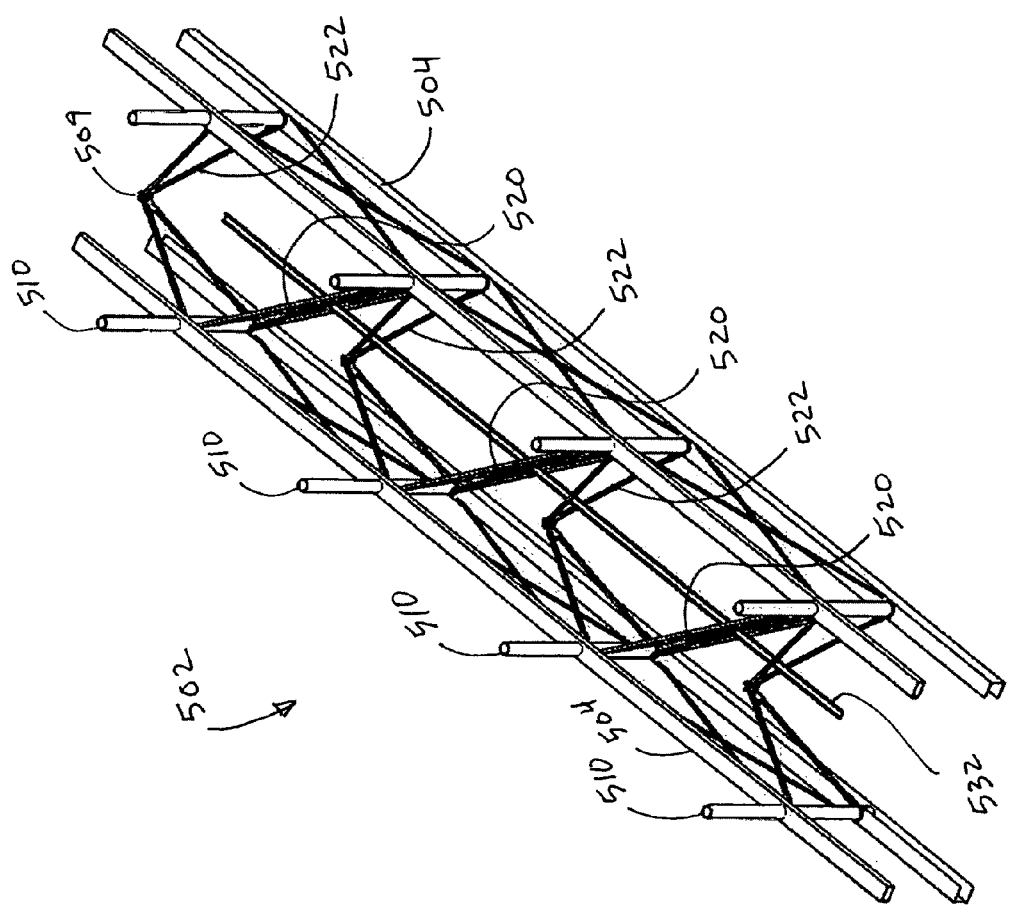
FIG. 36 is a perspective view of a frame of the Self-Ballasted Heliostat system of FIG. 34 shown in the partially deployed configuration.
Figure 40:
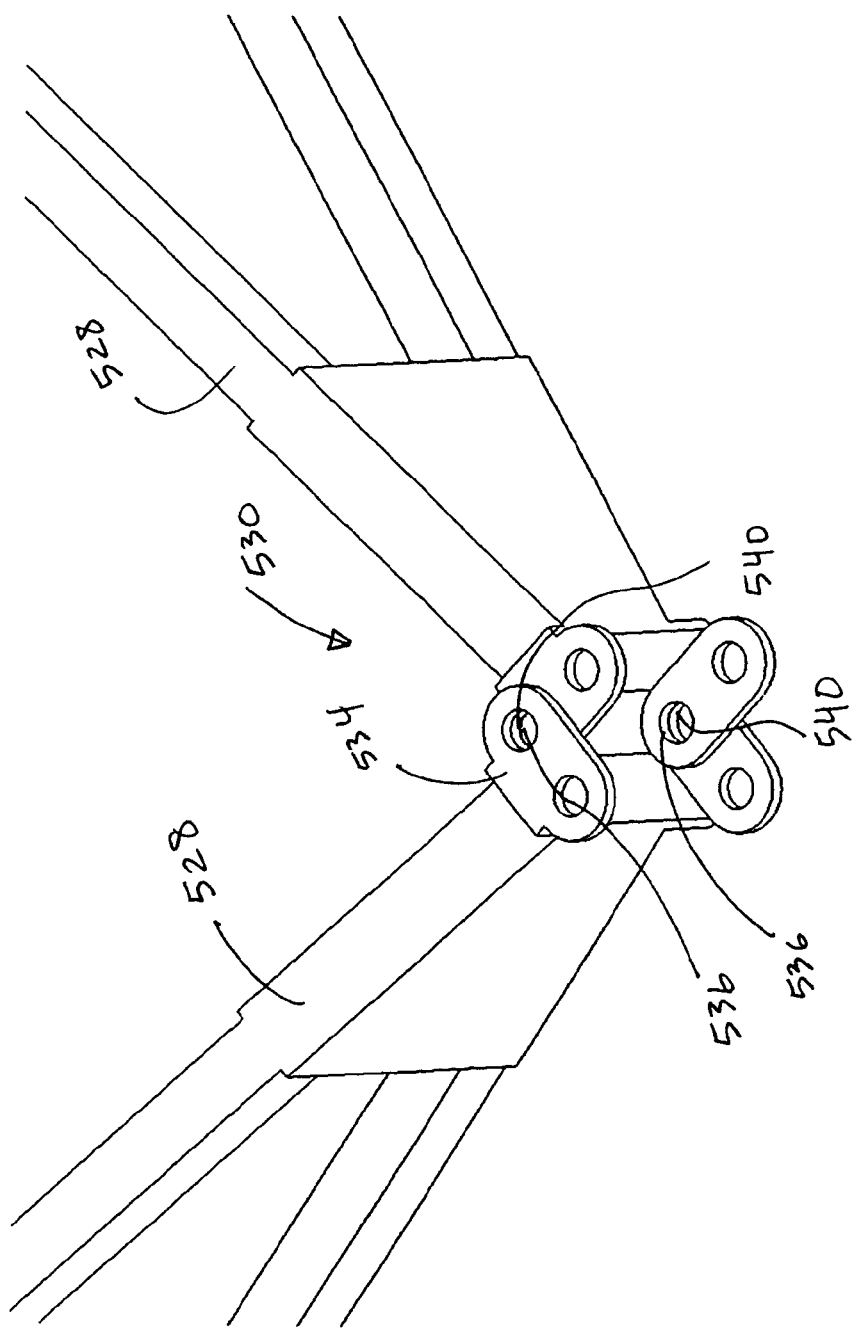
Figure 41:
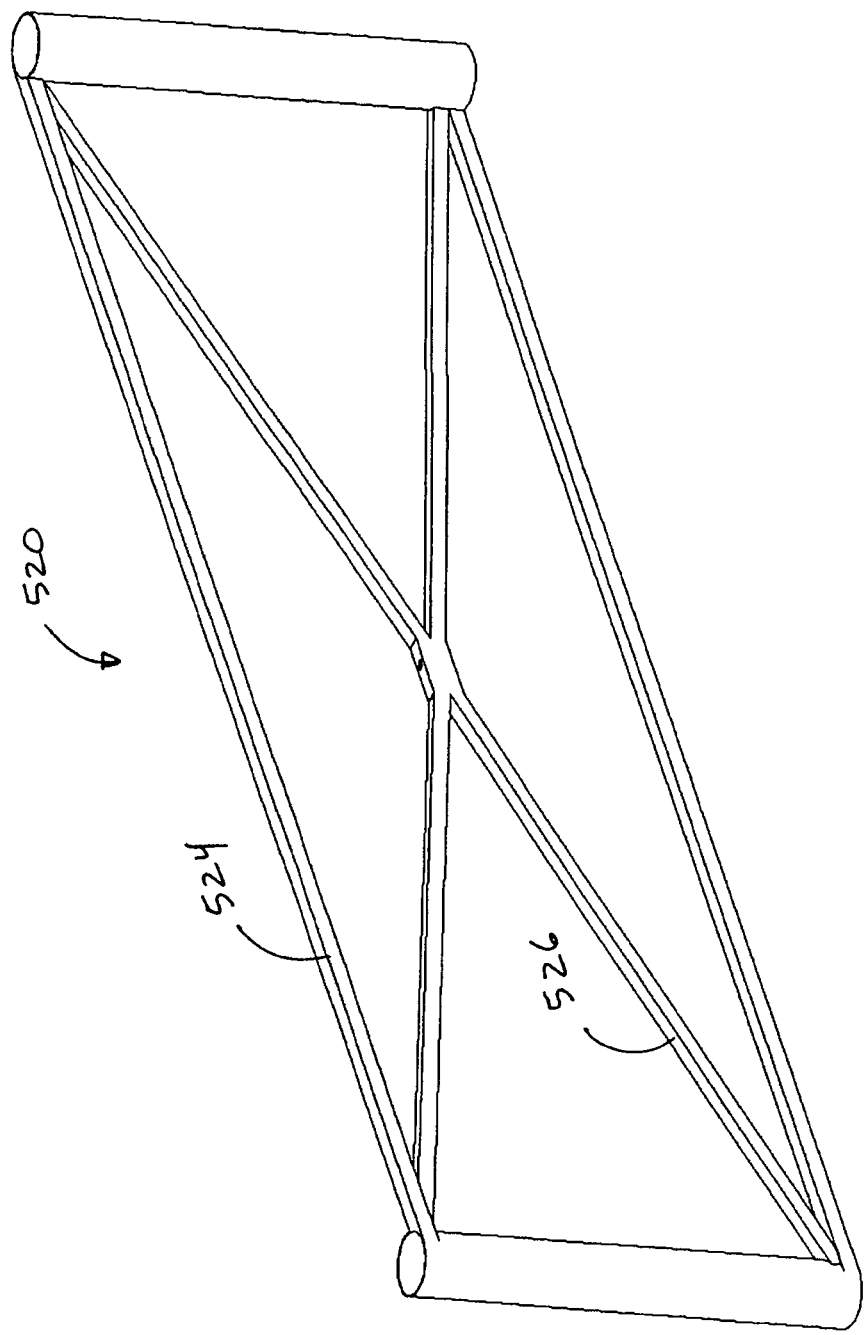
FIG. 41 is a perspective view of a cross member of the Self-Ballasted Heliostat system of FIG. 34.
Figure 42:
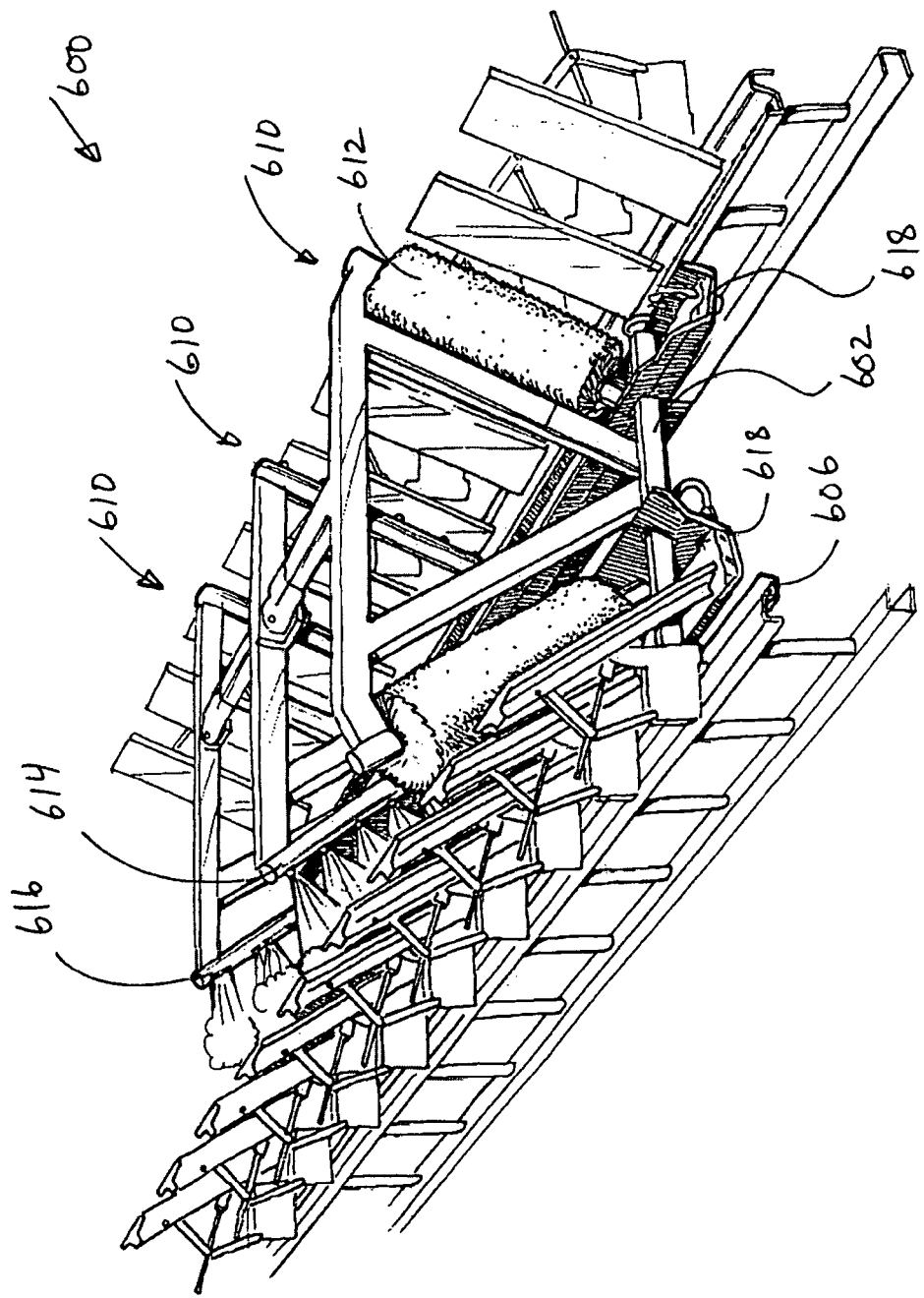
FIG. 42 is a perspective view of a wash apparatus for a solar collector system according to the present disclosure.
Figure 43:
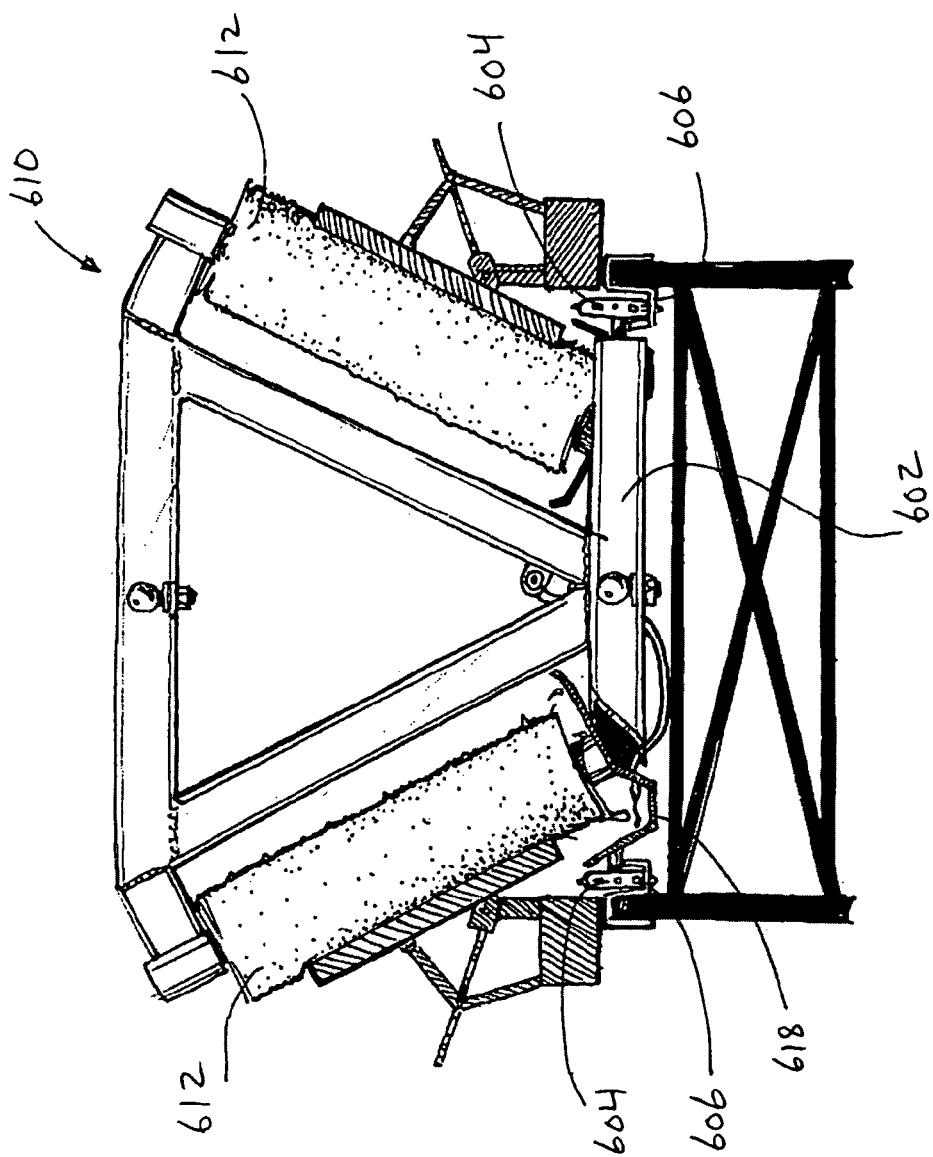
FIG. 43 is a front view of the wash apparatus of FIG. 42.
Figure 44:
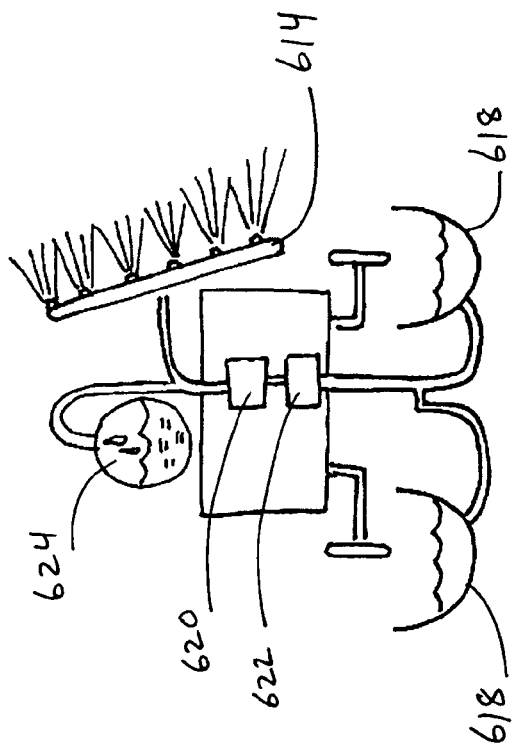
FIGS. 44 and 45 are schematic drawings of various components of the wash apparatus of FIG. 42.
Figure 45:
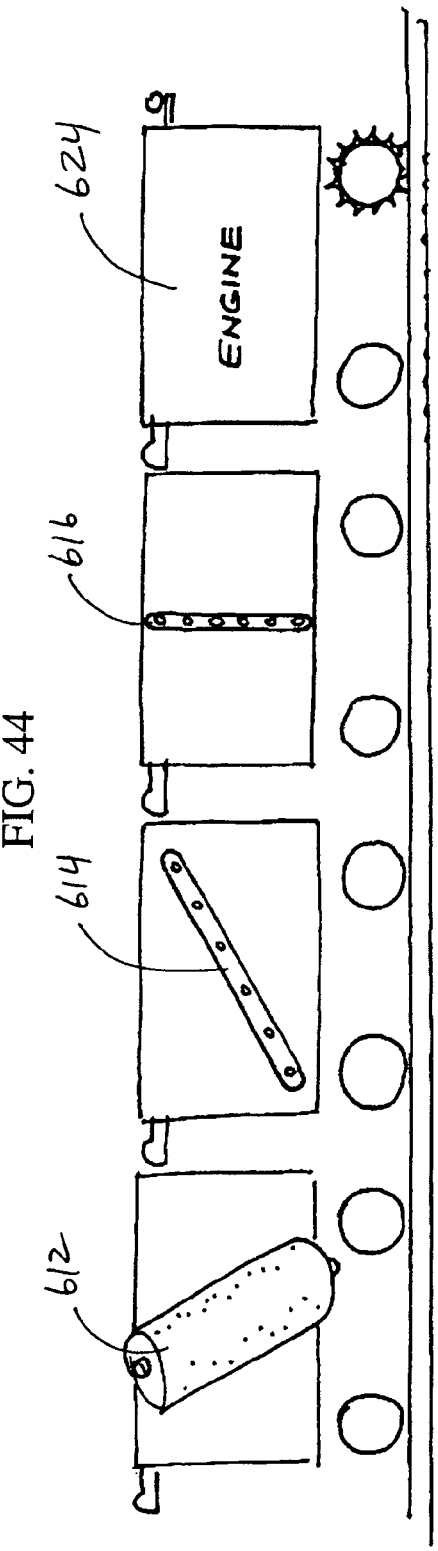
Figure 46:
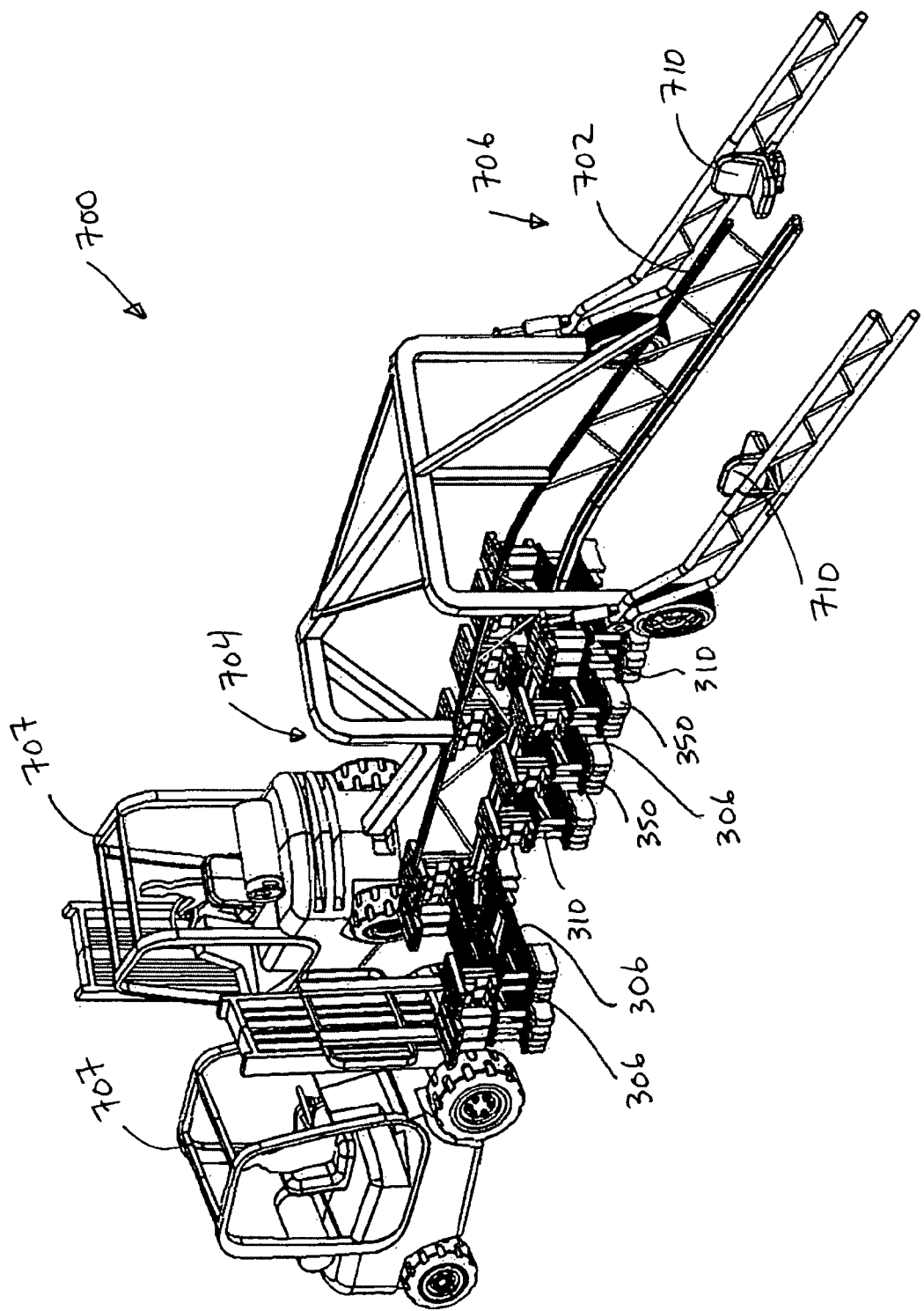
FIG. 46 is a perspective view of a gantry for installing a solar collector system according to the present disclosure.

FIGS. 35, 38 and 37 show views of the frame 502 in a fully deployed, fully stowed, and partially stowed configurations, respectively. FIG. 39 shows one of the second cross members 522 in a partially folded configuration. The joint 509 includes a hinge 534 at the center portion 530 for facilitating the folding function described above. Referring to FIG. 40, the hinge 534 may include a first pair of holes 536 configured to receive a first pin (not shown) during assembly, and a second pair of holes 540 configured to receive a second pin (not shown) to rigidly affix the second cross members 522 during installation. Thus, the pins engaging the holes prevent the second cross members 522 from folding after installation.

Illustrated in FIGS. 42-45 are views of the various components of a mirror wash apparatus 600 in accordance with some embodiments of the invention. The mirror wash apparatus 600 is an automated robotic wash device configured to traverse a row of mirrors and simultaneously wash the mirrors on either side of the frame. In the disclosed embodiment, the wash apparatus 600 includes chassis 602 and drive wheels 604 guided within a channel 606 on the side members of the frame. With frames fitted together length-wise, the wash apparatus 600 may traverse a large number of connected frames and wash the mirrors of each frame.

The wash apparatus 600 includes a plurality of wash stations 610. Each station 610 includes washing equipment configured to clean each mirror when the reflective surface thereof is turned inward. The washing equipment of each station may include, for example, roller brushes 612 for daily dusting, high-pressure spray washers 614 to remove dirt and other debris on a periodic basis, air dryers 616 to efficiently remove excess water from the mirror faces, and static dissipative brushes (not shown) to make dust removal easier and to reduce the static attraction of dust particles upon completion of the wash/dusting cycle. In some embodiments, the wash apparatus 600 further includes a water basin 618 that collects and recycles water after it is sprayed on the mirrors. The water basin 618 may further include a pump 620 and filter 622 to purify the water/detergent solution before it is returned to a clean water reservoir 624 that feeds the spray washers 614. The wash apparatus 600 also includes an engine or motor 624 that propels the wheels 604 in the channels 606.

Illustrated in FIGS. 46-50 is a SBH system installation gantry 700 for positioning and assembling sections of frame. The installation gantry 700 is described herein with respect to the third embodiment of the solar collector system. Accordingly, reference numbers for the various components shown in FIGS. 46-50 refer to the components of the SBH system of the third embodiment. However, the gantry 700 can be used to install the various embodiments of the solar collector system disclosed herein with little or no modification.

Figure 47:
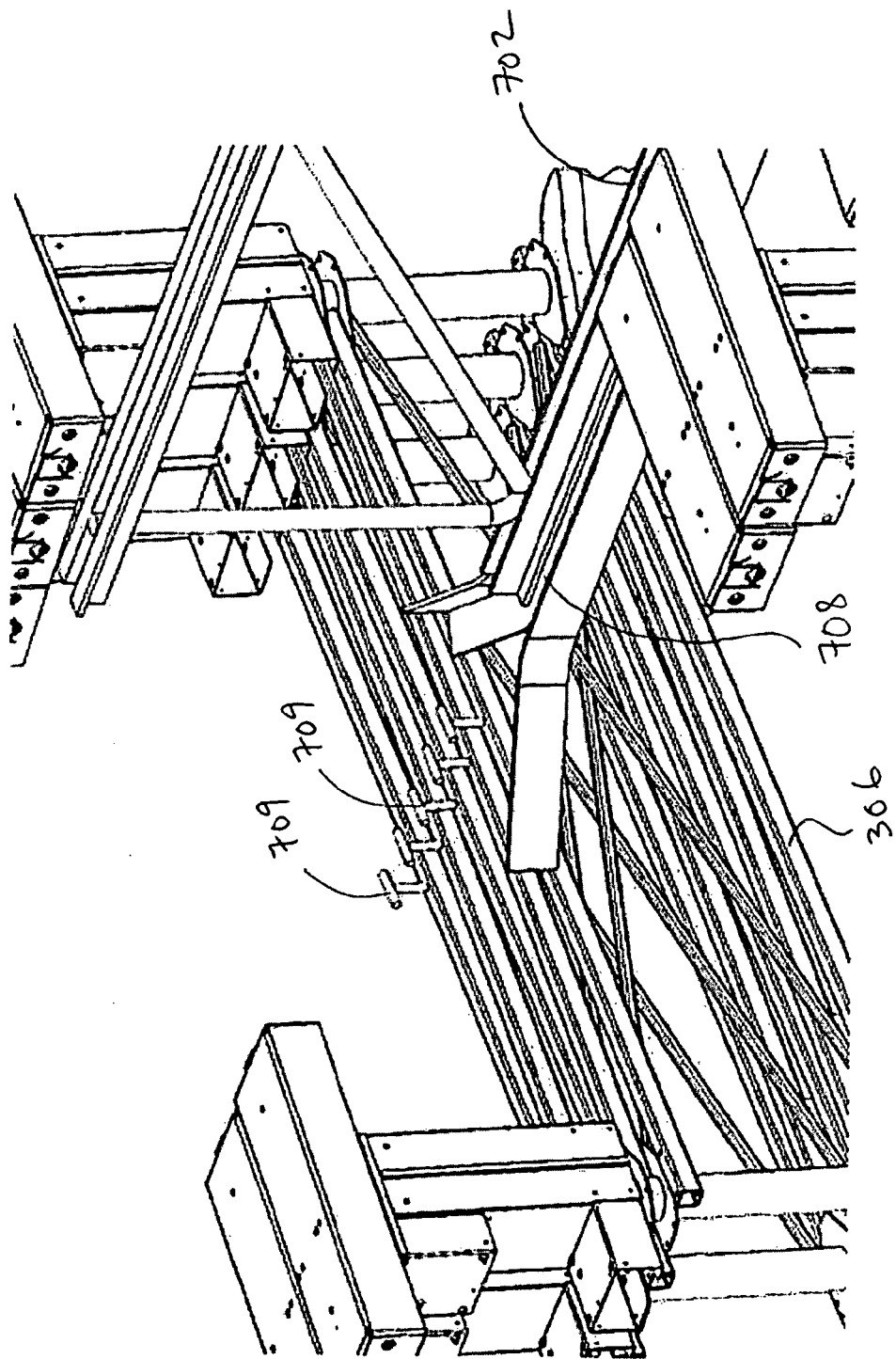
FIG. 47 is a perspective view of a conveyor of the gantry of FIG. 46 receiving cross members in the shipping configuration.
Figure 48:
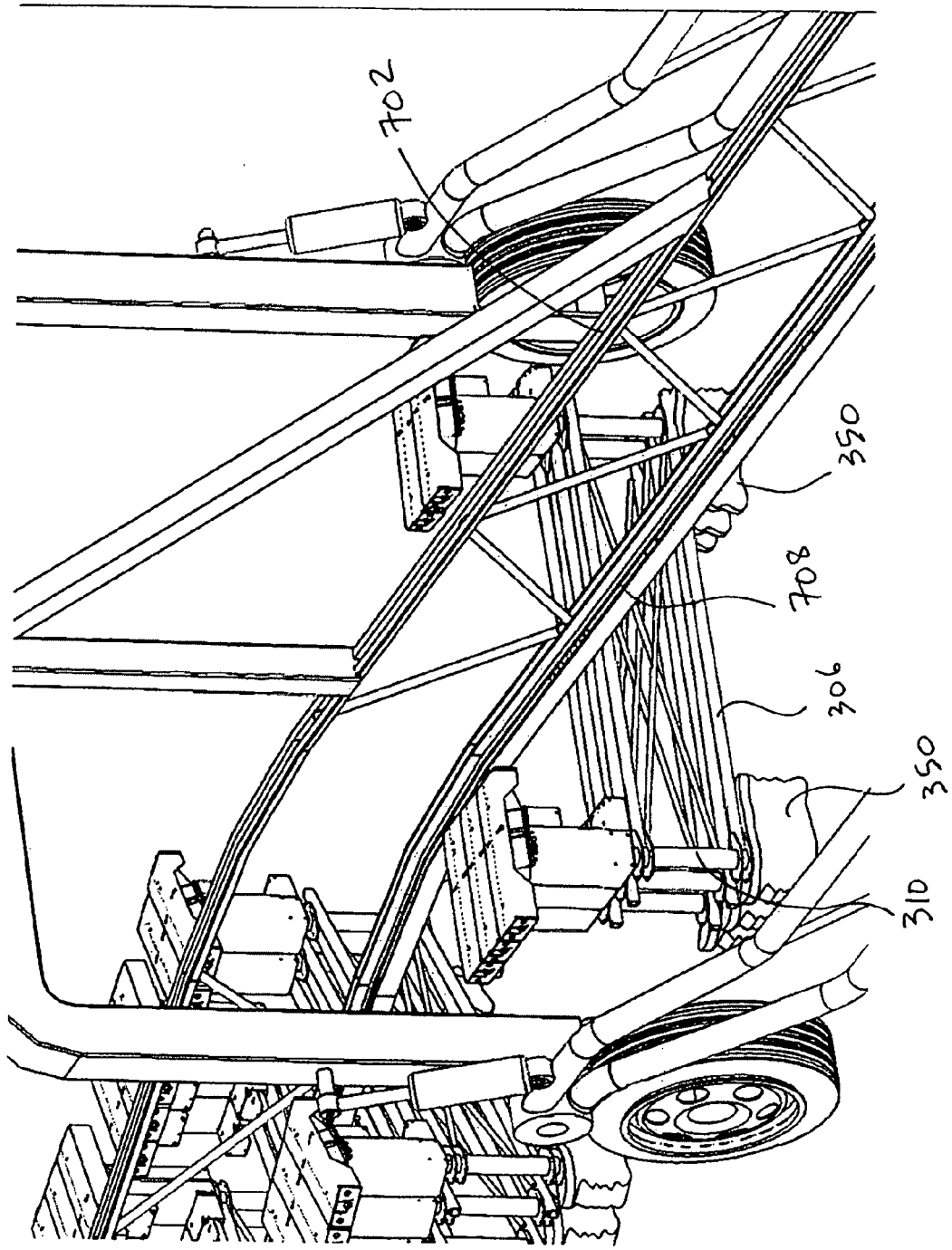
FIG. 48 is another perspective view of a conveyor of the gantry of FIG. 46 receiving cross members in the shipping configuration.
Figure 49:
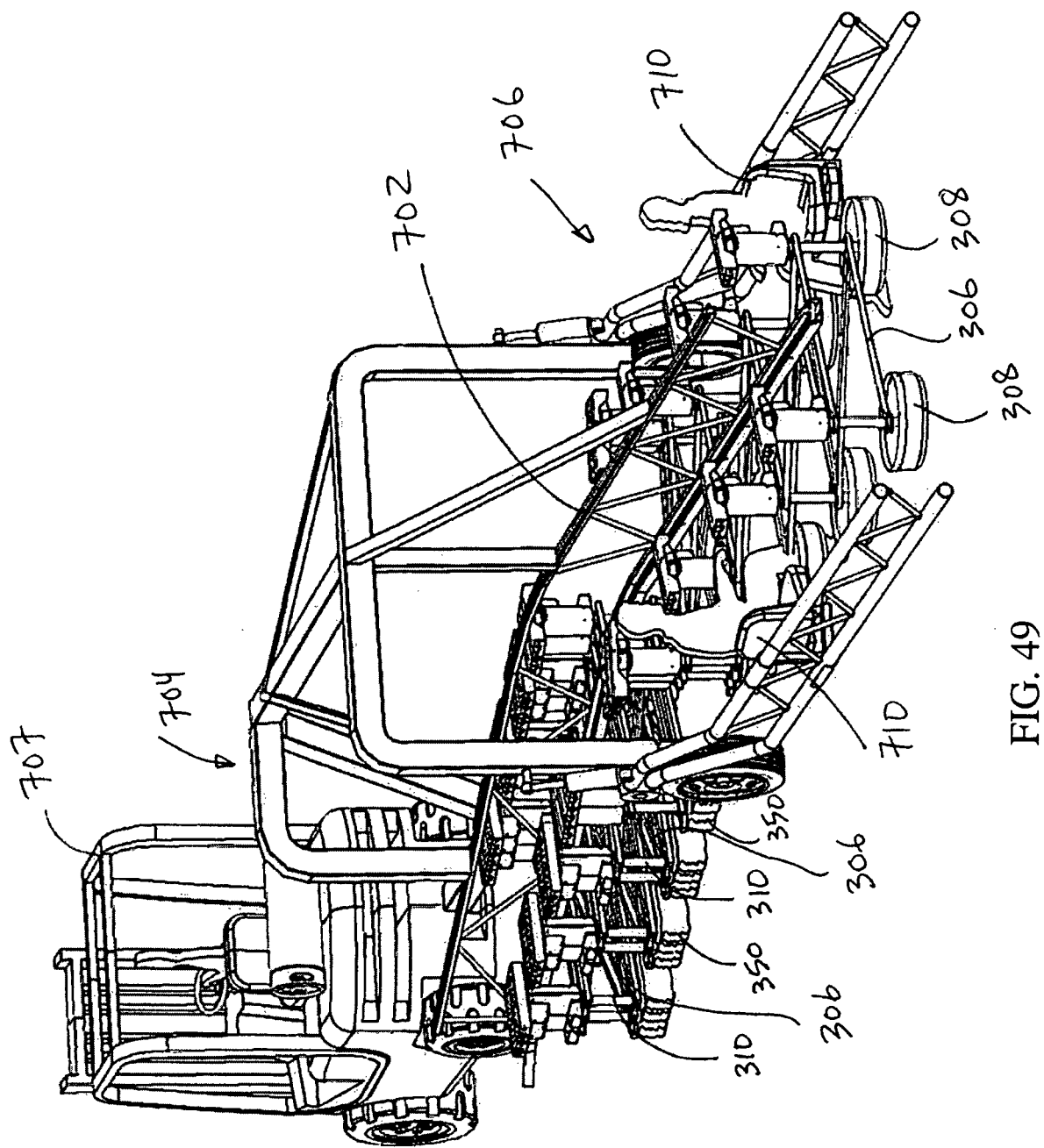
FIG. 49 is a front perspective view of cross members of the Self-Ballasted Heliostat system of FIG. 19 being deployed from the gantry of FIG. 46.
Figure 50:
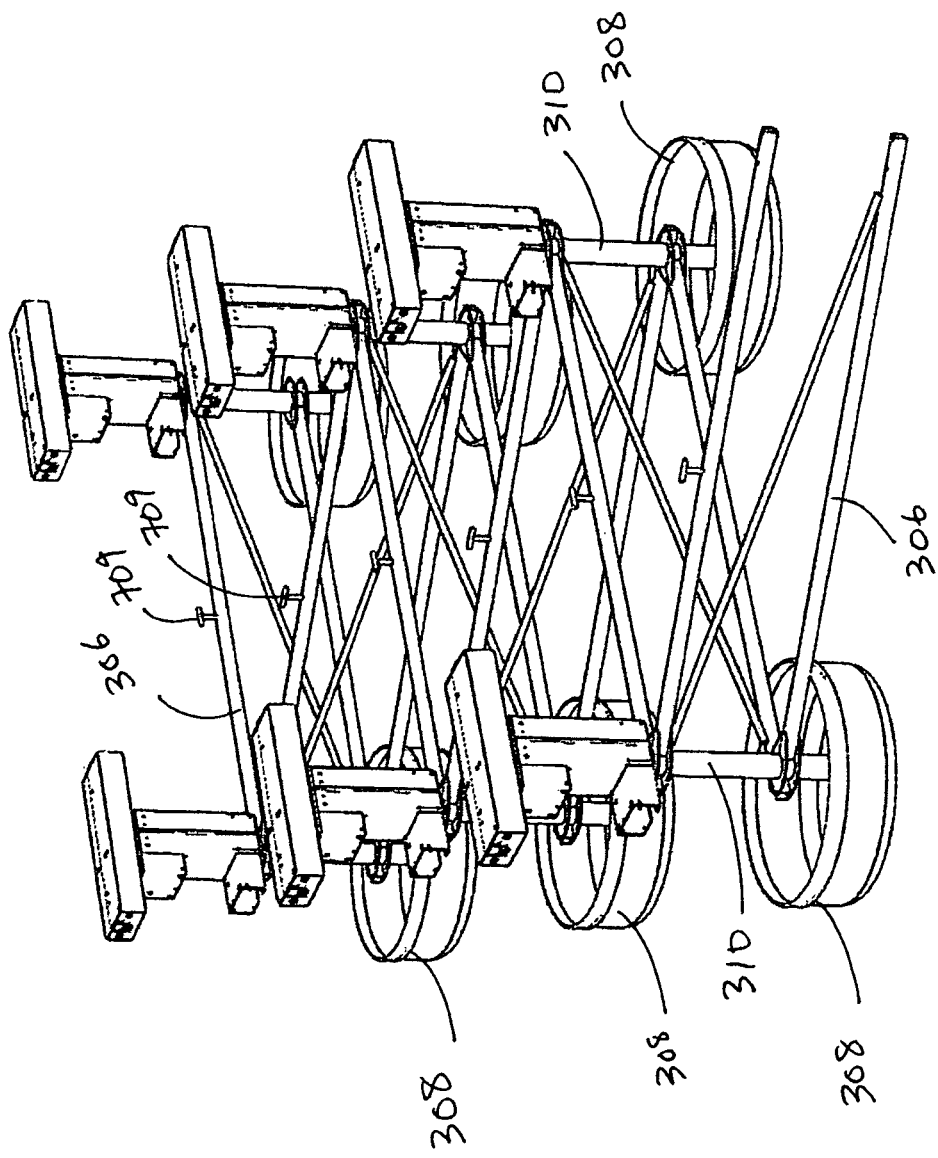
FIG. 50 is a front perspective view of cross members of the Self-Ballasted Heliostat system of FIG. 19 as deployed from the gantry of FIG. 46.

The gantry includes a conveyor 702 from which multiple cross members 306 are suspended. The cross members 306 are (a) loaded at the intake end 704, (b) moved to an assembly section 706, (c) opened and deployed by workers, (d) located at their final installation positions, and (e) concrete is poured in ballast bags 350 around the base of the stantions 310 to form the ballasts 308 and secure the heliostats. As the cross members 306 are installed, the gantry 700 is towed forward by a forklift 707, for example, where the next set of cross members 306 are to be positioned. To maintain continuity in the installation process, the gantry 700 can be restocked with more cross members 306 at the intake end 704 of the conveyor 702 concurrent with the assembly and installation of cross members 306 at the opposite end of the conveyor 702. Referring to FIGS. 47 and 50, the cross members 306 in the preferred embodiment include "T hooks" 709 or other fasteners that engages a slot 708 in the conveyor 702. The cross members 306 are then suspended from the conveyor 702 and moved along the length of the conveyor 702 as needed by the workers. The gantry 700 includes seats 710 at opposing sides of the conveyor 702 for the workers deploying the cross members 306 and assembling the frame 302. Thus, the installation gantry 700 allows a moveable assembly system by which the frames 302 can be efficiently deployed and mounted onto ballasts.

The disclosed solar collector system provides SBH systems or frames that can support a large number of heliostats with a few ballasts, by which the frames are grounded with little or no penetration of the ground. The frames share and distribute static and dynamic loads of the heliostats due to the truss structure of the frames. Because of the structural load sharing of the frames, the frames can be constructed with a high mirror density, which provides a large number of mirrors in a small area where the solar collector system is to be installed. The frames also allow the mirrors to be positioned close to the ground thereby increasing wind attenuation and stability. Multiple frames can be lineally connected together to create large solar collector systems. The multiple frames can provide more load distribution and rigidity than a single frame. As disclosed herein, the frames can be partially assembled off site so as to provide fast on-site assembly. Additionally, because the frames are manufactured off-site and can be partially assembled off-site, the distances and stagger configurations between the mirrors can be incorporated into the frame so as to prevent adjustments of the mirror distances and stagger orientation on-site.

As discussed above, the SBH system of the disclosure provides accurate spacing of the heliostats with the frame. The structural members of the frame can be tubular to support electronic circuits and wires. The frame can be partly or fully assembled prior to shipment to an installation site, partly or fully installed on site and/or rearranged on site. Accordingly, multiple frames can be arranged and connected on site to provide on-site configuration of a solar collector system based on heliostat field layout and mirror size. Furthermore, because the frames are self-ballasting and penetration of the ground for constructing a foundation is not required, removal and/or re-arrangement of the solar collector system does not require demolition work.

While a particular form of the disclosure has been illustrated and described, it will be apparent that various modifications can be made without departing from the spirit and scope of the disclosure. Accordingly, it is not intended that the disclosure be limited, except as by the appended claims.

What is claimed is:

1. A solar collector system comprising:
   a frame comprising at least a pair of side members spaced apart from each other in a first direction, and a plurality of cross members connected to the pair of side members;
   a plurality of stations extending from the frame in a second direction perpendicular to the first direction;
   a plurality of heliostats, first heliostats of the plurality of heliostats being arranged in a first row and each mounted to a corresponding one of the stations at a first side of the frame, second heliostats of the plurality of heliostats being arranged in a second row and each mounted to a corresponding one of the stations at a second side of the frame, the second row being spaced apart from the first row in the first direction; and
   a plurality of ballasts coupled to the frame and configured to maintain a position of the frame on the ground,
   wherein each cross member is pivotable relative to at least one of the side members about an axis extending in the second direction between a shipping configuration and a deployed configuration.

2. The solar collector system of claim 1, wherein each cross member is pivotable relative to an adjacent cross member between the shipping configuration and the deployed configuration, wherein in the deployed configuration, adjacent cross members are oriented relative to each other at a predetermined angle.

3. The solar collector system of claim 1, further comprising a hinge for pivotally connecting pairs of the cross members, the hinge comprising:
   a first portion configured to receive a first cross member;
   a second portion pivotally connected to the first portion and configured to receive a second cross member;
   wherein the first portion and the second portion are moveable relative to each other between a closed position and an open position, wherein the first and second cross members are oriented relative to each other at a predetermined angle in the open position; and
   wherein the first portion and the second portion engage in the open position to maintain the first portion relative to the second portion at the predetermined angle.

4. The solar collector system of claim 1, further comprising a hinge for pivotally connecting pairs of the cross members, the hinge comprising:
   a plate connected to a first cross member and having at least one guide slot configured to receive a projection of a second cross member pivotally coupled to the plate;
   wherein pivoting the second cross member relative to the plate guides the projection in the guide slot; and
   wherein the first cross member and the second cross member form a predetermined angle when the projection is guided in the guide slot.

5. The solar collector system of claim 1, wherein stations of the plurality of stations are positioned on opposing side members of the frame in a staggered formation.

6. The solar collector system of claim 1, wherein each station is attached to one of the side members.

7. The solar collector system of claim 1, wherein each station is mounted on a corresponding one of the ballasts.

8. The solar collector system of claim 1, wherein each station is pivotally connected to a pair of adjacent cross members.

9. The solar collector system of claim 1, wherein the side members are connected to the cross members in a space between opposing stations.

10. The solar collector system of claim 1, further comprising a height adjustment and mounting mechanism associated with each ballast, wherein the frame is coupled to each ballast with the height adjustment and mounting mechanism.

11. The solar collector system of claim 1, wherein at least one of the side members and the cross members comprises hollow tubes configured to receive electrical components.

12. The solar collector system of claim 1, further comprising a cleaning mechanism comprising:
   a chassis having guide elements configured to engage a guide portion of each side member to traverse along the frame between the side members; and
   a plurality of cleaning devices mounted on the chassis and configured to clean optical surfaces of each heliostat as the chassis traverses between the side members.

13. A solar collector system comprising:
   a plurality of frames, each frame comprising:
      at least a pair of side members spaced apart from each other in a first direction;
      a plurality of cross members connected to the side members, the cross members pivotally moveable from a shipping configuration to a deployed configuration wherein in the deployed configuration, each cross member is positioned relative to an adjacent cross member with a predetermined angle; and
      a plurality of stations extending from the frame in a second diction perpendicular to the first direction,
      wherein each cross member is pivotable relative to at least one of the side members about an axis extending in the second direction between the shipping configuration and the deployed configuration;

a plurality of heliostats, wherein, in each of the frames, first heliostats of the plurality of heliostats are arranged in a first row and each mounted to a corresponding one of the stantions at a first side of the frame, and second heliostats of the plurality of heliostats are arranged in a second row and each mounted to a corresponding one of the stantions at a second side of the frame, the second row being spaced apart from the first row in the first direction; and a plurality of ballasts coupled to the frames, each ballast having a lower surface contacting the ground without substantially penetrating the ground to maintain a position of the frames on the ground.

14. The solar collector system of claim 13, wherein at least one of the side members and cross members of each frame is connectable to at least one of the side members and cross members of another frame to connect the frames.

15. The solar collector system of claim 13, further comprising a hinge for pivotally connecting pairs of the cross members, the hinge comprising:

a first portion configured to receive a first cross member;

a second portion pivotally connected to the first portion and configured to receive a second cross member;

wherein the first portion and the second portion are moveable relative to each other between a closed position and an open position, wherein the first and second cross members are oriented relative to each other at a predetermined angle in the open position; and wherein the first portion and the second portion engage in the open position to substantially maintain the first portion relative to the second portion at the predetermined angle.

16. The solar collector system of claim 15, further comprising a hinge for pivotally connecting pairs of the cross members, the hinge comprising:

a plate connected to a first cross member and having at least one guide slot configured to receive a projection of a second cross member pivotally coupled to the plate;

wherein pivoting the second cross member relative to the plate guides the projection in the guide slot; and wherein the first cross member and the second cross member form a predetermined angle when the projection is guided in the guide slot.

17. The solar collector system of claim 13, wherein stantions of the plurality of stantions are positioned on opposing side members of the frames in a staggered formation.

18. The solar collector system of claim 13, wherein each stantion is attached to one of the side members.

19. The solar collector system of claim 13, wherein each stantion is mounted on a corresponding one of the ballasts.

20. The solar collector system of claim 13, wherein each stantion is pivotally connected to a pair of adjacent cross members.

21. The solar collector system of claim 13, wherein the side members are connected to the cross members in a space between opposing stantions.

22. The solar collector system of claim 13, further comprising a height adjustment and mounting mechanism associated with each ballast, wherein the frame is coupled to each ballast with the height adjustment and mounting mechanism.

23. The solar collector system of claim 13, wherein at least one of the side members and the cross members comprises hollow tubes configured to receive electrical components.

24. The solar collector system of claim 13, further comprising a cleaning mechanism comprising:

a chassis having guide elements configured to engage a guide portion of each side member to traverse along the frame between the side members; and a plurality of cleaning devices mounted on the chassis and configured to clean optical surfaces of each heliostat as the chassis traverses between the side members.

* * * * *